(12) United States Patent
Fukamizu et al.

(10) Patent No.: US 7,768,226 B2
(45) Date of Patent: *Aug. 3, 2010

(54) MOTOR DRIVE DEVICE AND MOTOR DRIVE METHOD

(75) Inventors: Shingo Fukamizu, Osaka (JP); Yasunori Yamamoto, Osaka (JP); Hideaki Mori, Osaka (JP); Shinichi Kuroshima, Osaka (JP)

(73) Assignee: Panasonic Corporation, Osaka (JP)

( * ) Notice: Subject to any disclaimer, the term of this patent is extended or adjusted under 35 U.S.C. 154(b) by 462 days.

This patent is subject to a terminal disclaimer.

(21) Appl. No.: 11/683,667

(22) Filed: Mar. 8, 2007

(65) Prior Publication Data

US 2007/0216325 A1 Sep. 20, 2007

(30) Foreign Application Priority Data

Mar. 15, 2006 (JP) ............................... 2006-070752

(51) Int. Cl.
*H02P 1/46* (2006.01)

(52) U.S. Cl. .................. 318/700; 318/400.01; 318/720; 318/721

(58) Field of Classification Search ............ 318/400.32, 318/400.34, 400.05, 400.27, 400.35, 400.33, 318/721, 798, 811, 500, 400.36, 434, 799, 318/400.01, 400.11, 400.14, 430, 700, 720, 318/800, 812

See application file for complete search history.

(56) References Cited

U.S. PATENT DOCUMENTS

| | | | | |
|---|---|---|---|---|
| 5,130,620 A | * | 7/1992 | Inaji et al. .............. | 318/400.35 |
| 5,254,918 A | | 10/1993 | Ueki | |
| 5,350,987 A | | 9/1994 | Ueki | |
| 5,367,234 A | * | 11/1994 | DiTucci ................. | 318/400.35 |
| 5,481,167 A | * | 1/1996 | Rohrbaugh et al. .... | 318/400.35 |
| 5,835,992 A | * | 11/1998 | Choi et al. ............. | 318/400.17 |
| 6,181,093 B1 | * | 1/2001 | Park et al. .............. | 318/400.34 |
| 6,236,174 B1 | | 5/2001 | White | |
| 6,252,362 B1 | | 6/2001 | White et al. | |
| 6,316,894 B2 | * | 11/2001 | Hashimura ............. | 318/400.04 |
| 6,323,610 B1 | | 11/2001 | Ng et al. | |
| 6,380,707 B1 | * | 4/2002 | Rosholm et al. ....... | 318/400.03 |
| 6,388,416 B1 | | 5/2002 | Nakatani et al. | |

(Continued)

FOREIGN PATENT DOCUMENTS

EP 0 251 785 1/1988

(Continued)

*Primary Examiner*—Bentsu Ro
*Assistant Examiner*—Antony M Paul
(74) *Attorney, Agent, or Firm*—RatnerPrestia

(57) ABSTRACT

Problems with accuracy reading position detection signal peaks and minute phase differences in the detection current make motor drive control easily susceptible to differences in motor characteristics. The rotor position is determined based on whether or not a terminal difference voltage, which is the difference voltage between the motor terminal voltage and the pseudo-neutral-point voltage when the motor phases are selectively energized, exceeds a specific threshold value. The phase energized to start the motor is determined based on this determination and the motor is energized accordingly to start. Instead of switching directly from the search step at the initial rotor position to the back-EMF voltage mode, a search and start mode that creates initial rotor speed sufficient to start the motor is executed before entering the back-EMF voltage mode.

28 Claims, 38 Drawing Sheets

U.S. PATENT DOCUMENTS

| | | | |
|---|---|---|---|
| 6,512,343 B1 * | 1/2003 | Yasohara | 318/437 |
| 6,570,353 B2 * | 5/2003 | Krotsch et al. | 318/400.24 |
| 6,946,808 B2 * | 9/2005 | Kandori | 318/400.33 |
| 7,088,063 B2 * | 8/2006 | Kurosawa et al. | 318/400.35 |
| 7,193,383 B2 * | 3/2007 | Sarlioglu et al. | 318/438 |
| 7,294,982 B2 * | 11/2007 | Kurosawa et al. | 318/400.2 |
| 7,301,298 B2 * | 11/2007 | Shao et al. | 318/599 |
| 7,466,093 B2 * | 12/2008 | Otaguro | 318/400.09 |
| 7,477,034 B2 * | 1/2009 | MacKay | 318/432 |
| 7,531,976 B2 * | 5/2009 | Fukamizu et al. | 318/400.34 |
| 2003/0102832 A1 | 6/2003 | Iwanaga et al. | |
| 2004/0056628 A1 | 3/2004 | Kandori | |

FOREIGN PATENT DOCUMENTS

| | | |
|---|---|---|
| JP | 63-069489 | 3/1988 |
| JP | 04-46583 | 2/1992 |
| JP | 05-236789 | 9/1993 |
| JP | 11-341870 | 12/1999 |
| JP | 2000-201495 | 7/2000 |
| JP | 2001-054295 | 2/2001 |
| JP | 2001-258287 | 9/2001 |
| JP | 2003-174789 | 6/2003 |
| JP | 2004-104846 | 4/2004 |

* cited by examiner

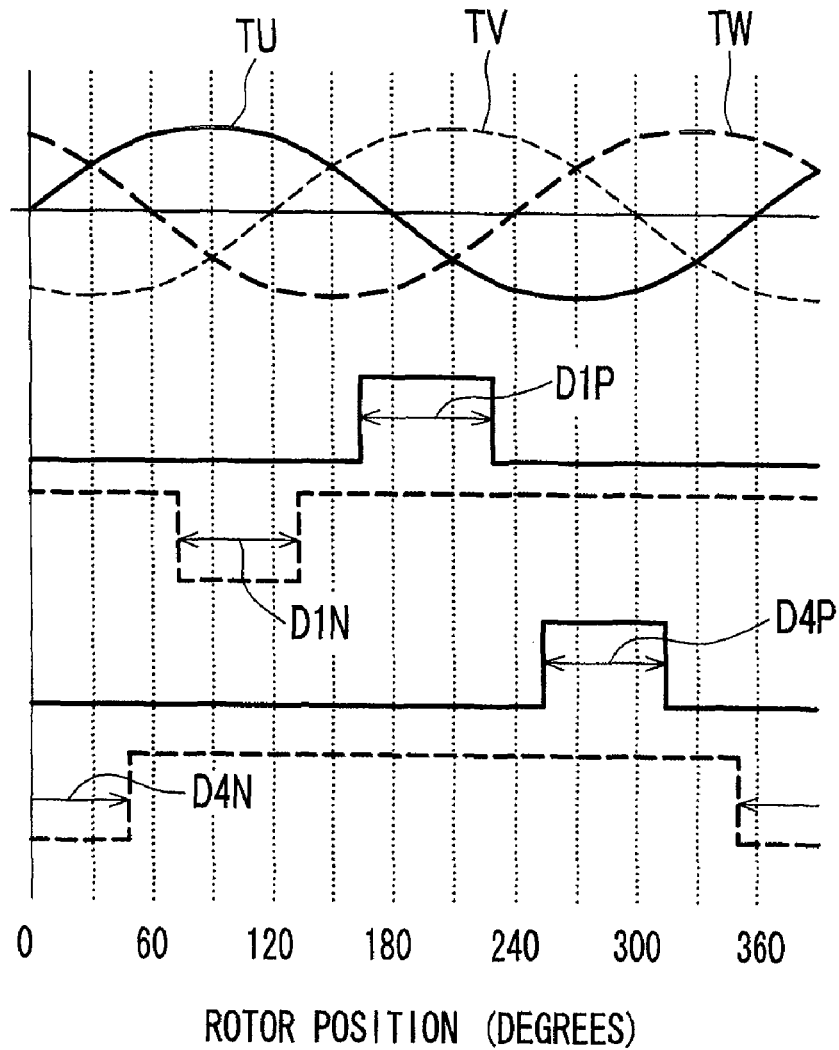

Fig.5

| STATE | | F1 | F2 | F3 | F4 | F5 | F6 |
|---|---|---|---|---|---|---|---|
| | ENERGIZED SEARCH PHASE | U-->V | U-->W | V-->W | V-->U | W-->U | W-->V |
| FA | POLARITY OF TERMINAL DIFFERENCE VOLTAGE DETECTION UNIT 13 THRESHOLD VALUE | NEGATIVE POSITIVE | NEGATIVE POSITIVE | NEGATIVE POSITIVE | NEGATIVE POSITIVE | NEGATIVE POSITIVE | NEGATIVE POSITIVE |
| | ROTOR POSITION AT ABSOLUTE MAXIMUM OR ABSOLUTE MINIMUM | 110° | 170° | 230° | 290° | 350° | 50° |
| | ENERGIZED STARTING PHASE | U-->W | V-->W | V-->U | W-->U | W-->V | U-->V |
| FB | POLARITY OF TERMINAL DIFFERENCE VOLTAGE DETECTION UNIT 13 THRESHOLD VALUE | POSITIVE NEGATIVE | POSITIVE NEGATIVE | POSITIVE NEGATIVE | POSITIVE NEGATIVE | POSITIVE NEGATIVE | POSITIVE NEGATIVE |
| | ROTOR POSITION AT ABSOLUTE MAXIMUM OR ABSOLUTE MINIMUM | 190° | 250° | 310° | 10° | 70° | 130° |
| | ENERGIZED STARTING PHASE | V-->W | V-->U | W-->U | W-->V | U-->V | U-->W |

FORWARD ROTATION

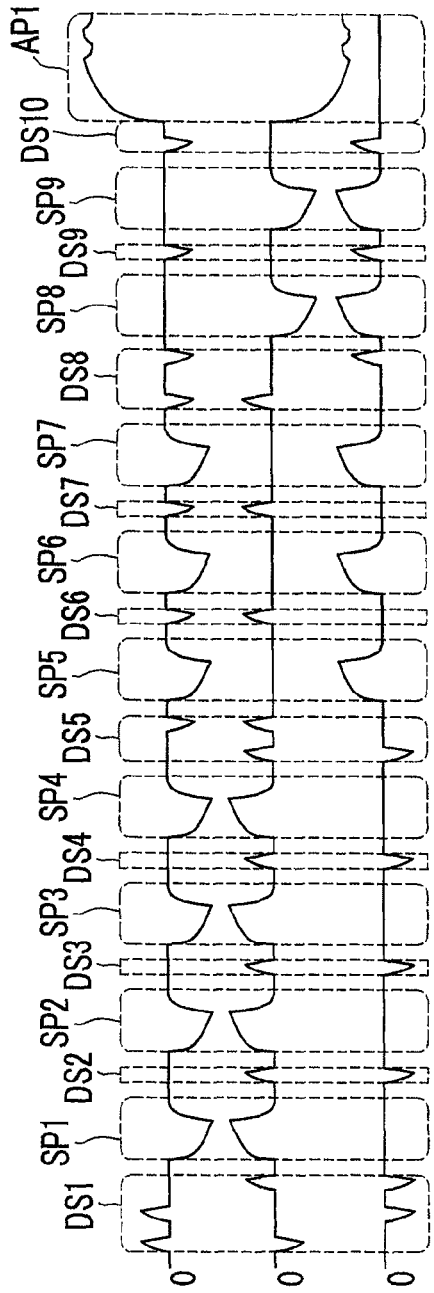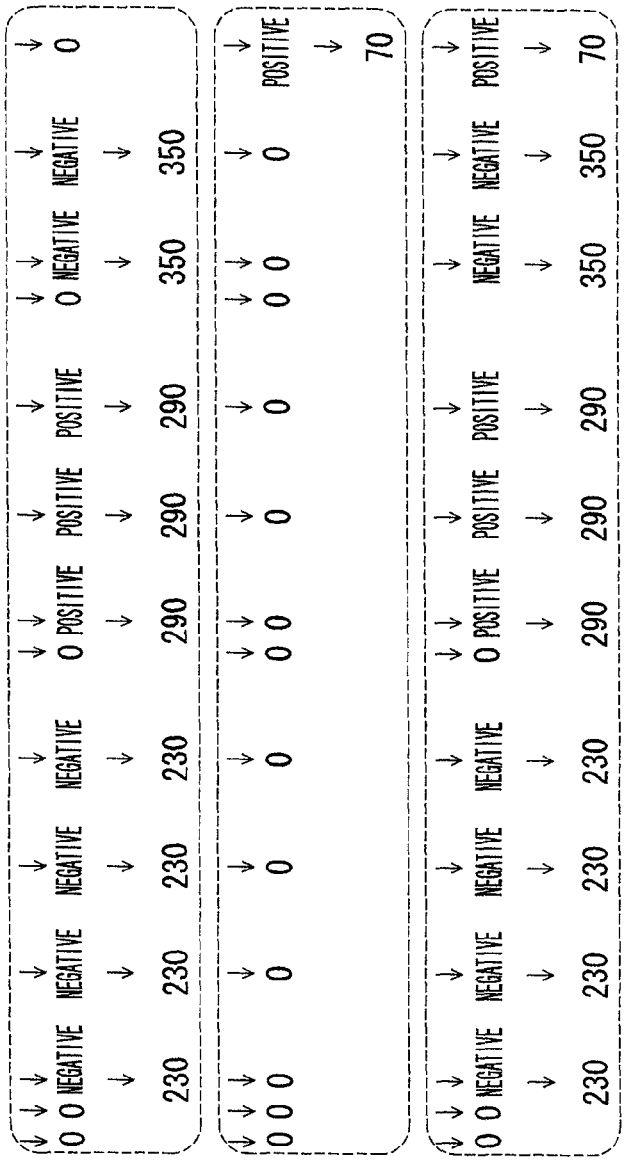

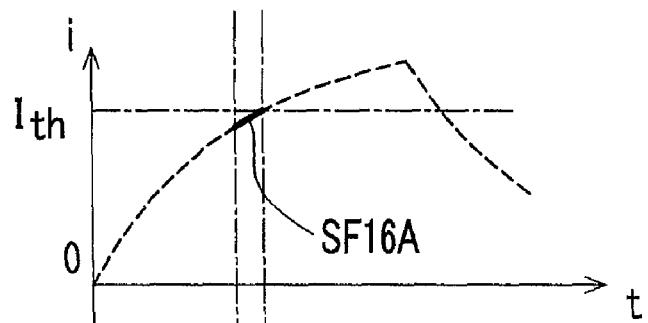
Fig. 16A
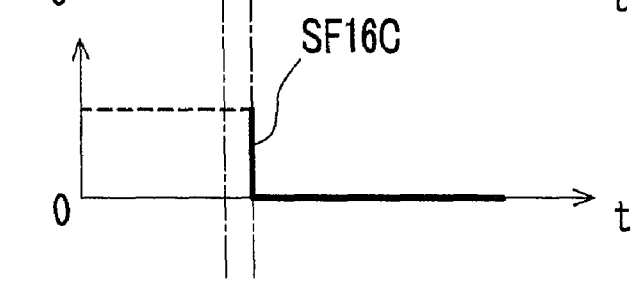
Fig. 16B
Fig. 16C
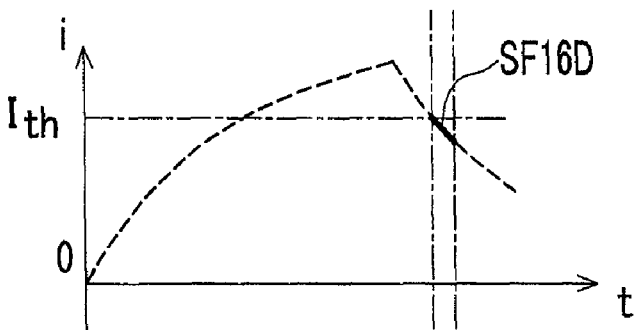
Fig. 16D
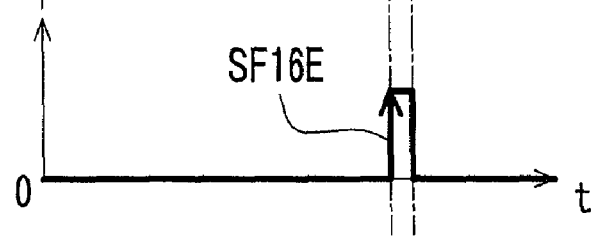
Fig. 16E

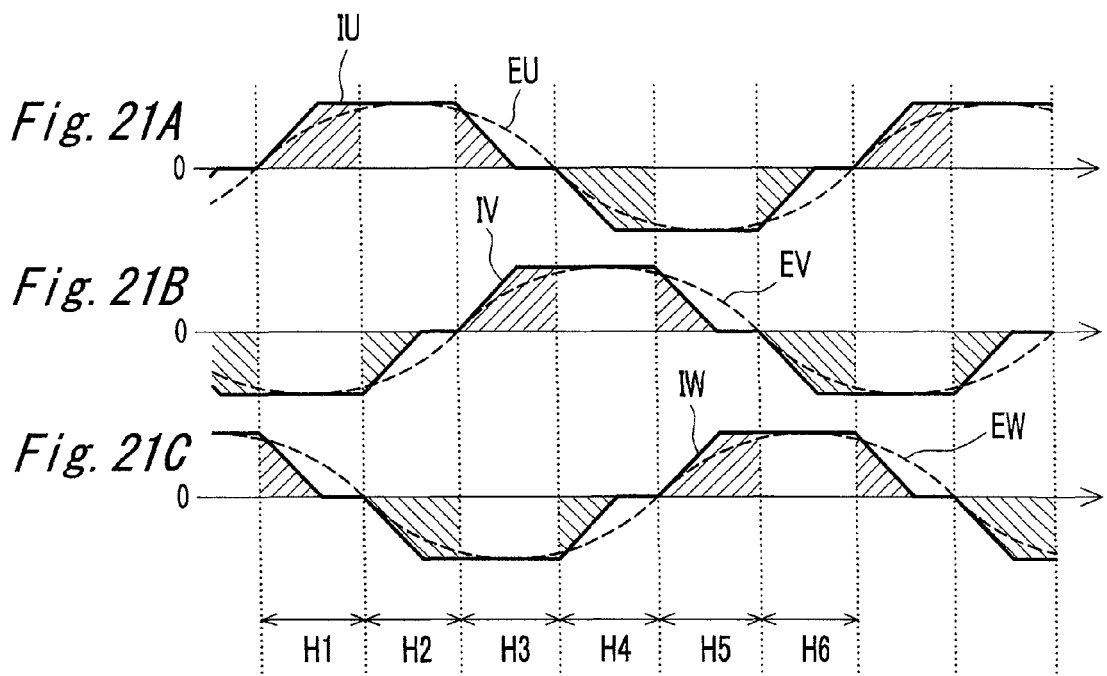

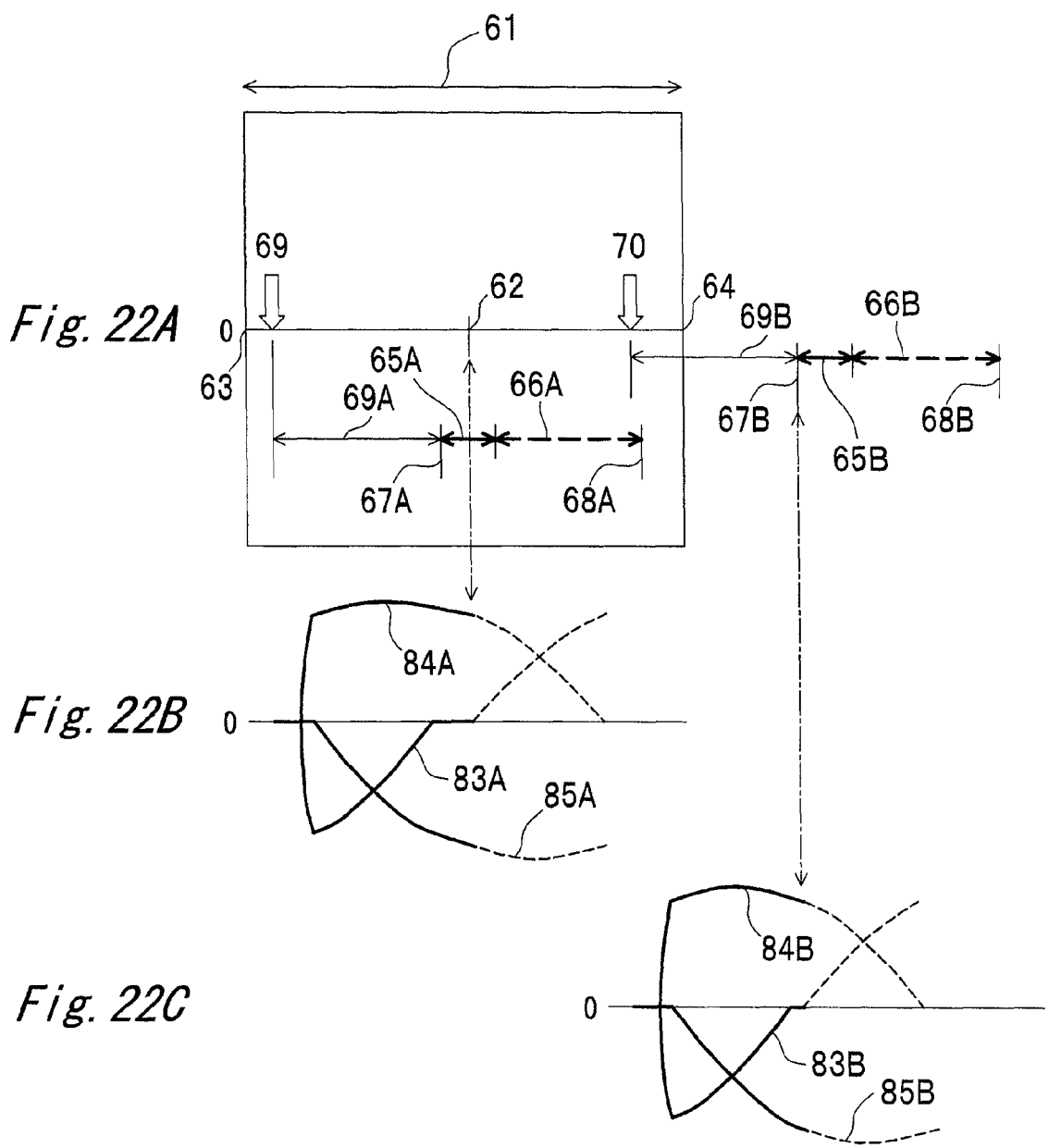

MOTOR DRIVE DEVICE AND MOTOR DRIVE METHOD

BACKGROUND OF THE INVENTION

1. Field of Invention

The present invention relates to a three-phase brushless motor drive device and motor drive method enabling consistently starting quickly without requiring a rotor position sensor.

2. Description of Related Art

Brushless motors use a suitable number of windings in the stator winding to which current is supplied to apply a consistent amount of torque to the rotor. This requires knowing the electrical phase position of the rotor relative to the stator. Various kinds of rotor position sensors are used for knowing this relative phase position. Sensorless drive technology that does not require a rotor position sensor has also been developed due to concerns about reliability, cost, and the environment. Sensorless drive technologies generally detect the rotor position by reading the back electromotive force (back-EMF) voltage produced in the stator winding when the rotor is turning. However, because this back-EMF voltage is not produced when the rotor is not turning, various other methods of detecting the rotor position when the rotor is stopped have been proposed.

EP Patent Application Publication No. 0251785 (corresponding to Japanese Laid-open Patent Publication No. S63-69489), for example, teaches sequentially selecting the stator phase and applying a rotor position detection pulse, and detecting the rotor position from the stator phase at which the current flowing through the stator winding produces the highest amplitude.

U.S. Pat. No. 5,254,918 and No. 5350987 (corresponding to Japanese Laid-open Patent Publication No. H4-46583) sequentially select the stator phase and apply a rotor position detection pulse in the same way as EP Patent Application Publication No. 0251785. In addition, U.S. Pat. No. 5,254,918 and No. 5350987 divides the motor winding at the neutral point into a first measurement group denoting voltages near ⅓ the supply voltage and a second measurement group denoting voltages near ⅔ the supply voltage, and obtains the difference voltage between the absolute value of the minimum voltage and the absolute value of the maximum voltage for each measurement group. The difference voltages of the measurement groups are then compared and the rotor position is determined based on the energizing pattern at which the greater difference voltage is obtained.

The motor drive control circuit and motor drive device taught in U.S. Patent Application Publication No. 2004/0056628 (corresponding to Japanese Laid-open Patent Publication No. 2004-104846) are described next with reference to FIG. 36 and FIG. 37. Note that only those components required to describe the operating principle are noted below.

The three-phase motor drive device shown in FIG. 36 has a drive unit $1p$, a motor $2p$, and a motor drive control circuit $3p$. The drive unit $1p$ is a three-phase drive circuit composed of n-channel MOSFET power transistors $Q1p$, $Q2p$, $Q3p$, $Q4p$, $Q5p$, and $Q6p$. The drains of power transistors $Q1p$ to $Q3p$ are connected to a common node that is connected to a terminal to which a drive voltage VD is applied.

The source of power transistor $Q1p$ is connected to the drain of power transistor $Q4p$, the source of power transistor $Q2p$ is connected to the drain of power transistor $Q5p$, and the source of power transistor $Q3p$ is connected to the drain of power transistor $Q6p$. The sources of power transistors $Q4p$ to $Q6p$ are connected to a common node that goes to ground.

One end of motor winding Lup of the motor $2p$ is connected to the node connecting power transistor $Q1p$ and power transistor $Q4p$, one end of motor winding Lvp of the motor $2p$ is connected to the node connecting power transistor $Q2p$ and power transistor $Q5p$, and one end of the motor winding Lwp of the motor $2p$ is connected to the node connecting power transistor $Q3p$ and power transistor $Q6p$. The other ends of motor windings Lup, Lvp, and Lwp are connected together.

The motor drive control circuit $3p$ is connected to the node connecting the drive unit $1p$ and the motor $2p$, the common connection node of the motor windings Lup, Lvp, and Lwp, and the gates of the power transistors $Q1p$ to $Q6p$ in the drive unit $1p$. The gates of power transistors $Q1p$ to $Q6p$ are controlled by drive signals D1, D2, D3, D4, D5, and D6 output from the motor drive control circuit $3p$. The drive unit $1p$ supplies drive current to the motor $2p$ to turn the motor $2p$.

The motor drive control circuit $3p$ has a pulse generator $4p$, a sequence circuit $5p$, a mode selection circuit $6p$, a neutral point variance detection comparator $7p$, a detection level generating circuit $8p$, a register $9p$, a decoder $10p$, a preset circuit $11p$, a back-EMF voltage detection comparator $12p$, a switching noise mask circuit $13p$, and a drive wave generating circuit $14p$.

FIG. 37 is a waveform diagram describing the relationship between the neutral point voltage CT (y-axis) of the motor windings Lup, Lvp, and Lwp in FIG. 36 and the rotor position (x-axis) before the motor starts. According to U.S. Patent Application Publication No. 2004/0056628, the motor drive control circuit $3p$ supplies a rotor position detection drive signal to the drive unit $1p$ before the motor starts. Based on this rotor position detection drive signal, the drive unit $1p$ supplies a rotor position search pulse to the motor windings Lup, Lvp, and Lwp. The level of this rotor position search pulse is set so that the neutral point voltage CT varies according to the rotor position before the motor starts and the motor $2p$ does not turn. The motor drive control circuit $3p$ detects the position of the rotor before the motor starts based on this neutral point voltage CT that thus varies as shown in FIG. 37.

The detection level generating circuit $8p$ has a plurality of resistances each having one end connected to a node between the motor $2p$ and drive unit $1p$ and the other end connected to a common node, and shifts the level of the voltage applied to the common other ends of the resistances according to the rotor position detection drive signal.

The neutral point variance detection comparator $7p$ compares the output of the detection level generating circuit $8p$ with the neutral point voltage CT.

The motor drive control circuit $3p$ detects the position of the rotor before the motor starts based on the output of the neutral point variance detection comparator $7p$.

See also U.S. Patent Application Publication No. 2003/0102832 (corresponding to Japanese Laid-open Patent Publication No. 2003-174789).

Three-phase brushless motors use a wide range of winding shapes and methods of magnetizing the rotor magnet in order to structurally suppress vibration, noise, and rotational deviation.

A problem with EP Patent Application Publication No. 0251785 is that it is difficult to accurately read the peak pulse current flow when the rotor position search pulse is applied. In addition, the difference between the phases in the pulse current peak is small depending on the rotor position. This requires that there is little deviation in the electromagnetic characteristics of each phase in the stator and rotor. The technology taught in EP Patent Application Publication No. 0251785 therefore is difficult to use in inexpensive motors having insufficient phase characteristics control. Furthermore, the pulse current rises in motors in which the coil inductance is reduced for high speed performance, and the current required to achieve a desired pulse current peak difference is extreme.

U.S. Pat. No. 5,254,918 and No. 5350987 teaches technology for storing the neutral point voltage of the motor winding when the rotor position detection pulse is applied in a first measured voltage group and a second measured voltage group. The difference voltage is obtained for each group and the greater difference voltage is determined. This requires the ability to A/D convert and operate on the variation in the neutral point voltage. It is therefore to use this technology in a motor requiring stand-alone automated control or in low cost motor drive systems.

A problem with U.S. Patent Application Publication No. 2004/0056628 is that there is a range where the rotor position cannot be detected. If the motor is stopped in this range when the motor starts, it may not be possible to start the motor no matter how many times the rotor position detection pulse is applied because the motor may be stopped where the rotor position cannot be detected.

Furthermore, when the rotor position cannot be correctly detected, the combined voltage of the induction voltage and the back-EMF voltage occurs in the back-EMF voltage detection phase immediately after switching from the initial rotor position detection mode to the back-EMF voltage mode. As a result, when the rotor speed is extremely slow, the rotor position information is incorrectly detected and problems such as the rotor reversing when the motor starts may occur. Problems such as rotor reversing and loss of synchronization can thus occur even if the back-EMF voltage mode is entered from the initial rotor position detection mode when the rotor position cannot be correctly detected.

It is also difficult to use sensorless drive technologies that use variation in the neutral point voltage for initial rotor position detection for sensorless starting of motors that do not have a neutral point terminal.

SUMMARY OF THE INVENTION

A first aspect of the invention is a motor drive device operable to start an N-phase motor having N phase (where N is an integer of two or more) motor windings by supplying a search current and a starting current in a search and start mode, and to drive the N-phase motor by supplying drive current in a back-EMF voltage mode, the motor drive device including: a drive signal generator operable to produce a search drive signal, a starting drive signal, and a normal drive signal; a driver operable to produce the search current, starting current, and drive current, respectively, based on the search drive signal, the starting drive signal, and the normal drive signal; a pseudo-neutral-point voltage generator operable to generate a pseudo-neutral-point voltage representing the average voltage of the N-phase motor terminals; and a terminal difference voltage detector operable to detect a terminal difference voltage denoting the difference between the N-phase motor terminal voltage and the pseudo-neutral-point voltage, and to output a detection result signal; wherein the drive signal generator controls the starting drive signal based on the search drive signal and the detection result signal in the search and start mode.

A second aspect of the invention is a motor drive method for starting an N-phase motor having N phase (where N is an integer of two or more) motor windings by supplying a search current and a starting current in a search and start mode, and driving the N-phase motor by supplying drive current in a back-EMF voltage mode, the motor drive method including steps of: generating a search drive signal, a starting drive signal, and a normal drive signal; producing the search current, starting current, and drive current, respectively, based on the search drive signal, the starting drive signal, and the normal drive signal; generating a pseudo-neutral-point voltage representing the average voltage of the N-phase motor terminals; and detecting a terminal difference voltage denoting the difference between the N-phase motor terminal voltage and the pseudo-neutral-point voltage, and outputting a detection result signal; wherein the drive signal generating step controls the starting drive signal based on the search drive signal and the detection result signal in the search and start mode.

The motor drive device and motor drive method of the present invention apply a search pulse in a specific range to compare the terminal difference voltage with a specific value to determine the rotor position. The likelihood of immediately knowing the rotor position from the selected phase is therefore constant. The rotor can therefore be started by immediately energizing the appropriate drive phase after detecting the rotor position. The invention thus enables applying a torque signal to start the motor without determining the rotor position after selectively energizing specific phases. The search and start mode is thus shortened and the motor can be started more quickly. The reliability of the terminal difference voltage is also improved and the rotor position can be accurately detected because the terminal difference voltage is detected from the search pulse in a specific range.

The terminal difference voltage denoting the difference between the pseudo-neutral-point voltage and the motor terminal voltage of each phase has a higher amplitude and noise resistance than the winding end voltage or the neutral point difference voltage. The terminal difference voltage also enables detecting the rotor position over a wider electrical angle range and therefore eliminates angles where the rotor position cannot be detected. Using this terminal difference voltage therefore enables reliably detecting the rotor position.

The present invention thus produces rotor speed sufficient to initially start the motor and reliably executes the search and start mode. A sensorless motor can therefore be reliably and quickly started because the back-EMF voltage mode is enabled after the search and start mode. This control method can also be implemented easily at low cost. The invention also enables sensorless starting of motors that do not have a neutral point terminal. Other objects and attainments together with a fuller understanding of the invention will become apparent and appreciated by referring to the following description and claims taken in conjunction with the accompanying drawings.

BRIEF DESCRIPTION OF THE DRAWINGS

FIGS. 4A, 4B, 4C, 4D, and 4E are waveform diagrams showing the relationship between the torque constant and the output of the terminal voltage detection unit in the first embodiment of the invention.

FIG. 5 is a table describing the relationship between the energized detection phase, the rotor position, and the corresponding energized starting phase in the first embodiment of the invention.

FIGS. 7A, 7B, 7C, 7D, 7E, 7F, 7G, 7H, and 7I are timing charts of detection pulse and starting pulse application in the first embodiment of the invention.

FIGS. 16A, 16B, 16C, 16D, and 16E are waveform diagrams of current peak control of the detection pulse in the second variation of the first embodiment of the invention.

FIGS. 21A, 21B, 21C, and 21D describe timing of the energizing current waveform in the first embodiment of the invention.

FIGS. 22A, 22B, and 22C describe the timing of zero cross detection in the back-EMF voltage mode in the first embodiment of the invention.

DETAILED DESCRIPTION OF THE PREFERRED EMBODIMENTS

Some preferred embodiments of the invention are described below with reference to the accompanying figures wherein parts having the same arrangement, operation, and effect are denoted by the same reference numbers. Numbers used in the following description are by way of example only to describe the invention clearly, and the invention is not limited to these numbers in any way.

Embodiment 1

Figure 1A:
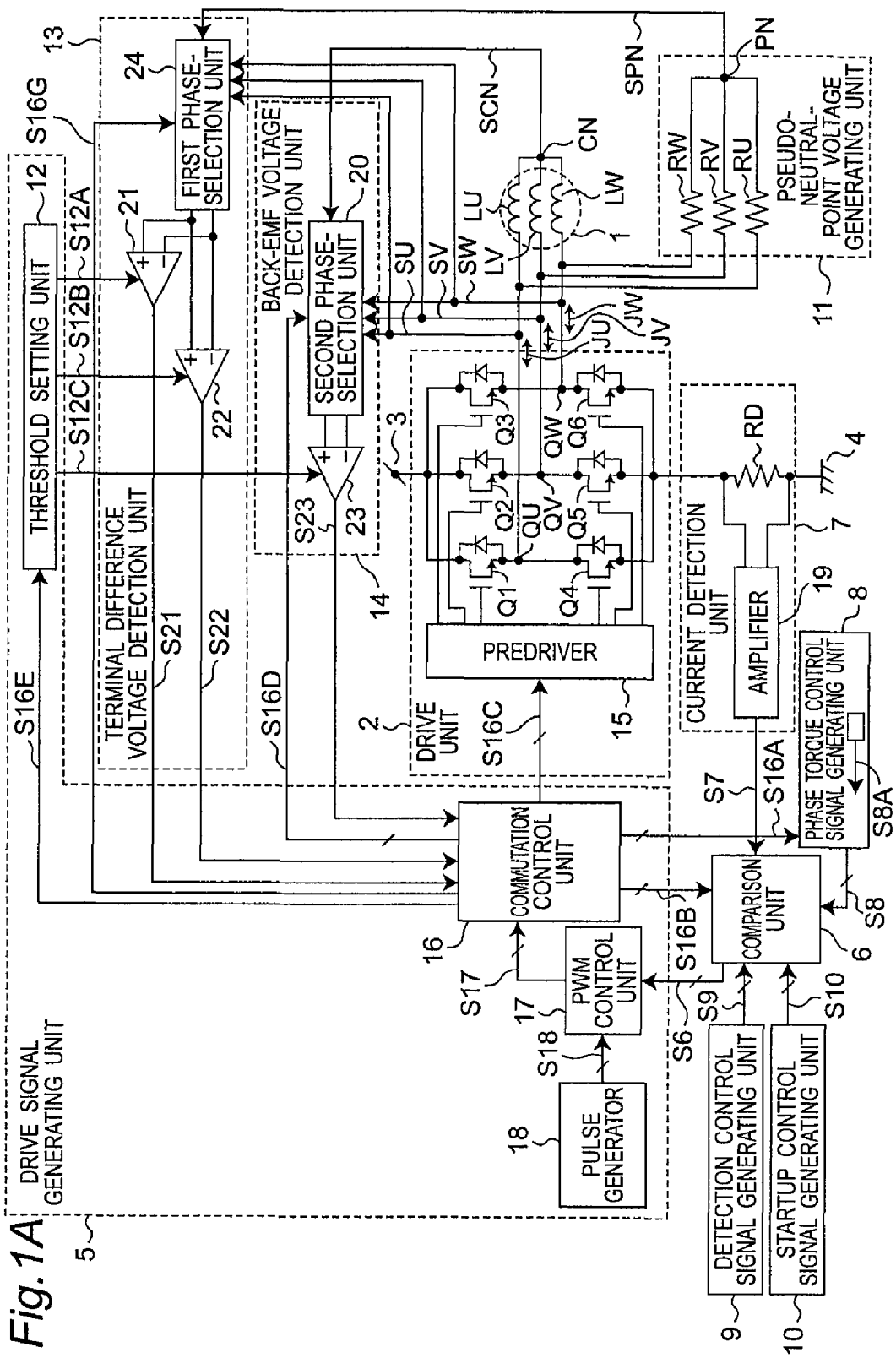
FIG. 1A is a circuit block diagram of a first embodiment of the invention.

FIG. 1A is a circuit block diagram of a motor drive device according to a first embodiment of the invention. The motor drive device shown in FIG. 1A has a motor 1, a drive unit 2, a drive signal generating unit 5, a comparison unit 6, a current detection unit 7, a phase torque control signal generating unit 8, a detection control signal generating unit 9, a startup control signal generating unit 10, a pseudo-neutral-point voltage generating unit 11, a terminal difference voltage detection unit 13, and a back-EMF voltage detection unit 14.

The motor 1 has a three-phase fixed stator and a rotor that rotates around the stator. A three-phase motor 1 is used as the motor in this first embodiment of the invention, but the invention can be applied to any N-phase motor where N is an integer of two or more. The U-phase motor winding LU, V-phase motor winding LV, and W-phase motor winding LW are connected in common at neutral point CN, and the other end of each winding is respectively connected to the U-phase motor terminal QU, V-phase motor terminal QV, and W-phase motor terminal QW.

The drive unit 2 includes a predriver 15 for amplifying the six drive signals S16C generated by the drive signal generating unit 5, and six switching devices of which the control pins are driven by the predriver 15. The six switching devices are the U-phase high potential side switch Q1, the V-phase high potential side switch Q2, the W-phase high potential side switch Q3, the U-phase low potential side switch Q4, the V-phase low potential side switch Q5, and the W-phase low potential side switch Q6. These switching devices are parallel connected with the diodes in the reverse conduction direction. The high potential pins of the high potential side switches Q1, Q2, and Q3 are connected to the high potential power supply 3, and the low potential pins of the low potential side switches Q4, Q5, and Q6 are connected through the current detection unit 7 to the low potential power supply 4. The low potential pin of the U-phase high potential side switch Q1 and the high potential pin of the U-phase low potential side switch Q4 are connected to the U-phase motor terminal QU, the low potential pin of the V-phase high potential side switch Q2 and the high potential pin of the V-phase low potential side switch Q5 are connected to the V-phase motor terminal QV, and the low potential pin of the W-phase high potential side switch Q3 and the high potential pin of the W-phase low potential side switch Q6 are connected to the W-phase motor terminal QW. The drive unit 2 supplies drive current or drive voltage from the high potential power supply 3 to the motor 1 to drive the motor 1.

The drive signal generating unit 5 includes a commutation control unit 16, a PWM control unit 17, a pulse generator 18, and a threshold setting unit 12. The current detection unit 7 includes a current detection resistance RD and amplifier 19. The pseudo-neutral-point voltage generating unit 11 includes phase resistors RU, RV, and RW. The phase resistors RU, RV, and RW are connected in common at pseudo-neutral point PN and the other ends of the phase resistors RU, RV, and RW are connected to motor terminal QU, motor terminal QV, and motor terminal QW, respectively. The terminal difference voltage detection unit 13 includes a first phase selection unit 24, a comparator 21 and a comparator 22. The back-EMF voltage detection unit 14 includes a second phase-selection unit 20 and a comparator 23. The comparators 21 and 22 are also referred to as a first comparator, and the comparator 23 is also referred to as a second comparator.

In the motor drive device according to this aspect of the invention, the voltage at each terminal denotes the difference between the potential of the terminal and a predetermined reference potential unless otherwise specifically noted. In this first embodiment of the invention the low potential power supply 4 supplies a predetermined reference potential, such as the ground potential. U-phase motor terminal voltage SU is produced at the motor terminal QU using the potential of the low potential power supply 4 as the reference potential, V-phase motor terminal voltage SV is produced at the motor terminal QV using the potential of the low potential power supply 4 as the reference potential, and W-phase motor terminal voltage SW is produced at the motor terminal QW using the potential of the low potential power supply 4 as the reference potential. Neutral point voltage SCN is produced at the neutral point CN using the potential of the low potential power supply 4 as the reference potential. Pseudo-neutral-point voltage SPN is produced at the pseudo-neutral point PN using the potential of the low potential power supply 4 as the reference potential. The pseudo-neutral-point voltage generating unit 11 averages the U-phase motor terminal voltage SU, V-phase motor terminal voltage SV, and W-phase motor terminal voltage SW by the phase resistors RU, RV, and RW, and produces the pseudo-neutral-point voltage SPN at the pseudo-neutral point PN. This averaging step includes weighted averaging by the phase resistors RU, RV, and RW. In this first embodiment of the invention the phase resistors RU, RV, and RW are equal. Note that this predetermined reference potential may be supplied from the high potential power supply 3 or from a different reference potential supply source.

The difference voltage between the motor terminal voltages SU, SV, SW and the neutral point voltage SCN is called the "winding end voltage." The difference voltage between the motor terminal voltages SU, SV, SW and the pseudo-neutral-point voltage SPN is called the "terminal difference voltage." More specifically, the difference voltage between the U-phase motor terminal voltage SU and pseudo-neutral-point voltage SPN is called the U-phase terminal difference voltage, the difference voltage between the V-phase motor terminal voltage SV and pseudo-neutral-point voltage SPN is called the V-phase terminal difference voltage, and the difference voltage between the W-phase motor terminal voltage SW and pseudo-neutral-point voltage SPN is called the W-phase terminal difference voltage. The U-phase terminal difference voltage, V-phase terminal difference voltage, and W-phase terminal difference voltage are collectively called the "terminal difference voltage."

The winding end voltage of each motor winding LU, LV, and LW includes the drive voltage, back-EMF voltage, inductive voltage, and drop voltage. The drive voltage is supplied by the drive unit 2 to drive the motor 1. The back-EMF voltage is produced by electromagnetic induction based on change in the rotor flux when the rotor turns. The inductive voltage is produced by electromagnetic induction based on the flux change produced in the motor winding by the drive current flowing to the motor winding based on the drive voltage. The induction voltage includes a self-induction voltage component that occurs in the same motor winding as the motor winding through which the drive current flows, and a mutual induction component that occurs in a motor winding other than the motor winding through which the drive current flows. The drop voltage is the voltage drop resulting from the resistance of the motor winding.

Because the drop voltage is relatively small, it is ignored below. The drive voltage of the non-energized phase during a two phase drive operation is zero. The induction voltage is also zero when the drive current during two-phase drive is a substantially constant low current level for a predetermined period such as with current-controlled PWM drive. The winding end voltage is therefore substantially equal to the back-EMF voltage alone. When the motor is stopped, the back-EMF voltage is also zero. As a result, only the induction voltage from mutual induction occurs when the drive current changes. This induction voltage is based on mutual induction between the motor windings, mutual inductance varies according to the position of the rotor magnet, and the induction voltage changes. The winding end voltage of the non-energized phase when two phases are energized can therefore be used as information for detecting the rotor position.

MOS transistors, bipolar transistors, IGBT (insulated gate bipolar transistors), and other types of devices can be used for switches Q1 to Q6. This embodiment of the invention uses n-channel MOS transistors for the switches Q1 to Q6, in which case the high potential pins are the drains, the low potential pins are the sources, and the control pins are the gates.

In switches Q1 to Q6, the logic level of the drive signals S16C applied to the switches that turn on is called the "operating state level," and the logic level of the drive signals S16C applied to the switches that are off is called the "non-operating state level." In the case of n-channel MOS transistors such as used in this embodiment of the invention, the operating state level is HIGH and the non-operating state level is LOW. The state of the logic at a particular time where the logic level is set to the operating state level or non-operating state level is called the "logic state." The phase in which the high potential side switches Q1, Q2, and Q3 turn on is called the "operating state phase," and the state of the phases in this operating state phase are in the "PWM on state." Conversely, the phase of the switches that are off is called the "non-operating state phase,"

and the state of the phases in this non-operating state phase are in the "PWM off state." The operating state phase and non-operating state phase are set by the commutation control unit 16 that controls the drive unit 2. The drive unit 2 supplies the drive current from the high potential power supply 3 to the motor 1 in the operating state phase, and does not supply drive current in the non-operating state phase.

The state in which the motor drive device of this invention finds the initial position of the rotor when the motor 1 is stopped, applies an initial rotation to start the motor, and the motor 1 starts to turn at a very low speed is called a "search and start mode." The normal operating state in which the back-EMF voltage can be consistently detected and commutation control is possible is called the "back-EMF voltage mode."

Torque control in the back-EMF voltage mode is described first below. The drive signals S16C in the back-EMF voltage mode are called normal drive signals S16C. The detection control signal generating unit 9 and startup control signal generating unit 10 are not used in the back-EMF voltage mode. The phase torque control signal generating unit 8 generates the torque control signal S8A that specifies the motor 1 torque. The commutation control unit 16 inputs an operating state signal S16A to the phase torque control signal generating unit 8. This operating state signal S16A represents a combination of operating state levels in the normal drive signals S16C. Based on the torque control signal S8A and operating state signal S16A, the phase torque control signal generating unit 8 generates a phase torque control signal S8 for each phase. The pulse generator 18 generates an ON pulse S18 having a specific period and denoting the timing at which the PWM on state starts. The current detection unit 7 converts the motor current flowing to the switching devices of each phase to a voltage by current detection resistance RD, and the amplifier 19 amplifies this voltage to output the current detection signal S7.

The comparison unit 6 receives operating state phase signal S16B denoting the operating state phase from the commutation control unit 16. Based on this operating state phase signal S16B, the comparison unit 6 compares the current detection signal S7 and the phase torque control signal S8. If the current detection signal S7 is greater than the phase torque control signal S8 of the operating state phase, an OFF pulse S6 is applied to the operating state phase. The PWM control unit 17 is composed of SR flip-flops, for example, and generates a PWM control signal S17 that is set by the ON pulse S18 and is reset by the OFF pulse S6, and supplies this PWM control signal S17 to the commutation control unit 16. The pulse width of the operating state phase is thus controlled by pulse-width modulation. This arrangement and operation also enable current control when motor current is supplied to all of the three phase motor windings. When 120 degree energizing is used, only two phases are energized at any same time without motor current strobe control energizing all three phases simultaneously, and one phase torque control signal S8 is sufficient. Energized phase control in the back-EMF voltage mode is described next.

The commutation control unit 16 and back-EMF voltage detection unit 14 work together. The commutation control unit 16 controls energizing so that the motor current supplied to each phase goes to zero in the period in which the polarity of the back-EMF voltage in each phase of a three-phase winding is expected to change. The time change component of the motor current also goes to zero after a short time in the zero motor current phase, that is, the non-energized phase. The back-EMF voltage can also be detected in the winding end voltage of the non-energized phase. The rotor position can be accurately determined by detecting the timing at which the polarity of the back-EMF voltage changes, that is, by detecting the zero cross timing.

In the back-EMF voltage mode the threshold setting unit 12 sets a predetermined threshold value S12C for comparison of two input signals by the comparator 23. The output of the comparator 23 varies according to the result of comparing the potential difference of the input signals with this threshold value S12C. This threshold value S12C can be used to prevent chattering at the zero cross timing.

The commutation control unit 16 generates a phase selection signal S16D denoting the phase at which the motor current and time change in the motor current go to zero at a particular time, and outputs to the second phase-selection unit 20. The U-phase motor terminal voltage SU of the motor terminal QU, the V-phase motor terminal voltage SV of the motor terminal QV, the W-phase motor terminal voltage SW of the motor terminal QW, and the neutral point voltage SCN of the neutral point CN are also input to the second phase-selection unit 20. The second phase-selection unit 20 selects one of the motor terminal voltages SU, SV, SW based on the phase selection signal S16D, and outputs the selected terminal voltage with the neutral point voltage SCN to the comparator 23.

The comparator 23 compares the difference of the selected motor terminal voltage and the neutral point voltage SCN, that is, the absolute value of the back-EMF voltage of the selected motor terminal, with the threshold value S12C. If this absolute value is greater than or equal to the threshold value S12C, the comparator 23 generates and outputs a rotor phase signal S23 denoting the rotor phase to the commutation control unit 16. Based on this rotor phase signal S23, the commutation control unit 16 maintains continuous control of the correct commutation timing. As described above the comparator 23 compares the input motor terminal voltage and the neutral point voltage SCN by applying the offset of threshold value S12C to generate the rotor phase signal S23. More generally, this comparison detects the back-EMF voltage denoting the difference between the input motor terminal voltage and the neutral point voltage SCN, and compares the result of this comparison with the threshold value S12C to generate the rotor phase signal S23. This rotor phase signal S23 can be binary signal denoting the comparison result or it can be the detected back-EMF voltage. Furthermore, instead of using the threshold setting unit 12 to apply an offset to the comparator 23, a latch can be disposed to the commutation control unit 16 to latch the rotor phase signal S23 and prevent chattering. The second phase-selection unit 20 can also be used in the search and start mode and is not limited to use in the back-EMF voltage mode.

The search and start mode is described next. The motor drive device according to this embodiment of the invention operates in the search and start mode until the rotor is turning at a very low speed immediately after starting from a stop. Starting and acceleration alternate in the search and start mode by alternately repeating a search step and a starting step. The search step is also called a search state and the starting step is also called a starting state. In the search step the commutation control unit 16 selects two of the three phases and the drive unit 2 applies a search pulse to these two phases. The search pulse JU, JV, JW is also called a "search pulse current" or a "search current JU, JV, JW." The search pulse JU, JV, JW is applied for a very short time or at a very low level not causing the rotor to move in order to detect the rotor position. After determining the rotor position, a starting pulse is applied in the starting step to apply a starting torque to the appropriate stator phase. This starting pulse is also called a "starting pulse current" or "starting current."

FIG. 1A describes the arrangement and operation of components used in the search and start mode. The commutation control unit 16 generates a phase selection signal S16G denoting the phase for which the motor current and time change in the current go to zero when two phases are energized, that is, the non-energized phase, and outputs the phase selection signal S16G to the first phase-selection unit 24. The U-phase motor terminal voltage SU, V-phase motor terminal voltage SV, W-phase motor terminal voltage SW, and pseudo-neutral-point voltage SPN are also input to the first phase-selection unit 24. Based on the phase selection signal S16G, the first phase-selection unit 24 selects one of the motor terminal voltages SU, SV, and SW, and outputs the selected motor terminal voltage with the pseudo-neutral-point voltage SPN to the comparators 21 and 22.

The commutation control unit 16 outputs the threshold value control signal S16E that controls the two predetermined threshold values S12A and S12B of the terminal difference voltage detection unit 13 to the threshold setting unit 12. Based on this threshold value control signal S16E, the threshold setting unit 12 applies a predetermined positive threshold value S12A to the comparator 21 and a predetermined negative threshold value S12B to the comparator 22. For brevity in this embodiment the absolute values of the positive threshold value S12A and the negative threshold value S12B are equal but they could be different. Alternatively, the terminal difference voltage detection unit 13 can be composed of a single comparator, the threshold setting unit 12 can apply the positive threshold value S12A and negative threshold value S12B to the terminal difference voltage detection unit 13, and the terminal difference voltage detection unit 13 can appropriately switch between and use the supplied threshold value S12A and threshold value S12B. Further alternatively, the threshold setting unit 12 can supply the positive threshold value S12A and negative threshold value S12B in a single time-division stream to the terminal difference voltage detection unit 13.

One of the motor terminal voltages SU, SV, SW and the pseudo-neutral-point voltage SPN are input to the comparators 21 and 22. The comparator 21 generates and outputs over-threshold value signal S21 to the commutation control unit 16 if the difference between the motor terminal voltage SU, SV, SW and the pseudo-neutral-point voltage SPN is greater than or equal to the positive threshold value S12A. If the difference between the motor terminal voltage SU, SV, SW and pseudo-neutral-point voltage SPN is less than or equal to threshold value S12B, the comparator 22 generates and outputs over-threshold value signal S22 to the commutation control unit 16.

The difference voltage between the motor terminal voltage SU, SV, SW and pseudo-neutral-point voltage SPN is called the terminal difference voltage. More specifically, the difference voltage between the U-phase motor terminal voltage SU and the pseudo-neutral-point voltage SPN is called the U-phase terminal difference voltage, the difference voltage between the V-phase motor terminal voltage SV and the pseudo-neutral-point voltage SPN is called the V-phase terminal difference voltage, and the difference voltage between the W-phase motor terminal voltage SW and the pseudo-neutral-point voltage SPN is called the W-phase terminal difference voltage. The U-phase terminal difference voltage, the V-phase terminal difference voltage, and the W-phase terminal difference voltage are generally referred to as the terminal difference voltage. If the polarity of the difference between the terminal difference voltage and a particular threshold value S12A, S12B is the same as the polarity of the terminal difference voltage, the terminal difference voltage detection unit 13 generates and outputs over-threshold value signal S21 or S22 to the commutation control unit 16. The rotor position is thus detected and the search step ends.

This over-threshold value signal is also called a "detection result signal." As noted above, the comparator 21 applies an offset of threshold value S12A to compare the motor terminal voltage SU, SV, SW and pseudo-neutral-point voltage SPN and generate the over-threshold value signal S21. The comparator 22 operates similarly. In more general terms, this comparison detects the terminal difference voltage denoting the difference between the input neutral point voltage SCN and pseudo-neutral-point voltage SPN, compares this detection result with the threshold values S12A and S12B, and generates the over-threshold value signal S21. This over-threshold value signal S21 can be two-valued signal denoting the comparison result, or the detected terminal difference voltage.

The operation relating to the search step is described next.

Figure 2:
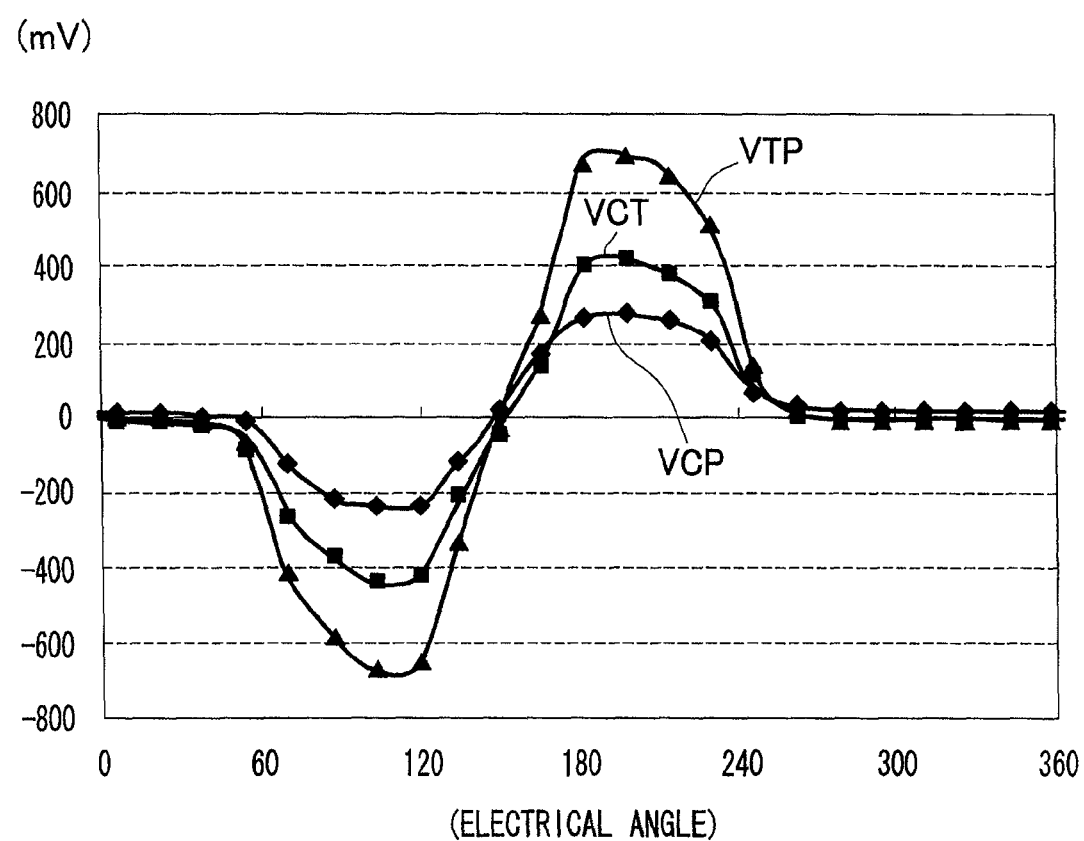
FIG. 2 is a waveform diagram of the terminal difference voltage to the search pulse in the first embodiment of the invention.

FIG. 2 is a waveform diagram acquired by measuring the terminal difference voltage of the non-energized phase when the search pulse is applied to two energized phases in a 3-phase brushless motor 1A. The y-axis shows the voltage referenced to 0 mV. The x-axis denotes the relative position of the rotor referenced to the position at which the rotor locks (150 degrees) when a steady-state current is supplied from the motor terminal QU to the motor terminal QV. The relative position of the rotor at this time is called simply the rotor position. The reference for the x-axis is the same throughout all the figures showing the position in degrees, i.e., in FIGS. 3A and 3B, FIGS. 4A, 4B, 4C, 4D, and 4E, FIG. 5, FIG. 6, FIGS. 7A, 7B, 7C, 7D, 7E, 7F, 7G, 7H, and 7I, FIG. 8, FIGS. 9A, 9B, 9C, 9D, and 9E, FIGS. 10A, 10B, 10C, 10D, and 10E, FIGS. 11A, 11B, 11C, 11D, and 11E, FIGS. 12A, 12B, 12C, 12D, and 12E, FIGS. 13A, 13B, 13C, 13D, and 13E, FIG. 14, FIG. 18, FIGS. 23A and 23B, FIGS. 24A and 24B, and FIG. 30. In this first embodiment of the invention the search pulse is applied by energizing two phases. In the example shown in FIG. 2 the search pulse is applied for a very short time or at a very low level not causing the rotor to move using the U-phase as the source phase and the V-phase as the sink phase.

The source phase is the phase in which the motor current flows from the drive unit 2 to the motor winding, and the sink phase is the phase in which the motor current flows from the motor winding to the drive unit 2. The source current is the motor current in the source phase, and the sink current is the motor current in the sink phase.

In FIG. 2 VCT is the winding end voltage of the non-energized phase when two phases are energized, and as described above is effectively the same as the induction voltage. The winding end voltage VCT of the W-phase can be determined from equation 1.

$$VCT = (W\text{-phase motor terminal voltage } SW) - (\text{neutral point voltage } SCN) \qquad (1)$$

VCP is the neutral point difference voltage, which is the difference voltage between the neutral point voltage SCN and the pseudo-neutral-point voltage SPN. The neutral point difference voltage VCP can be determined from equation 2.

$$VCP = (\text{neutral point voltage } SCN) - (\text{pseudo-neutral-point voltage } SPN) \qquad (2)$$

VTP is the terminal difference voltage, which is the difference voltage between the motor terminal voltage of the non-energized phase when two phases are energized and the pseudo-neutral-point voltage SPN. The terminal difference voltage VTP of the W-phase can be determined from equation 3.

VTP=(W-phase motor terminal voltage SW)−(pseudo-neutral-point voltage SPN)

=(winding end voltage VCT)+(neutral point difference voltage VCP)    (3)

The terminal difference voltage VTP waveform is therefore substantially identical to the waveform of the winding end voltage VCT and neutral point difference voltage VCP added together. The terminal difference voltage VTP therefore affords higher amplitude and better noise resistance than the winding end voltage VCT or neutral point difference voltage VCP. The rotor position can also be detected over a wider electrical angle range, and angles at which the rotor position cannot be detected can be prevented. The rotor position can thus be reliably detected using the terminal difference voltage.

The control arrangement of the motor drive device including the drive signal generating unit 5 is a current drive arrangement in this first embodiment of the invention as shown in FIG. 1A, but the same effect can be achieved using a voltage drive arrangement. This first embodiment of the invention is also an arrangement for detecting the back-EMF voltage for sensorless control, but the same effect can be achieved using a power factor control arrangement for driving by matching the voltage command and drive current phase. The same effect can also be achieved using a sensorless control arrangement appropriate to sine wave drive as described by the sensorless control arrangement for detecting the current phase by using the ACCT and filter as taught in Japanese Laid-open Patent Publication No. H5-236789, the sensorless control arrangement for detecting the phase difference from the area of the drive current as taught in U.S. Pat. No. 6,388,416 (corresponding to Japanese Laid-open Patent Publication No. 2001-54295), the sensorless control arrangement for detecting the current phase from the presence of phase current as taught in Japanese Laid-open Patent Publication No. 2001-258287, the sensorless control arrangement for detecting the current phase from the terminal voltage when top/bottom switches are off as taught in Japanese Laid-open Patent Publication No. 2000-201495, or the sensorless control arrangement for detecting the current phase from the polarity of the drain-source voltage Vds of the output device as taught in U.S. Pat. No. 6,236,174, No. 6252362, and No. 6323610 (corresponding to Japanese Laid-open Patent Publication No. H11-341870).

Figure 3A:
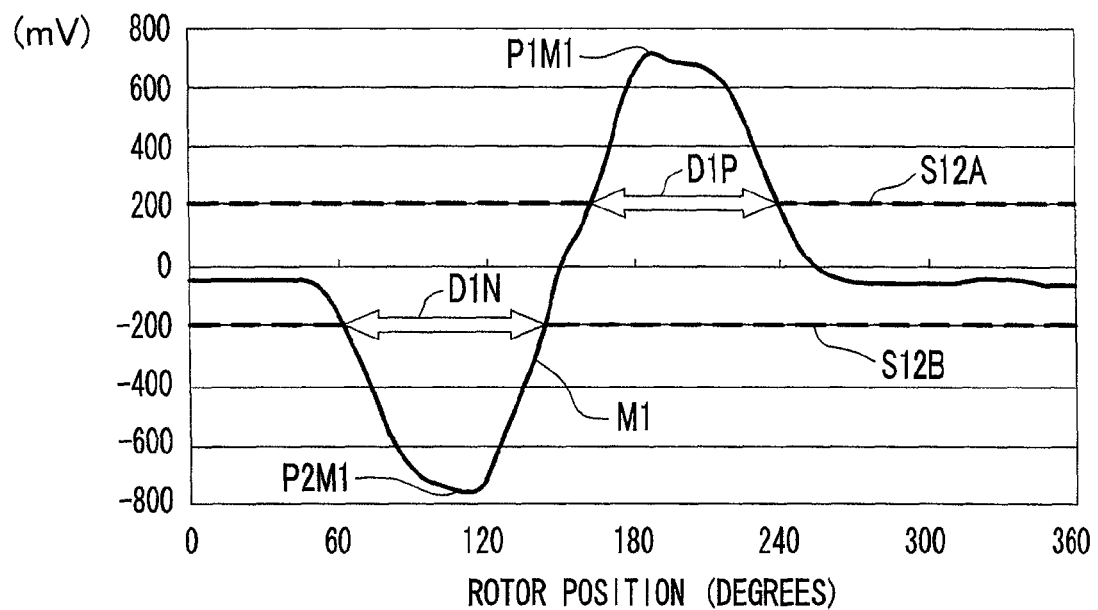
FIGS. 3A and 3B are waveform diagrams of the terminal difference voltage to the search pulse in the first embodiment of the invention.
Figure 3B:
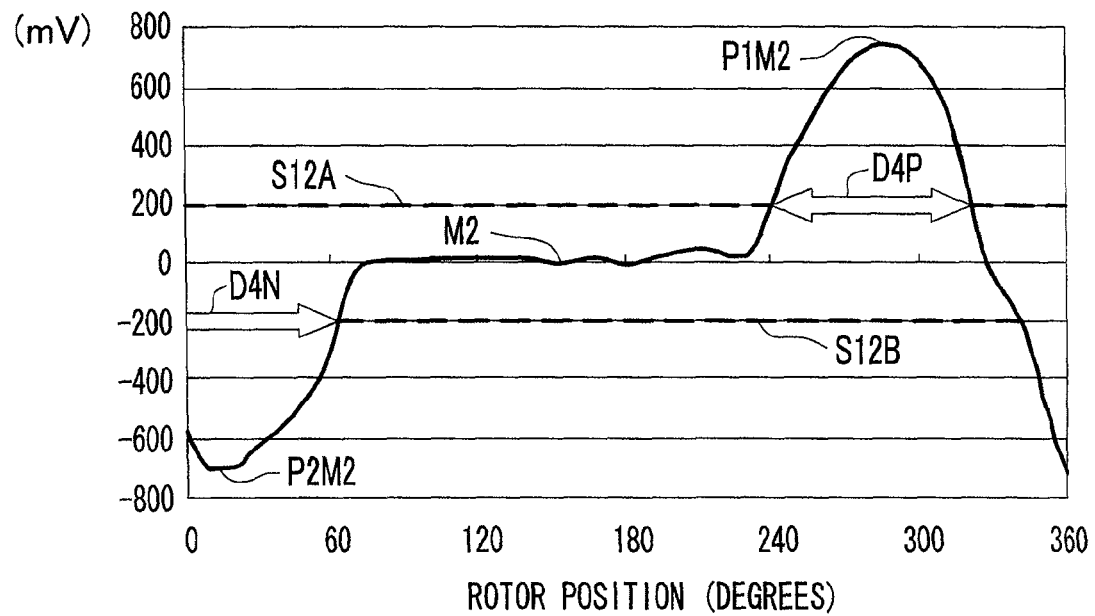

FIGS. 3A and 3B are waveform diagrams acquired by measuring the terminal difference voltage of the non-energized phase when the search pulse is applied to two energized phases. The y-axis denotes the terminal difference voltage of the non-energized phase referenced to the pseudo-neutral-point voltage SPN (0 mV). The x-axis shows the rotor position. In FIG. 3A the search pulse is applied for a very short time or at a very low level not causing the rotor to move using the U-phase as the source phase and the V-phase as the sink phase. The terminal difference voltage M1 is detected in the non-energized W phase. In FIG. 3B the search pulse is applied for a very short time or at a very low level not causing the rotor to move using the V-phase as the source phase and the U-phase as the sink phase. The terminal difference voltage M2 is detected in the non-energized W phase.

In FIGS. 3A and 3B S12A and S12B denote the positive threshold value and negative threshold value, respectively. When the U-phase is the source phase and the V-phase is the sink phase as shown in FIG. 3A, the flow of the current pulse is denoted U-->V. When the V-phase is the source phase and the U-phase is the sink phase as shown in FIG. 3B, current pulse flow is denoted V-->U. Likewise in all embodiments described herein, current pulse flow from the source phase to the sink phase is denoted (source phase)-->(sink phase) where the source phase and sink phase can be the U, V, or W phase. In addition, (source phase)-->(sink phase) indicates that the energized phases when the current pulse flows are the source phase and sink phase, and that the current pulse flows from the source phase to the sink phase. If the current pulse is the search pulse, the (source phase)-->(sink phase) is also called the "energized search phase."

In FIG. 3A terminal difference voltage M1 has peaks near 110 degrees and 190 degrees. The peak near 110 degrees is the minimum, and the peak near 190 degrees is the maximum. The terminal difference voltage M1 goes to 0 mV near 150 degrees, corresponding to the position at which the rotor locks when steady-state current flow U-->V. This angle is called the "center angle of the energized search phase." In FIG. 3B the terminal difference voltage M2 has peaks near 10 degrees and 290 degrees. The peak near 10 degrees is the minimum, and the peak near 290 degrees is the maximum. The center angle of the energized search phase is 330 degrees. Although not shown in the figures, the terminal difference voltage when the current pulse flows from the V-phase to the W-phase (denoted V-->W below), and the neutral point voltage when the current pulse flows from the W-phase to the U-phase (denoted W-->U below), are obtained by shifting terminal difference voltage M1 shown in FIG. 3A +120 degrees and −120 degrees, respectively. Furthermore, the terminal difference voltage when the current pulse flows from the W-phase to the V-phase (denoted W-->V) and the terminal difference voltage when the current flows from the U-phase to the W-phase (denoted U-->W) are obtained by shifting the terminal difference voltage M2 shown in FIG. 3B +120 degrees and −120 degrees, respectively.

The range of angles from one specific angle to another specific angle in the 360 degree range of the rotor position is called the "search angle range." In FIG. 3A the terminal difference voltage M1 is less than or equal to the negative threshold value S12B for only search angle range D1N, and is greater than or equal to the positive threshold value S12A for only search angle range D1P. In FIG. 3B, the terminal difference voltage M2 is less than or equal to the negative threshold value S12B for only search angle range D4N, and is greater than or equal to the positive threshold value S12A for only search angle range D4P. The angular difference between search angle ranges D1P, D1N, D4P, and D4N is substantially equal. This angular difference is called the "search angle difference DPN."

FIGS. 4A, 4B, 4C, 4D, and 4E are waveform diagrams showing the operation of the terminal difference voltage detection unit 13 with the same x-axis as in FIGS. 3A and 3B. FIGS. 4B and 4C are the results of comparing the terminal difference voltage M1 shown in FIG. 3A with the positive threshold value S12A and the negative threshold value S12B. FIGS. 4D and 4E are the results of comparing the terminal difference voltage M2 shown in FIG. 3B with the positive threshold value S12A and the negative threshold value S12B. The search angle ranges D1P, D1N, D4P, and D4N are the same as those shown in FIGS. 3A and 3B.

Signals in FIGS. 4B and 4D go high when the terminal difference voltage is greater than or equal to the positive threshold value S12A. Signals in FIGS. 4C and 4E go low when the terminal difference voltage is less than or equal to the negative threshold value S12B. Signals in FIGS. 4 B and 4D are high and signals in FIGS. 4C and 4E are low when the terminal difference voltage is greater than the specified threshold value S12A and S12B. Signals in FIGS. 4B and 4D are called the over-threshold value signal S21 when high, and signals in FIGS. 4C and 4E are called the over-threshold value signal S22 when low. The terminal difference voltage detection unit 13 thus generates and outputs either over-threshold value signal S21 or S22 to the commutation control unit 16 when the polarity of the difference between the terminal difference voltage and the specific threshold value S12A or S12B is the same polarity as the terminal difference voltage. The rotor position is thereby detected, and the search step ends.

Operation related to the starting step is described next.

Curves TU, TV, and TW in FIG. 4A denote the torque constant of the U-phase motor winding, the V-phase motor winding, and the W-phase motor winding. The torque constant is the ratio of torque output to the motor current flowing to the motor winding. When the torque constant of a particular phase is positive and source current is then supplied to the corresponding motor winding, torque is produced in the forward rotating direction and the rotor accelerates. If the torque constant of a particular phase is negative and sink current is supplied to the corresponding motor winding, torque is produced in the forward rotating direction and the rotor accelerates.

Referring to in FIG. 4B, for example, when the over-threshold value signal S21 is high the V-phase torque constant TV is positive and the W-phase torque constant TW is negative. Therefore, if a current pulse with a period or amplitude sufficient to start the rotor moving is supplied V-->W, torque is produced in the forward direction. Likewise, as shown in FIG. 4C, the U-phase torque constant TU is positive and the W-phase torque constant TW is negative while the over-threshold value signal S22 is low. A forward torque can therefore be produced by supplying a current pulse with a period or amplitude sufficient U-->W to start the rotor moving.

A forward torque can likewise be produced by supplying a current pulse with a period or amplitude sufficient to start the rotor moving W-->U while the over-threshold value signal S21 is high as shown in FIGS. 4D and W-->V while the over-threshold value signal S22 is low as shown in FIG. 4E. The energized phase in which the forward torque is produced while the rotor is stopped is called the "energized starting phase," and is shown as (source phase)-->(sink phase).

Using the same x-axis as in FIGS. 3A and 3B, FIGS. 4A, 4B, 4C, 4D, and 4E show when the rotor is locked at 150 degrees and steady-state current flows from the U-phase motor winding to the V-phase motor winding. Referring to FIG. 4A, this 150 degree position is where the U-phase torque constant TU and V-phase torque constant TV are both positive and equal in level. More specifically, when the U-phase torque constant TU and V-phase torque constant TV intersect at a positive level, source current flows to the positive U-phase torque constant TU, sink current flows to the V-phase torque constant TV, the source current and sink current are equal, and the rotor is therefore locked and does not move. As a result, the x-axis reference and the waveforms of the torque constants TU, TV, TW in FIG. 4A correspond. Also in FIG. 4A, the U-phase torque constant TU starts to rise in the forward direction from the 0 degree rotor position. The back-EMF voltage of the U-phase motor winding referenced to the neutral point voltage SCN also begins to rise in the forward direction from the 0 degree rotor position.

FIG. 5 is a table showing the relationship of each state to the energized search phase when two phases are energized. These states include the polarity of a specific threshold value in the terminal difference voltage detection unit 13, the rotor position at the absolute maximum or absolute minimum terminal difference voltage of the non-energized phase, and the energized starting phase.

In a three-phase motor, there are six different energized search phases using any two of phases U, V, and W. To drive the rotor forward in this first embodiment of the invention, the energized search phase switches sequentially in the order: U-->V (state F1), U-->W (state F2), V-->W (state F3), V-->U (state F4), W-->U (state F5), W-->V (state F6), U-->V (state F1) and so forth. This cyclical series in which the energized search phase rotates through six different states is called the "energized search phase cycle." Because the terminal difference voltage is detected in the non-energized phase, the terminal difference voltage is detected in the W-phase in state F1, in the V-phase in state F2, the U-phase in state F3, the W-phase in state F4, the V-phase in state F5, and the U-phase in state F6.

The two energized starting phases in states F1 to F6 are separated into energized starting phase cycle FA and energized starting phase cycle FB. The energized starting phases are separated to cycles FA and FB so that the rotor positions are equidistant in each energized starting phase cycle and the search angle range in each state F1 to F6 spans the full 360 degree electrical angle range with no gaps.

In state F1, when the energized search phase is set to U-->V and the over-threshold value signal S22 goes low, the rotor position is detected at the absolute minimum near 110 degrees and the energized starting phase is set to U-->W. When the over-threshold value signal S21 goes high, the rotor position is detected near 190 degrees and the energized starting phase is set to V-->W.

In state F2, when the energized search phase is set to U-->W and the over-threshold value signal S21 goes high, the rotor position is detected at the absolute maximum near 170 degrees and the energized starting phase is set to V-->W. When the over-threshold value signal S22 goes low, the rotor position is detected near 250 degrees and the energized starting phase is set to V-->U.

In state F3, when the energized search phase is set to V-->W and the over-threshold value signal S22 goes high, the rotor position is detected at the absolute minimum near 230 degrees and the energized starting phase is set to V-->U. When the over-threshold value signal S21 goes high, the rotor position is detected near 310 degrees and the energized starting phase is set to W-->U.

In state F4, when the energized search phase is set to V-->U and the over-threshold value signal S21 goes high, the rotor position is detected at the absolute maximum near 290 degrees and the energized starting phase is set to W-->U. When the over-threshold value signal S22 goes low, the rotor position is detected near 10 degrees and the energized starting phase is set to W-->V.

In state F5, when the energized search phase is set to W-->U and the over-threshold value signal S22 goes low, the rotor position is detected at the minimum value near 350 degrees and the energized starting phase is set to W-->V. When the over-threshold value signal S21 goes high, the rotor position is detected near 70 degrees and the energized starting phase is set to U-->V.

In state F6, when the energized search phase is set to W-->V and the over-threshold value signal S21 goes high, the rotor position is detected at the maximum value near 50 degrees and the energized starting phase is set to U-->V. When the over-threshold value signal S22 goes low, the rotor position is detected near 130 degrees and the energized starting phase is set to U-->W.

The rotor position at the absolute maximum and absolute minimum in the energized starting phase cycle FA is near 50 degrees, 110 degrees, 170 degrees, 230 degrees, 290 degrees, and 350 degrees, and the rotor position at the maximum and minimum peaks in the energized starting phase cycle FB is near 70 degrees, 130 degrees, 190 degrees, 250 degrees, 310 degrees, and 10 degrees. The maximum and minimum rotor positions are therefore at 60 degree intervals in both energized starting phase cycles FA and FB. However, if the desired maximum and minimum rotor positions are near 60 degrees, 120 degrees, 180 degrees, 240 degrees, 300 degrees, and 0 (360) degrees, the actual rotor positions are offset from the desired positions. The initial rotor position information used to find the rotor position in sensorless drive is offset slightly from the desired value but is sufficient for practical use. The energized search phase center angle is the average of the maximum and minimum rotor positions in the energized starting phase cycles FA and FB in each energized search phase, and is therefore 150 degrees, 210 degrees, 270 degrees, 330 degrees, 30 degrees, and 90 degrees in states F1 to F6. The center angles are thus also at 60 degree intervals.

The energized starting phase cycles FA and FB are thus phase cycles in which the energized starting phase loops through six states at 60 degree intervals. The sequence in which the phase changes is the same as the sequence in which the energized search phase cycles, and like the energized search phase cycle, the energized starting phases change in the direction causing the rotor to turn forward. The sequence in which the energized starting phase cycle FA changes is advanced one phase from the switching sequence of the energized search phase cycle. In addition, the sequence in which the energized starting phase cycle FB changes is advanced one phase from the switching sequence of the energized starting phase cycle FA. More specifically, the switching sequence of the energized starting phase cycle FB is advanced two phases from the sequence of the energized search phase cycle.

The search step detects the energized search phase where the absolute value of the terminal difference voltage is greater than or equal to a specific threshold value. In the starting step the energized starting phase is set one phase advanced to the energized search phase if the energized starting phase cycle is FA, and is set advanced two phases if the energized starting phase cycle is FB. The start pulse is then applied to this energized starting phase. As further described below, using two separate energized starting phase cycles FA and FB is meaningful when the immediately preceding energized starting phase is used as the energized search phase the second and subsequent times. More specifically, energized starting phase cycle FA is appropriate when the starting step causes the rotor position to change approximately 60 degrees, but when the rotor starts moving faster and the starting step causes the rotor position to move approximately 120 degrees, the energized starting phase cycle FB is appropriate. In either case, an energized search phase in which the rotor position is advanced from 60 degrees to 120 degrees can be used, and the rise of the search and start step can be accelerated.

In the case of energized starting phase cycle FA, the first starting step follows after the first search step, and the second search step uses the result of the first starting step. The second starting step then operates on the next energized starting phase in the energized starting phase cycle FA, and the third search step uses the result of the second starting step. By repeating this cycle the rotor position can be located in each of the six energized search phases and the energized starting phase can be set.

A single search pulse thus enables finding the rotor position in a wide 120-degree search angle range for positive and negative threshold values, and the probability of identifying the rotor position in a single search step is high. The rotor position can therefore be determined in a short time in a special three-phase brushless motor, and the search step together with the following starting step can reliably start the motor.

Figure 6:
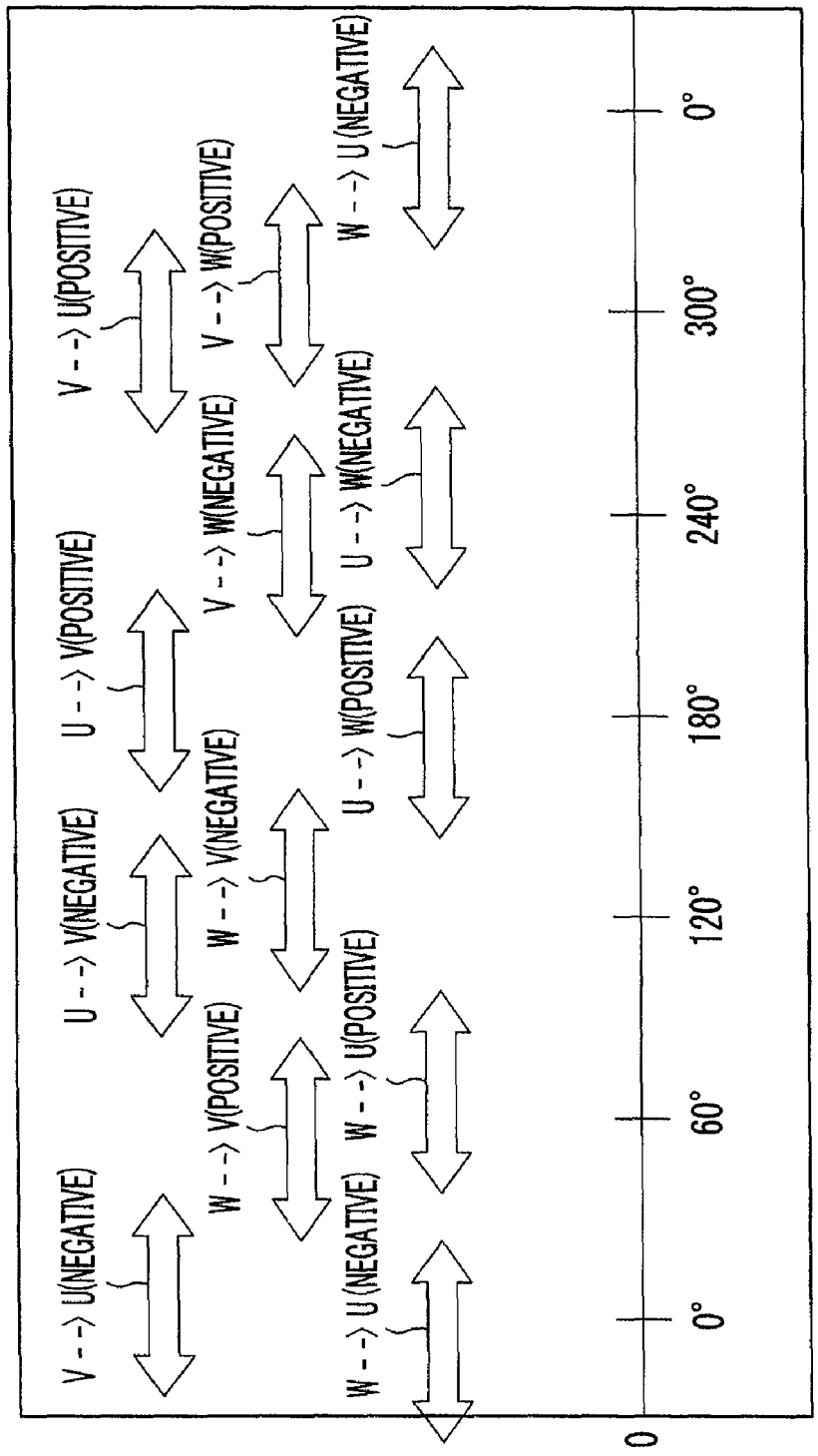
FIG. 6 is a chart describing the electrical angle range of the energized detection phase in the first embodiment of the invention.

FIG. 6 describes the search angle range of the energized search phase when two phases are energized.

U-->V (negative) denotes the search angle range in which the comparator 22 detects the W-phase terminal difference voltage and the rotor position is detected based on the negative threshold value S12B in the energized search phase applying a current pulse from the U-phase to the V-phase. U-->V (positive) denotes the search angle range in which the comparator 21 detects the W-phase terminal difference voltage and the rotor position is detected based on the positive threshold value S12A in the energized search phase applying a current pulse from the U-phase to the V-phase. V-->U (positive), V-->U (negative), V-->W (positive), V-->W (negative), W-->V (positive), W-->V (negative), W-->U (positive), W-->U (negative), U-->W (positive), U-->W (negative), are the same.

Operation in the search and start mode with two energized phases is described next with reference FIG. 1A, FIGS. 3A and 3B, and FIG. 5 using the search sequence (U-->V, V-->U, V-->W, W-->V, W-->U, U-->W) shown in FIG. 6.

The motor drive device in this embodiment of the invention operates in the search and start mode from when the rotor is stopped until the rotor is turning at a very low speed immediately after starting. This search and start mode starts and accelerates the rotor by alternately repeating the search step and the starting step. In the search step the commutation control unit 16 selects an energized search phase combining two of the three phases, and the drive unit 2 applies the search pulse to the selected energized search phase. The search pulse is applied for a very short time or at a very low level not causing the rotor to move in order to detect the rotor position. After the rotor position is determined, the starting step applies a starting pulse to the appropriate energized starting phase to applying starting torque.

In state F1 in FIG. 5 the energized search phase is U-->V and the commutation control unit 16 turns on the high potential side switch Q1 and low potential side switch Q5 in FIG. 1A. As a result, the search pulse flows from the high potential power supply 3 to the U-phase high potential side switch Q1, U-phase motor winding LU, neutral point CN, V-phase motor winding LV, low potential side switch Q5, current detection resistance RD, and to low potential power supply 4. The search pulse thus flows from the U-phase motor winding LU to the V-phase motor winding LV. The W-phase motor terminal difference voltage occurs at this time between the W-phase motor terminal QW and the pseudo-neutral point PN. The terminal difference voltage M1 in FIG. 3A is the W-phase motor terminal difference voltage measured at the rotor position.

In the search and start mode the threshold setting unit 12 applies a predetermined positive threshold value S12A to the comparator 21 and a predetermined negative threshold value S12B to the comparator 22. FIG. 3A and FIG. 3B show the positive threshold value S12A and negative threshold value S12B. The W-phase motor terminal difference voltage is input to the non-inverted input terminal of the comparator 21 and comparator 22, and the pseudo-neutral-point voltage SPN is input to the inverted input terminal.

In this case if the over-threshold value signal S21 is high, the rotor position is detected as near 190 degrees as shown in FIG. 3A, but if the over-threshold value signal S22 is low, the rotor position is detected as near 110 degrees as also shown in FIG. 3A. If the over-threshold value signal S21 and over-threshold value signal S22 are low and high, respectively, the rotor is determined to be in a different angular range.

The energized starting phase cycle FB is then used for a rotor near 190 degrees, and switches Q2 and Q6 are turned on because the energized starting phase is V-->W. The starting pulse therefore flows from the V-phase motor winding LV to the W-phase motor winding LW and good starting torque can be applied. The energized starting phase cycle FA is then used for the rotor near 110 degrees, and because the energized starting phase is U-->W, switches Q1 and Q6 go on. As a result, the starting pulse flows from the U-phase motor winding LU to the W-phase motor winding LW, and good starting torque can be applied.

In state F4 in FIGS. 4A, 4B, 4C, 4D, and 4E the energized search phase is V-->U and the commutation control unit 16 therefore turns switches Q2 and Q4 on. The search pulse flows from the high potential power supply 3 to the high potential side switch Q2, V-phase motor winding LV, neutral point CN, U-phase motor winding LU, low potential side switch Q4, current detection resistance RD, and to the low potential power supply 4. More specifically, the search pulse flows form the V-phase motor winding LV to the U-phase motor winding LU. The W-phase motor terminal difference voltage occurs at this time between the W-phase motor terminal QW and the pseudo-neutral point PN. The terminal difference voltage M2 in FIG. 3B is the W-phase motor terminal difference voltage measured at the rotor position. The W-phase motor terminal difference voltage is input to the non-inverted input terminals of the comparator 21 and the comparator 22, and the pseudo-neutral-point voltage SPN is input to the inverted input terminal.

In this case if the over-threshold value signal S21 is high the rotor position is detected as near 290 degrees as shown in FIG. 3B. If the over-threshold value signal S22 is low, the rotor position is detected as near 10 degrees as shown in FIG. 3B. If the over-threshold value signal S21 and over-threshold value signal S22 are low and high, respectively, the rotor is determined to be in a different angular range and the search step repeats using a phase combination other than the U-phase and V-phase.

The energized starting phase cycle FA is then used for the rotor in the 290 degree position, and switches Q3 and Q4 are on because the energized starting phase is W-->U. The starting pulse thus flow from the W-phase motor winding LW to the U-phase motor winding LU and good starting torque can be applied. The energized starting phase cycle FB is used when the rotor is near 10 degrees, and switches Q3 and Q5 go on because the energized starting phase is W-->V. The starting pulse therefore flow from the W-phase motor winding LW to the V-phase motor winding LV and good starting torque can be applied.

In state F3 in FIG. 5 the energized search phase is V-->W and the commutation control unit 16 therefore turns switches Q2 and Q6 on. The U-phase motor terminal difference voltage occurs between the U-phase motor terminal QU and the pseudo-neutral point PN at this time. The U-phase motor terminal difference voltage is input the non-inverted input terminals of the comparator 21 and the comparator 22, and the pseudo-neutral-point voltage SPN is input to the inverted input terminals. The search pulse therefore flow from the V-phase motor winding LV to the W-phase motor winding LW. If the over-threshold value signal S21 is high in this case the rotor position is detected as near 310 degrees. If the over-threshold value signal S22 is low, the rotor position is detected as near 230 degrees. If the over-threshold value signal S21 and over-threshold value signal S22 are low and high, respectively, the rotor is determined to be in a different angular range.

The energized starting phase cycle FB is used when the rotor is near 310 degrees, and switches Q3 and Q4 go on because the energized starting phase is W-->U. The starting pulse therefore goes from the W-phase motor winding LW to the U-phase motor winding LU and good starting torque can be applied. The energized starting phase cycle FA is used when the rotor is near the 230 degree position, and switches Q2 and Q4 are on because the energized starting phase is V-->U. The starting pulse therefore flows from the V-phase motor winding LV to the U-phase motor winding LU, and good starting torque can be applied.

In state F6 in FIG. 5 the commutation control unit 16 turns the switches Q3 and Q5 on because the energized search phase is W-->V. The search pulse thus flows from the W-phase motor winding LW to the V-phase motor winding LV. The U-phase motor terminal difference voltage occurs between the motor terminal QU of the non-energized U-phase and the pseudo-neutral point PN. The U-phase motor terminal difference voltage is input to the non-inverted input terminal of the comparator 21 and the comparator 22, and the pseudo-neutral-point voltage SPN is input to the inverted input terminal. If the over-threshold value signal S21 is high in this case, the rotor position is detected as near 50 degrees. If the over-threshold value signal S22 is low, the rotor position is detected as near 130 degrees. If the over-threshold value signal S21 and over-threshold value signal S22 are low and high, respectively, the rotor is determined to be in a different angular range, and the search step repeats using a phase combination other than the U-phase and V-phase and the V-phase and W-phase, that is, using the W-phase and U-phase.

The energized starting phase cycle FA is used when the rotor is near 50 degrees, and switches Q1 and Q5 turn on because the energized starting phase is U-->V. The starting pulse therefore flow from the U-phase motor winding LU to the V-phase motor winding LV, and good starting torque can be applied. When the rotor is near 130 degrees, the energized starting phase cycle FB is used and switches Q1 and Q6 are on because the energized starting phase is U-->W. The starting pulse therefore flows from the U-phase motor winding LU to the W-phase motor winding LW and good starting torque can be applied.

In state F5 in FIG. 5 the commutation control unit 16 turns the switches Q3 and Q4 on because the energized search phase is W-->U. The search pulse therefore flows from the W-phase motor winding LW to the U-phase motor winding LU. The V-phase motor terminal difference voltage occurs between the pseudo-neutral point PN and the motor terminal QV of the non-energized V-phase at this time. The V-phase motor terminal difference voltage is input to the non-inverted input terminal of the comparator 21 and the comparator 22, and the pseudo-neutral-point voltage SPN is input to the inverted input terminal. If the over-threshold value signal S21 is high in this case, the rotor position is detected as near 70 degrees. If the over-threshold value signal S22 is low, the rotor position is detected as near 350 degrees. If the over-threshold value signal S21 and over-threshold value signal S22 are low and high, respectively, the rotor is determined to be in a different angular range.

When the rotor is near 70 degrees the energized starting phase cycle FB is used, and switches Q1 and Q5 are on because the energized starting phase is U-->V. The starting pulse therefore flows from the U-phase motor winding LU to the V-phase motor winding LV, and good starting torque can be applied. When the rotor is near 350 degrees the energized starting phase cycle FA is used and switches Q3 and Q5 are on because the energized starting phase is W-->V. The starting pulse therefore flows from the W-phase motor winding LW to the V-phase motor winding LV, and good starting torque can be applied.

In state F2 in FIG. 5 the commutation control unit 16 turns the switches Q1 and Q6 on because the energized search phase is U-->W. The search pulse thus flows from the U-phase motor winding LU to the W-phase motor winding LW. The V-phase motor terminal difference voltage occurs between the pseudo-neutral point PN and the motor terminal QV of the non-energized V-phase at this time. The V-phase motor terminal difference voltage is input to the non-inverted input terminal of the comparator 21 and the comparator 22, and the pseudo-neutral-point voltage SPN is input to the inverted input terminal. If the over-threshold value signal S21 is high, the rotor position is detected as near 170 degrees. If the over-threshold value signal S22 is low, the rotor position is detected as near 250 degrees. If the over-threshold value signal S21 and over-threshold value signal S22 are low and high, respectively, the rotor is determined to be in a different angular range, and the search step repeats using a phase combination other than the W-phase and U-phase.

When the rotor is near 170 degrees, the energized starting phase cycle FA is used and switches Q2 and Q6 are on because the energized starting phase is V-->W. The starting pulse thus flows from the V-phase motor winding LV to the W-phase motor winding LW, and good starting torque can be applied. The energized starting phase cycle FB is used for the rotor near the 250 degree position, and switches Q2 and Q4 are on because the energized starting phase is V-->U. The starting pulse thus flows from the V-phase motor winding LV to the U-phase motor winding LU, and good starting torque can be applied.

The six energized search phases including the applied polarity of the three-phase motor, or the twelve search angle ranges considering the positive and negative threshold values, are described above, but it will be apparent that the rotor position can be sufficiently detected from the terminal difference voltage when the search pulse is applied in these six energized search phases.

The drive signal S16C corresponding to the energized search phase is called the search drive signal S16C, and the drive signal S16C corresponding to the energized starting phase is called the starting drive signal S16C. In the search step the drive signal generating unit 5 generates the search drive signal S16C based on the energized search phase, and the drive unit 2 generates the search current JU, JV, JW based on the search drive signal S16C. In the starting step the drive signal generating unit 5 generates the starting drive signal S16C based on the energized starting phase, and the drive unit 2 generates the starting current based on the starting drive signal S16C. In the back-EMF voltage mode the drive signal generating unit 5 generates the normal drive signal S16C based on the energized phase, and the drive unit 2 generates the drive current based on the normal drive signal S16C. The search drive signal, the starting drive signal, and the normal drive signal are collectively referred to as simply drive signals.

Figure 8:
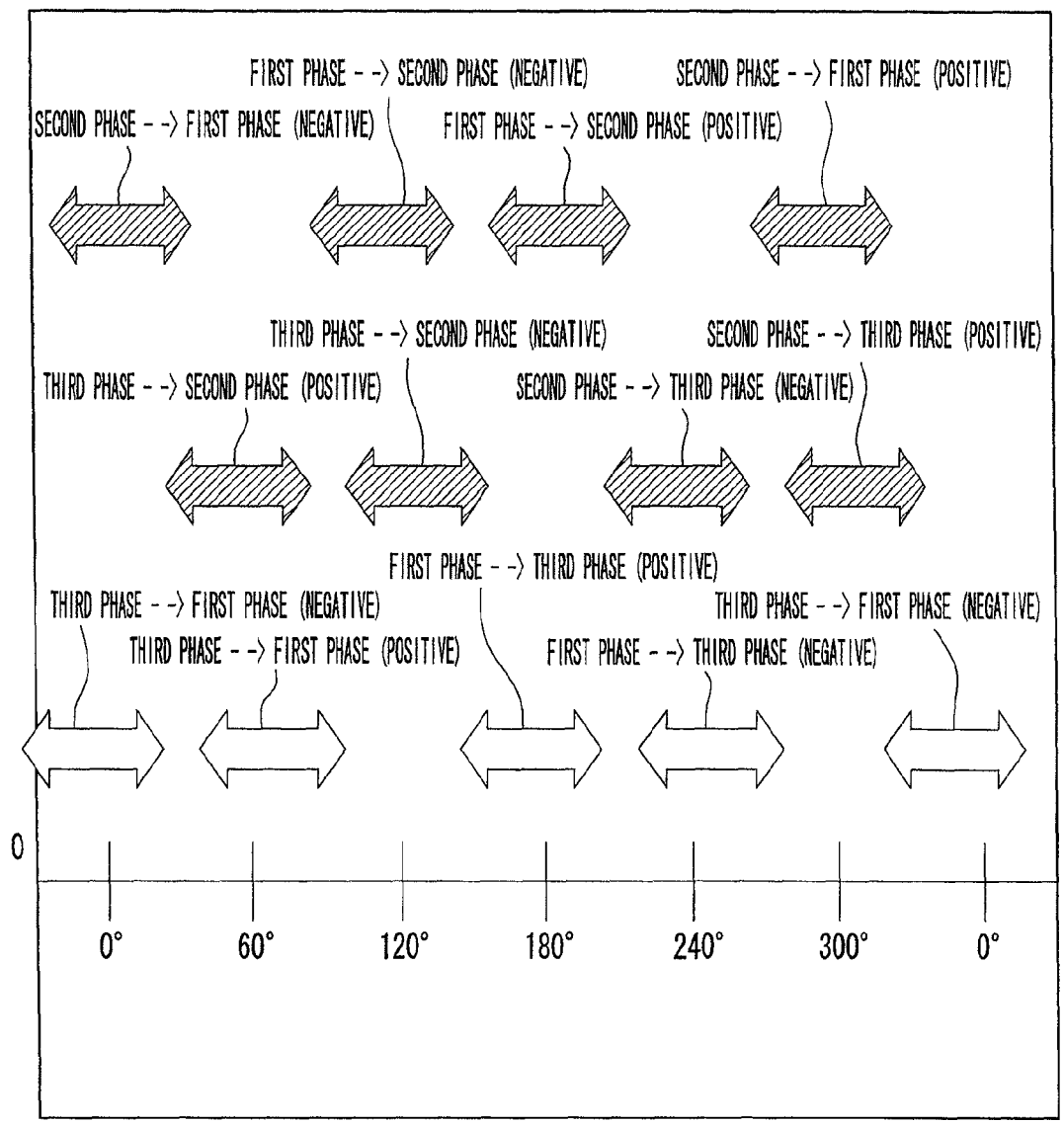
FIG. 8 is a chart describing the electrical angle range of the energized detection phase for phase 1, phase 2, and phase 3 in the first embodiment of the invention.

FIG. 8 generalizes the U-phase, V-phase, and W-phase shown in FIG. 6 as a first phase, second phase, and third phase. In this case the first phase denotes any one phase of the U-phase, V-phase, and W-phase group, the second phase denotes any one phase other than the first phase in the U-phase, V-phase, and W-phase group, and the third phase denotes the remaining phase in the U-phase, V-phase, and W-phase group other than the first phase and second phase. For example, the U-phase is the first phase, the V-phase is the second phase, and the W-phase is the third phase, then the first phase-->second phase (positive) corresponds to U-->V (positive), the second phase-->third phase (positive) corresponds to V-->W (positive), the third phase-->first phase (positive) corresponds to W-->U (positive), the first phase-->second phase (negative) corresponds to U-->V (negative), the second phase-->third phase (negative) corresponds to V-->W (negative), and the third phase-->first phase (negative) corresponds to W-->U (negative). In addition, U-->V (positive)/(negative) denotes U-->V (positive) and U-->V (negative). The same abbreviations are used for the other energized search phases. As will be known from FIG. 6 and FIG. 8, applying the search pulse to all six energized search phases is not required.

In FIG. 6 the energized search phases are grouped into three search conditions 1A, 2A, and 3A as follow.

(1A) U-->V (positive)/(negative), V-->U (positive)/(negative)

(2A) V-->W (positive)/(negative), W-->V (positive)/(negative)

(3A) W-->U (positive)/(negative), U-->W (positive)/(negative)

FIG. 8 similarly groups the energized search phases into three generalized search conditions 1B, 2B, 3B as follow.

(1B) first phase-->second phase (positive)/(negative) second phase-->first phase (positive)/(negative)

(2B) second phase-->third phase (positive)/(negative) third phase-->second phase (positive)/(negative)

(3B) third phase-->first phase (positive)/(negative) first phase-->third phase (positive)/(negative)

With both search conditions 1A, 2A, and 3A and search conditions 1B, 2B, and 3B the four search angle ranges based on two energized search phases have little overlap and are therefore efficient for finding the rotor position. In the first search step any one of the three search conditions is selected and the first search pulse is applied. If the rotor position cannot be detected, a second search pulse is applied by reversing the polarity of the same search condition. If the rotor position cannot be found another one of the three search conditions is selected to apply the third search pulse. If the rotor position cannot be found the polarity is again reversed using the same search condition to apply a fourth search pulse.

In the first search step, for example, search condition 1A is selected and the first search pulse is applied to energized search phase U-->V. If the rotor position is not detected the second search pulse is applied V-->U. If the rotor position is not detected again, search condition 2A is selected and the third search pulse is applied V-->W. If the rotor position is still not detected the fourth search pulse is applied W-->V.

After the first search step the first starting step is executed before proceeding to the second search step. The first search pulse applied in the second and subsequent search steps uses the energized search phase where the rotor position was detected in the first search step. If the rotor position is not detected, the second search pulse is applied to the energized search phase advanced 60 degrees.

For example, if the energized search phase in which the rotor position was detected in the first search step was U-->V, the first search pulse applied in the second search step using energized search phase U-->V. If the rotor position is not detected, the second search pulse is applied to energized search phase U-->W as if the rotor had advanced 60 degrees.

In FIG. 6 there is little overlap in the positions of the three energized search phases U-->V (positive)/(negative), V-->W (positive)/(negative), and W-->U (positive)/(negative). For any two of these energized search phases the search pulse is applied once for each phase and thus a total of twice consecutively. The likelihood of finding the rotor position using search conditions 1A, 2A, and 3A that apply a search pulse in both forward and reverse directions to a single terminal pair is therefore substantially equal for each search condition. If the third search pulse is applied in reverse polarity to one of the two energized search phases, and the fourth search pulse is applied in reverse polarity to the other of the two energized search phases, all rotor positions can therefore be determined.

For example, if the search pulse is applied four times in the sequence U-->V (positive)/(negative), V-->W (positive)/(negative), V-->U (positive)/(negative), and W-->V (positive)/(negative), the rotor position can be determined. The rotor position can also be detected by changing the sequence to U-->V (positive)/(negative), V-->W (positive)/(negative), W-->V (positive)/(negative), V-->U (positive)/(negative). In this case the V-phase is the sink phase when the first search pulse is applied and is the source phase when the second search pulse is applied. If the V-phase is the sink phase when the second search pulse is applied, the search angle range is U-->V (positive)/(negative) and W-->V (positive)/(negative) in FIG. 6 when the first current pulse and second current pulse are applied, the overlap is great, and the early detection rate of the rotor position drops.

There is also little overlap in the detection positions of the three energized search phases V-->U (positive)/(negative), W-->V (positive)/(negative), and U-->W (positive)/(negative). For any two of these energized search phases the search pulse can be applied once for each phase and thus a total of twice consecutively. The likelihood of finding the rotor position using search conditions 1A, 2A, and 3A that apply a search pulse in both forward and reverse directions to a single terminal pair is therefore substantially equal for each search condition. If the third search pulse is applied in reverse polarity to one of the two energized search phases, and the fourth search pulse is applied in reverse polarity to the other of the two energized search phases, all rotor positions can therefore be determined.

The search and start mode from the search step to the starting step is described next with reference primarily to FIG. 6 and also to FIG. 1A, FIGS. 3A and 3B, and FIG. 5.

The search and start mode is described using by way of example the search conditions shown in FIG. 8 as (1B) first phase-->second phase (positive)/(negative) second phase-->first phase (positive)/(negative)
(2B) second phase-->third phase (positive)/(negative) third phase-->second phase (positive)/(negative)

or (1A) U-->V (positive)/(negative), V-->U (positive)/(negative)
(2A) V-->W (positive)/(negative), W-->V (positive)/(negative)

as shown in FIG. 6.

The motor drive device according to this embodiment of the invention operates in the search and start mode until the rotor is turning at a very low speed immediately after starting from a stop. Starting and acceleration alternate in the search and start mode by alternately repeating a search step and a starting step. In the search step the commutation control unit 16 selects two of the three phases and the drive unit 2 applies a search pulse to these two phases. The search pulse is applied for a very short time or at a very low level not causing the rotor to move in order to detect the rotor position. After determining the rotor position, a starting pulse is applied to the desired stator phase in the starting step to apply a starting torque.

In state F1 in FIG. 5 the energized search phase is U-->V and the commutation control unit 16 turns on the high potential side switch Q1 and low potential side switch Q5 in FIG. 1A to flow the search pulse from the high potential power supply 3 to the U-phase high potential side switch Q1, U-phase motor winding LU, neutral point CN, V-phase motor winding LV, low potential side switch Q5, current detection resistance RD, and to low potential power supply 4. The search pulse thus flows from the U-phase motor winding LU to the V-phase motor winding LV. The W-phase motor terminal difference voltage occurs between the pseudo-neutral point PN and the motor terminal QW of the non-energized W-phase at this time. The W-phase motor terminal difference voltage is input to the non-inverted input terminal of the comparator 21 and comparator 22, and the pseudo-neutral-point voltage SPN is input to the inverted input terminal.

In this case if the over-threshold value signal S21 is high, the rotor position is detected as near 190 degrees. If the over-threshold value signal S22 is low, the rotor position is detected as near 110 degrees. If the over-threshold value signal S21 and over-threshold value signal S22 are low and high, respectively, the rotor is determined to be in a different angular range.

The energized starting phase cycle FB is then used for a rotor near 190 degrees, and switches Q2 and Q6 are turned on because the energized starting phase is V-->W. The starting pulse therefore flows from the V-phase motor winding LV to the W-phase motor winding LW and good starting torque can be applied. The energized starting phase cycle FA is then used for the rotor near 110 degrees, and because the energized starting phase is U-->W, switches Q1 and Q6 go on. As a result, the starting pulse flows from the U-phase motor winding LU to the W-phase motor winding LW, and good starting torque can be applied.

In state F4 in FIG. 5 the energized search phase is V-->U and the commutation control unit 16 therefore turns switches Q2 and Q4 on. The search pulse flows from the high potential power supply 3 to the high potential side switch Q2, V-phase motor winding LV, neutral point CN, U-phase motor winding LU, low potential side switch Q4, current detection resistance RD, and to the low potential power supply 4. More specifically, the search pulse flows form the V-phase motor winding LV to the U-phase motor winding LU. The W-phase motor terminal difference voltage occurs between the pseudo-neutral point PN and the motor terminal QW of the non-energized W-phase at this time. The W-phase motor terminal difference voltage is input to the non-inverted input terminal of the comparator 21 and comparator 22, and the pseudo-neutral-point voltage SPN is input to the inverted input terminal.

In this case if the over-threshold value signal S21 is high the rotor position is detected as near 290 degrees. If the over-threshold value signal S22 is low, the rotor position is detected as near 10 degrees. If the over-threshold value signal S21 and over-threshold value signal S22 are low and high, respectively, the rotor is determined to be in a different angular range and the search step repeats using a phase combination other than the U-phase and V-phase.

The energized starting phase cycle FA is then used for the rotor in the 290 degree position, and switches Q3 and Q4 are on because the energized starting phase is W-->U. The starting pulse thus flow from the W-phase motor winding LW to the U-phase motor winding LU and good starting torque can be applied. The energized starting phase cycle FB is used when the rotor is near 10 degrees, and switches Q3 and Q5 go on because the energized starting phase is W-->V. The starting pulse therefore flow from the W-phase motor winding LW to the V-phase motor winding LV and good starting torque can be applied.

In state F3 in FIG. 5 the energized search phase is V-->W and the commutation control unit 16 therefore turns switches Q2 and Q6 on. The search pulse therefore flow from the V-phase motor winding LV to the W-phase motor winding LW. The U-phase motor terminal difference voltage occurs between the pseudo-neutral point PN and the motor terminal QU of the non-energized U-phase at this time. The U-phase motor terminal difference voltage is input to the non-inverted input terminal of the comparator 21 and comparator 22, and the pseudo-neutral-point voltage SPN is input to the inverted input terminal. If the over-threshold value signal S21 is high in this case the rotor position is detected as near 310 degrees. If the over-threshold value signal S22 is low, the rotor position is detected as near 230 degrees. If the over-threshold value signal S21 and over-threshold value signal S22 are low and high, respectively, the rotor is determined to be in a different angular range.

The energized starting phase cycle FB is used when the rotor is near 310 degrees, and switches Q3 and Q4 go on because the energized starting phase is W-->U. The starting pulse therefore flows from the W-phase motor winding LW to the U-phase motor winding LU and good starting torque can be applied. The energized starting phase cycle FA is used when the rotor is near the 230 degree position, and switches Q2 and Q4 are on because the energized starting phase is V-->U. The starting pulse therefore flows from the V-phase motor winding LV to the U-phase motor winding LU, and good starting torque can be applied.

In state F6 in FIG. 5 the commutation control unit 16 turns the switches Q3 and Q5 on because the energized search phase is W-->V. The search pulse thus flows from the W-phase motor winding LW to the V-phase motor winding LV. The U-phase motor terminal difference voltage occurs between the pseudo-neutral point PN and the motor terminal QU of the non-energized U-phase at this time. The U-phase motor terminal difference voltage is input to the non-inverted input terminal of the comparator 21 and comparator 22, and the pseudo-neutral-point voltage SPN is input to the inverted input terminal. If the over-threshold value signal S21 is high in this case, the rotor position is detected as near 50 degrees. If the over-threshold value signal S22 is low, the rotor position is detected as near 130 degrees. If the over-threshold value signal S21 and over-threshold value signal S22 are low and high, respectively, the rotor is determined to be in a different angular range, and the search step repeats using a phase combination other than the V-phase and W-phase.

The energized starting phase cycle FA is used when the rotor is near 50 degrees, and switches Q1 and Q5 turn on because the energized starting phase is U-->V. The starting pulse therefore flow from the U-phase motor winding LU to the V-phase motor winding LV, and good starting torque can be applied. When the rotor is near 130 degrees, the energized starting phase cycle FB is used and switches Q1 and Q6 are on because the energized starting phase is U-->W. The starting pulse therefore flows from the U-phase motor winding LU to the W-phase motor winding LW and good starting torque can be applied.

The four energized search phases including the applied polarity of the three-phase motor, or the eight search angle ranges considering the positive and negative threshold values, are described above, but it will be apparent that the rotor position can be sufficiently detected from the terminal difference voltage when the search pulse is applied in these four energized search phases.

The commutation control unit 16 generates the search drive signal based on the energized search phase, and turns a high potential switching device or low potential switching device on. The search drive signal that turns the high potential switching device on is called the "high-potential search drive signal," and the search drive signal that turns the low potential switching device on is called the "low-potential search drive signal."

The search step is described next.

Figure 25:
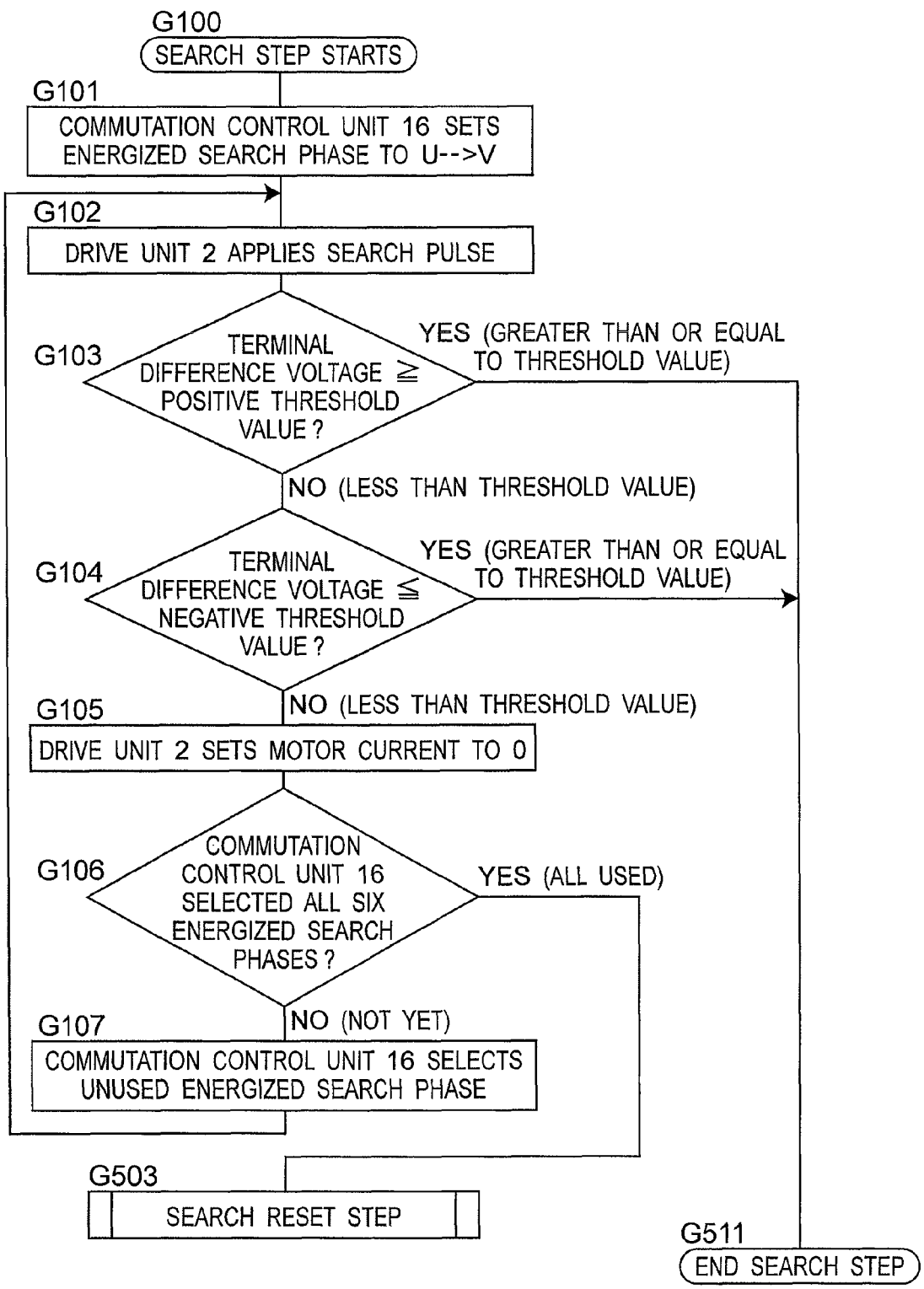
FIG. 25 is a flow chart of the detection step in the first embodiment of the invention.

FIG. 25 is a flow chart of the search step energizing two phases.

Operation of the search step starts in step G100 in FIG. 25.

In step G101 the commutation control unit 16 sets the energized search phase to U-->V. More specifically, the commutation control unit 16 sets the drive signal applied to the control pins of switches Q1 and Q5 to the operating state level.

In step G102 the drive unit 2 applies the search pulse. More specifically, the drive unit 2 turns the corresponding switches on based on the selected energized search phase.

In step G103 the terminal difference voltage detection unit 13 determines if the terminal difference voltage is greater than or equal to the positive threshold value S12A. If it is greater than or equal to the positive threshold value S12A the terminal difference voltage detection unit 13 outputs over-threshold value signal S21, skips to step G511, and the search step ends. If the terminal difference voltage is less than the positive threshold value S12A, control goes to step G104.

In step G104 the terminal difference voltage detection unit 13 determines if the terminal difference voltage is less than or equal to negative threshold value S12B. If it is less than or equal to the negative threshold value S12B, the terminal difference voltage detection unit 13 outputs the over-threshold value signal S22, skips to step G511, and the search step ends. If the terminal difference voltage is greater than the negative threshold value S12B, the search step continues and control goes to step G105.

In step G105 the drive unit 2 sets the motor current flowing to motor windings LU, LV, and LW to zero. More specifically, the commutation control unit 16 sets all six drive signals S16C to the non-operating state level, and the drive unit 2 turns switches Q1 to Q6 off.

Step G106 determines if all six energized search phases have been tried. If not, control goes to step G107. If yes, control goes to step G503.

In step G107 the commutation control unit 16 sets the energized search phase to a different phase combination and returns to step G102.

In step G503 the search reset step executes.

If the polarity of the difference between the terminal difference voltage and the predetermined threshold values S12A and S12B is the same as the polarity of the terminal difference voltage in the search step, over-threshold value signal S21 or S22 is output to the commutation control unit 16. The commutation control unit 16 stores the energized search phase that was set when the over-threshold value signal S21 or S22 was received, and sets the energized starting phase in the next starting step based on this energized search phase and FIG. 5. Note that the energized search phase is initially set to U-->V in step G101 in FIG. 25, but the search step can start from a different energized search phase. PWM drive is also not required, and linear drive can be used.

The search reset step G503 shown in FIG. 25 is described next with reference to the search step G502 and search reset step G503 shown in FIG. 29.

Figure 28A:
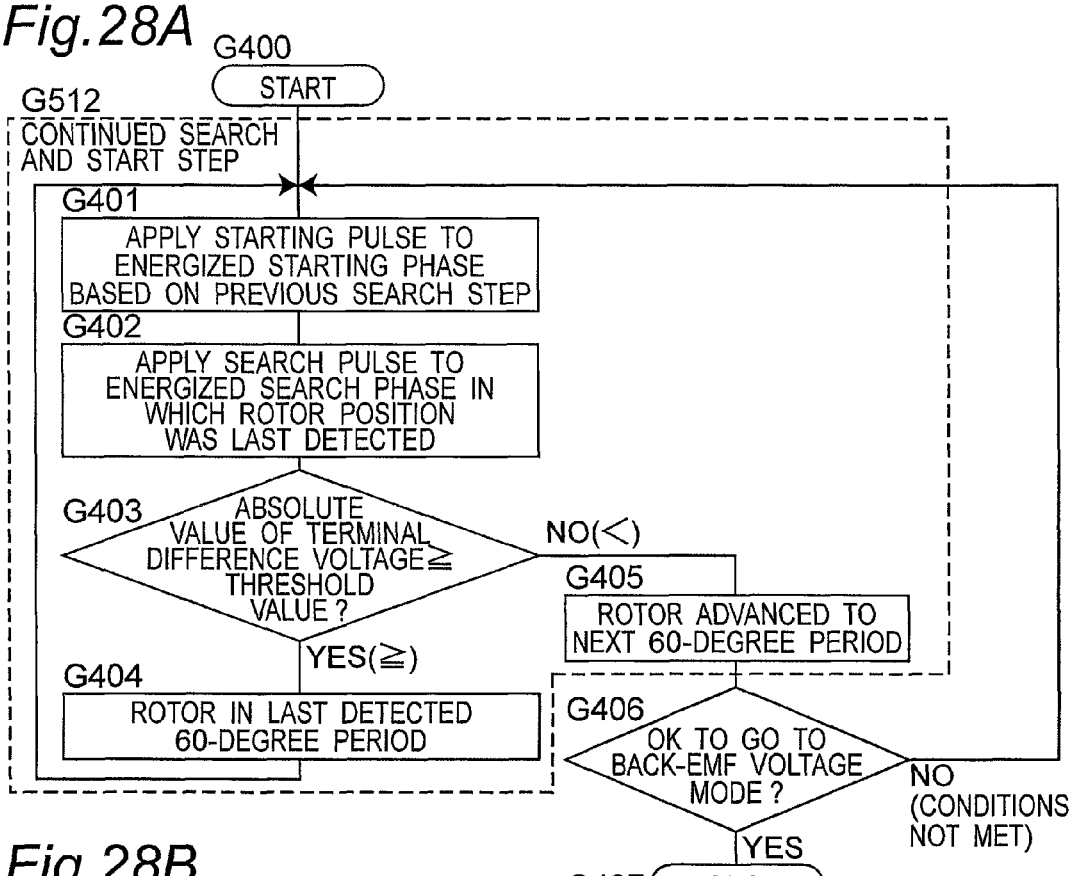
FIGS. 28A and 28B are flow charts of the subsequent search startup step in the first embodiment of the invention.
Figure 28B:
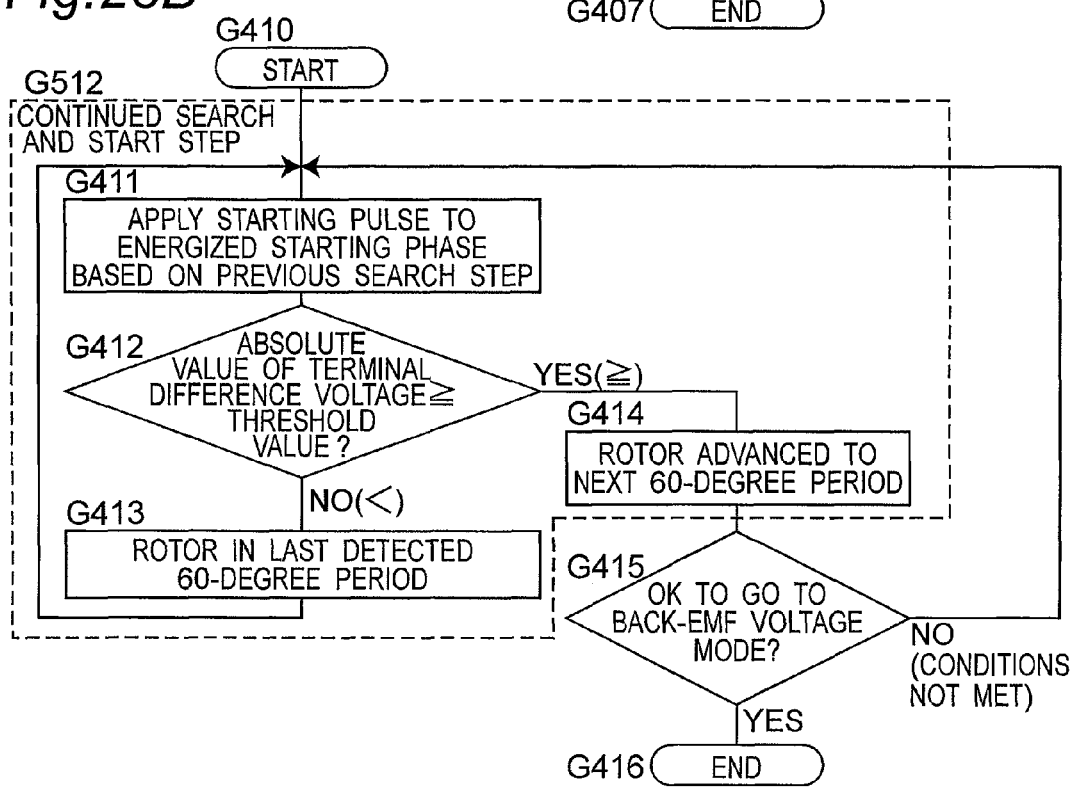

The search step is executed as step G502. If the polarity of the difference between the terminal difference voltage and a particular threshold value is the same as the polarity of the terminal difference voltage, the terminal difference voltage detection unit 13 outputs over-threshold value signal S21 or S22 and the search step ends in step G511. A continued search and start step G512 representing any search and start step after the first search step executes next. A flow chart of this continued search and start step G512 is shown in FIGS. 28A and 28B and described further below. If operation does not end even after the search step has been executed for all energized search phase groups in the search step G502, the search reset step G503 executes.

Figure 29:
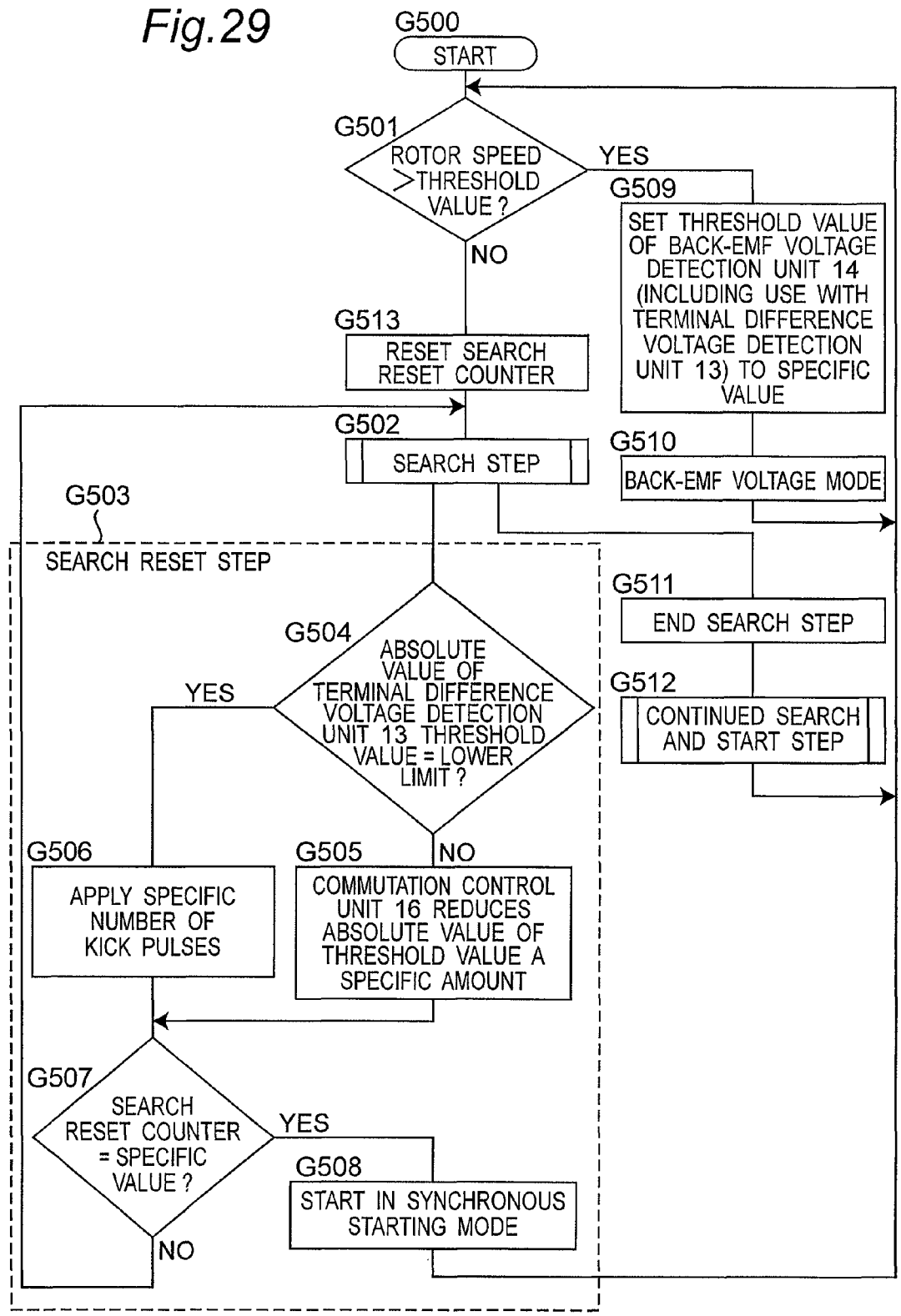
FIG. 29 is a flow chart of overall operation in the first embodiment of the invention.

If the absolute value of the terminal difference voltage does not become greater than or equal to the specified threshold value even though the search pulse has been applied to all energized search phases, the search reset step G503 in FIG. 29 determines that the specified threshold value is too high. The absolute value of the threshold value is therefore reduced by a predetermined amount.

Step G504 determines if the absolute value of the positive threshold value S12A and negative threshold value S12B of the terminal difference voltage detection unit 13 have gone to a defined lower limit. If not, control goes to step G505; if yes, control goes to step G506.

In step G505 the commutation control unit 16 reduces the absolute value of the threshold value by a predetermined amount by the threshold setting unit 12, and then goes to step G507.

If the absolute value of the terminal difference voltage does not exceed the specified threshold value even though the threshold value has been sufficiently reduced, step G506 determines that the rotor is positioned near the edge of the search angle range. One or more kick pulses are therefore applied to shift the initial relative position of the rotor to the stator and move the rotor position slightly. Control goes to step G507.

Step G507 determines if the search reset counter, which counts the number of times step G503 executes, has reached a predetermined count. If it has, control goes to step G508; if not, the search reset counter is incremented by one, the procedure loops to step G502, and the search step executes again.

In step G508 starting in the search and start mode is interrupted and starting continues in the synchronous starting mode.

Step G507 effectively limits the number of times the search step executes and thus prevents an infinite loop through the search step. In the synchronous starting mode a rotating field with a predetermined rotational speed is produced in the stator to start the motor. The startup speed is slower in the synchronous starting mode but the synchronous starting mode enables reliably starting the motor when the rotor position is unknown. The predetermined count of the search reset counter can be set to a desired value greater than or equal to 0 (zero). If the predetermined count is 0, control goes to step G508 without executing the search step G502 again.

As will be known from the above description, the operation shown in the flow chart in FIG. 25 executes the search step for all six energized search phases, and aborts as soon as the rotor position is detected. The flow chart shown in FIG. 25 can be used for the second and later search steps after the starting step executes, but is preferably used only for the first search step due to the efficiency concerns noted above.

FIG. 28A is a flow chart of operation in the search and start mode after the first starting step. The operation shown in the flow chart in FIG. 28A starts after the first search step ends in step G511 in FIG. 25.

Referring to FIG. 28A operation starts from step G400.

In step G401 the commutation control unit 16 sets the energized starting phase based on the energized search phase in the immediately preceding search step, and the drive unit 2 applies a starting pulse.

In step G402 the commutation control unit 16 sets the energized phase to the energized search phase in which the rotor position was previously detected, and the drive unit 2 applies a search pulse.

In step G403 the terminal difference voltage detection unit 13 determines if the absolute value of the terminal difference voltage is greater than or equal to the predetermined threshold value. If yes, control goes to step G404; if not, control goes to step G405.

Step G404 determines that the rotor is in the previously evaluated 60 degree period and operation therefore repeats from step G401.

Step G405 determines that the rotor commutated to the next 60 degree period and operation therefore goes to step G405.

Step G406 determines if the conditions for switching to the back-EMF voltage mode are met. More specifically, a mode switching signal is generated using at least one or more of the energized search phase, over-threshold value signals, energized starting phase, and rotor phase signal, and this mode switching signal is used to determine whether the switching conditions are met. If the conditions are met, control goes to step G407 and the search and start mode ends. If the conditions are not met, the procedure loops back to step G401.

Steps G401, G402, G403, G404, and G405 together constitute the continued search and start step G512 that represents the search and start step after the first search step executes.

FIG. 28B is a flow chart of operation after the first starting step in the search and start mode. This flow chart differs from the flow chart shown in FIG. 28A in that the starting pulse is also used as the search pulse. Operation shown in the flow chart in FIG. 28B starts after the first search step in FIG. 25 ends in step G511.

The operation described by the flow chart in FIG. 28B starts from step G410.

In step G411 the commutation control unit 16 sets the energized starting phase based on the energized search phase in the immediately preceding search step, and the drive unit 2 applies a starting pulse.

In step G412 the terminal difference voltage detection unit 13 determines if the absolute value of the terminal difference voltage is greater than or equal to the predetermined threshold value when the starting pulse is applied in step G411. If the absolute value is less than the threshold value, control goes to step G413; if greater, control goes to step G414.

Step G413 determines that the rotor is in the previously evaluated 60 degree period and operation therefore repeats from step G411.

Step G414 determines that the rotor commutated to the next 60 degree period and operation therefore goes to step G415.

Step G415 determines if the conditions for switching to the back-EMF voltage mode are met. More specifically, a mode switching signal is generated using at least one or more of the energized search phase, over-threshold value signals, energized starting phase, and rotor phase signal, and this mode switching signal is used to determine whether the switching conditions are met. If the conditions are met, control goes to step G416 and the search and start mode ends. If the conditions are not met, the procedure loops back to step G411.

Steps G411, G412, G413, and G414 together constitute the continued search and start step G512 that represents the search and start step after the first search step executes.

Because the operation described by the flow chart in FIG. 28B uses the starting pulse and the search pulse, step G402 for applying the search pulse in FIG. 28A can be omitted. Operation goes to the back-EMF voltage mode after the continued search and start step ends in step G407 or G416. The operation described by the flow chart in FIG. 28B enables faster starting as a result of using the starting pulse instead of the search pulse that does not contribute to torque.

Figure 26:
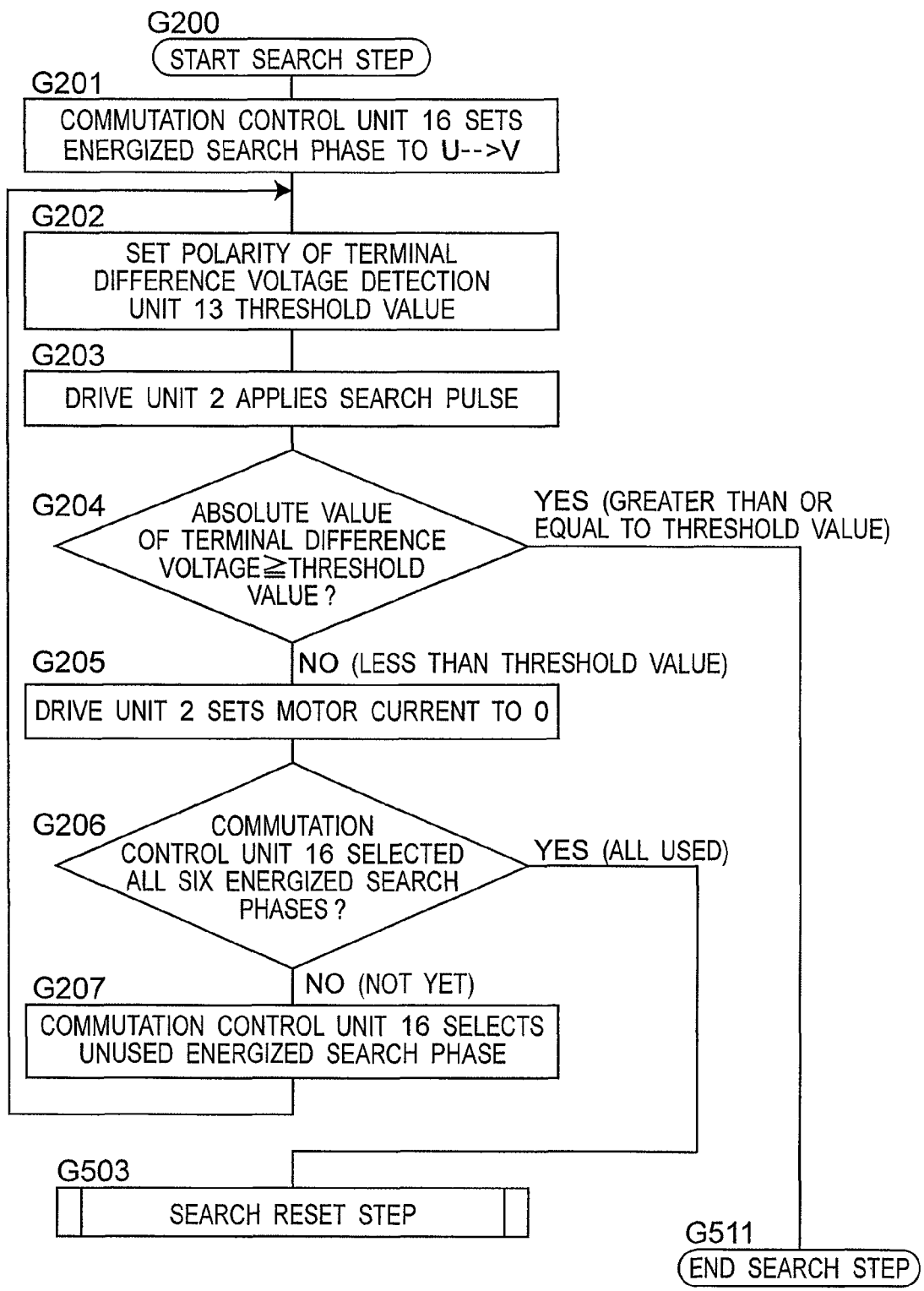
FIG. 26 is a flow chart of the detection step in the first embodiment of the invention.

The search step in FIG. 26 is described next.

FIG. 26 is a flow chart of the search step energizing two phases. In FIG. 25 two comparators are used in the terminal difference voltage detection unit 13, but the method shown in FIG. 26 achieves the same effect as the method shown in FIG. 25 while using one comparator in the terminal difference voltage detection unit 13.

In FIG. 26 operation of the search step starts in step G200.

In step G201 the commutation control unit 16 sets the energized search phase to U-->V. More specifically, the commutation control unit 16 sets the drive signal S16C applied to the control pins of switches Q1 and Q5 to the operating state level.

In step G202 the terminal difference voltage detection unit 13 determines the polarity of the specific threshold value.

In step G203 the drive unit 2 applies the search pulse. More specifically, the drive unit 2 turns the corresponding switching devices on based on the set energized search phase.

In step G204 the terminal difference voltage detection unit 13 determines if the absolute value of the terminal difference voltage is greater than or equal to the specific threshold value. If it is, the terminal difference voltage detection unit 13 generates an over-threshold value signal, advances to step G511, and the search step ends. If the absolute value of the terminal difference voltage is less than or equal to the specific threshold value, control goes to step G205.

In step G205 the drive unit 2 sets the motor current flowing to motor windings LU, LV, and LW to zero. More specifically, the commutation control unit 16 sets all six drive signals S16C to the non-operating state level, and the drive unit 2 turns switches Q1 to Q6 off.

Step G206 determines if all six energized search phases have been tried. If not, control goes to step G207. If yes, control goes to step G503.

In step G207 the commutation control unit 16 sets the energized search phase to a different phase combination and returns to step G202.

In step G503 the search reset step executes.

If the polarity of the difference between the terminal difference voltage and the specific threshold value is the same as the polarity of the terminal difference voltage in the search step, the over-threshold value signal is output to the commutation control unit 16. The commutation control unit 16 stores the energized search phase that was set when the over-threshold value signal was received, and sets the energized starting phase in the next starting step based on this energized search phase and FIG. 5.

Note that the energized search phase is initially set to U-->V in step G201 in FIG. 26, but the search step can start from a different energized search phase. PWM drive is also not required, and linear drive can be used.

The search reset step G503 shown in FIG. 26 is described next with reference to the search step G502 and search reset step G503 shown in FIG. 29.

The search step is executed as step G502. If the polarity of the difference between the terminal difference voltage and a particular threshold value is the same as the polarity of the terminal difference voltage, the terminal difference voltage detection unit 13 outputs over-threshold value signal S21 or S22 and the search step ends in step G511. A continued search and start step G512 representing any search and start step after the first search step executes next. A flow chart of this continued search and start step G512 is shown in FIGS. 28A and 28B and described further below. If operation does not end even after the search step has been executed for all energized search phase groups in the search step G502, the search reset step G503 executes.

If the absolute value of the terminal difference voltage does not become greater than or equal to the specified threshold value even though the search pulse has been applied to all energized search phases, the search reset step G503 in FIG. 29 determines that the specified threshold value is too high. The absolute value of the threshold value is therefore reduced by a predetermined amount.

Step G504 determines if the absolute value of the positive threshold value S12A and negative threshold value S12B of the terminal difference voltage detection unit 13 have gone to a defined lower limit. If not, control goes to step G505; if yes, control goes to step G506.

In step G505 the commutation control unit 16 reduces the absolute value of the threshold value by a predetermined amount by the threshold setting unit 12, and then goes to step G507.

If the absolute value of the terminal difference voltage does not exceed the specified threshold value even though the threshold value has been sufficiently reduced, step G506 determines that the rotor is positioned near the edge of the search angle range. One or more kick pulses are therefore applied to shift the initial relative position of the rotor to the stator and move the rotor position slightly. Control then goes to step G507.

Step G507 determines if the search reset counter, which counts the number of times step G503 executes, has reached a predetermined count. If it has, control goes to step G508; if not, the search reset counter is incremented one, the procedure loops to step G502, and the search step executes again.

In step G508 starting in the search and start mode is interrupted and starting continues in the synchronous starting mode.

Step G507 effectively limits the number of times the search step executes and thus prevents an infinite loop through the search step. In the synchronous starting mode a rotating field with a predetermined rotational speed is produced in the stator to start the motor. The startup speed is slower in the synchronous starting mode but the synchronous starting mode enables reliably starting the motor when the rotor position is unknown. The predetermined count of the search reset counter can be set to a desired value greater than or equal to 0 (zero). If the predetermined count is 0, control goes to step G508 without executing the search step G502 again.

As will be known from the above description, the operation shown in the flow chart in FIG. 26 executes the search step for all six energized search phases, and aborts as soon as the rotor position is detected. The flow chart shown in FIG. 26 can be used for the second and later search steps after the starting step executes, but is preferably used only for the first search step due to the efficiency concerns noted above.

FIG. 28A is a flow chart of operation in the search and start mode after the first starting step. The operation shown in the flow chart in FIG. 28A starts after the first search step ends in step G511 in FIG. 26.

Referring to FIG. 28A operation starts from step G400.

In step G401 the commutation control unit 16 sets the energized starting phase based on the energized search phase in the immediately preceding search step, and the drive unit 2 applies a starting pulse.

In step G402 the commutation control unit 16 sets the energized phase to the energized search phase in which the rotor position was previously detected, and the drive unit 2 applies a search pulse.

In step G403 the terminal difference voltage detection unit 13 determines if the absolute value of the terminal difference voltage is greater than or equal to the predetermined threshold value. If yes, control goes to step G404; if not, control goes to step G405.

Step G404 determines that the rotor is in the previously evaluated 60 degree period and operation therefore repeats from step G401.

Step G405 determines that the rotor commutated to the next 60 degree period and operation therefore goes to step G405.

Step G406 determines if the conditions for switching to the back-EMF voltage mode are met. More specifically, a mode switching signal is generated using at least one or more of the energized search phase, over-threshold value signals, energized starting phase, and rotor phase signal, and this mode switching signal is used to determine whether the switching conditions are met. If the conditions are met, control goes to step G407 and the search and start mode ends. If the conditions are not met, the procedure loops back to step G401.

Steps G401, G402, G403, G404, and G405 together constitute the continued search and start step G512 that represents the search and start step after the first search step executes.

FIG. 28B is a flow chart of operation after the first starting step in the search and start mode. This flow chart differs from the flow chart shown in FIG. 28A in that the starting pulse is also used as the search pulse. Operation shown in the flow chart in FIG. 28B starts after the first search step in FIG. 26 ends in step G511.

The operation described by the flow chart in FIG. 28B starts from step G410.

In step G411 the commutation control unit 16 sets the energized starting phase based on the energized search phase in the immediately preceding search step, and the drive unit 2 applies a starting pulse.

In step G412 the terminal difference voltage detection unit 13 determines if the absolute value of the terminal difference voltage is greater than or equal to the predetermined threshold value as a result of the starting pulse being applied in step G411. If the absolute value is less than the threshold value, control goes to step G413; if greater, control goes to step G414.

Step G413 determines that the rotor is in the previously evaluated 60 degree period and operation therefore repeats from step G411.

Step G414 determines that the rotor commutated to the next 60 degree period and operation therefore goes to step G415.

Step G415 determines if the conditions for switching to the back-EMF voltage mode are met. More specifically, a mode switching signal is generated using at least one or more of the energized search phase, over-threshold value signals, energized starting phase, and rotor phase signal, and this mode switching signal is used to determine whether the switching conditions are met. If the conditions are met, control goes to step G416 and the search and start mode ends. If the conditions are not met, the procedure loops back to step G411.

Steps G411, G412, G413, and G414 together constitute the continued search and start step G512 that represents the search and start step after the first search step executes.

Because the operation described by the flow chart in FIG. 28B uses the starting pulse and the search pulse, step G402 for applying the search pulse in FIG. 28A can be omitted. Operation goes to the back-EMF voltage mode after the continued search and start step ends in step G407 or G416. The operation described by the flow chart in FIG. 28B enables faster starting as a result of using the starting pulse instead of the search pulse that does not contribute to torque.

As will be known from the positions where the rotor position can be detected in FIG. 8, the rotor position can be determined using four different energized search phases when redundancy is removed.

Figure 27:
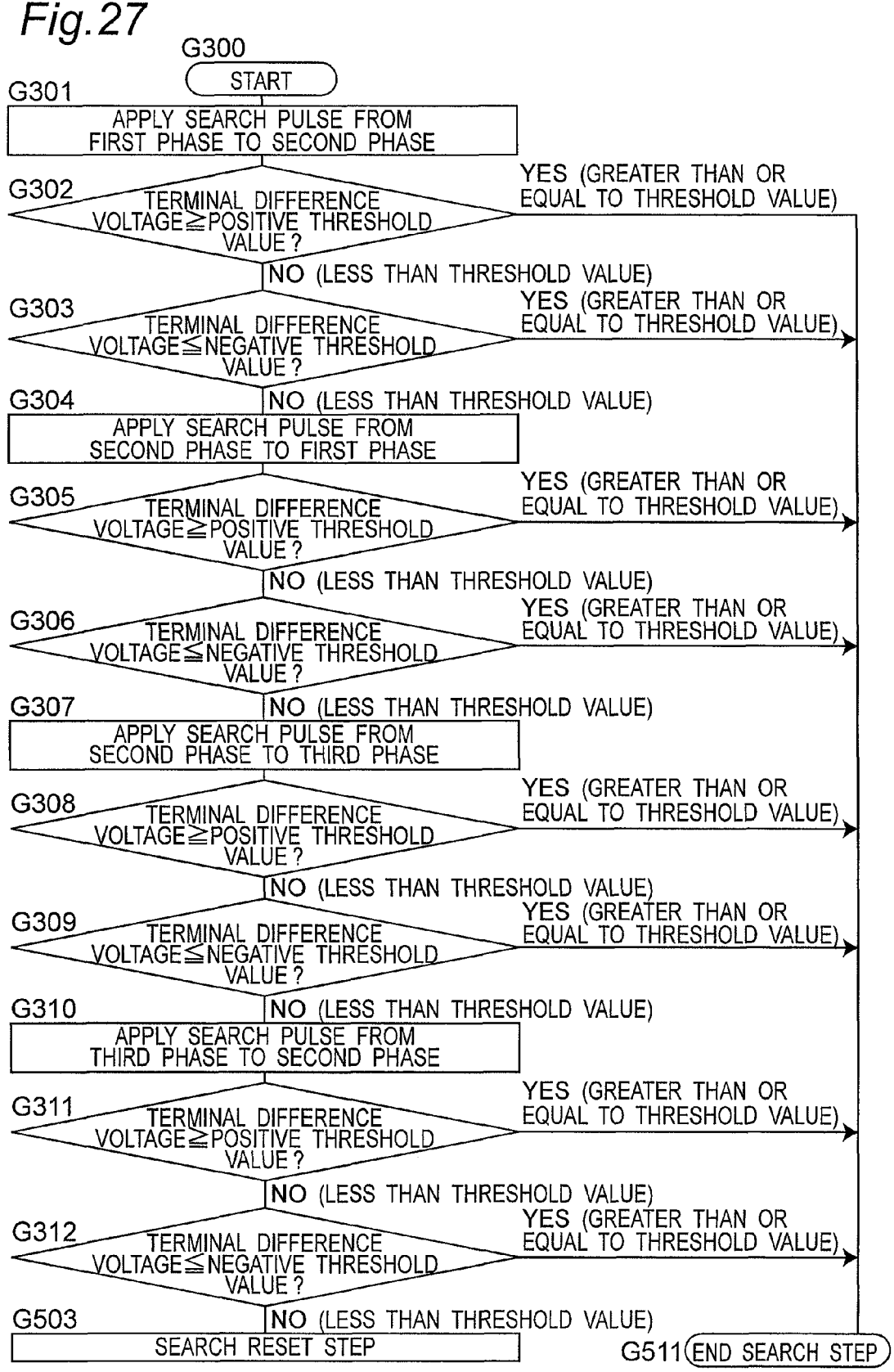
FIG. 27 is a flow chart of the detection step in the first embodiment of the invention.

FIG. 27 is a flow chart of the search step using four different energized search phases with two energized phases.

After setting the motor current to zero in step G301 in FIG. 27 the search pulse is applied from the first phase to the second phase.

In step G302 the terminal difference voltage detection unit 13 determines if the terminal difference voltage is greater than or equal to the positive threshold value. If it is, the terminal difference voltage detection unit 13 produces the over-threshold value signal S21 and ends the search step in step G511. If less than the positive threshold value, control goes to step G303.

In step G303 the terminal difference voltage detection unit 13 determines if the terminal difference voltage is less than or equal to the negative threshold value. If it is, the terminal difference voltage detection unit 13 produces the over-threshold value signal S22 and ends the search step in step G511. If greater than the negative threshold value, control goes to step G304.

In step G304 the motor current is set to zero and the search pulse is applied from the second phase to the first phase.

In step G305 the terminal difference voltage detection unit 13 determines if the terminal difference voltage is greater than or equal to the positive threshold value. If it is, the terminal difference voltage detection unit 13 produces the over-threshold value signal S21 and ends the search step in step G511. If less than the positive threshold value, control goes to step G306.

In step G306 the terminal difference voltage detection unit 13 determines if the terminal difference voltage is less than or equal to the negative threshold value. If it is, the terminal difference voltage detection unit 13 produces the over-threshold value signal S22 and ends the search step in step G511. If greater than the negative threshold value, control goes to step G307.

In step G307 the motor current is set to zero and the search pulse is applied from the second phase to the third phase.

In step G308 the terminal difference voltage detection unit 13 determines if the terminal difference voltage is greater than or equal to the positive threshold value. If it is, the terminal difference voltage detection unit 13 produces the over-threshold value signal S21 and ends the search step in step G511. If less than the positive threshold value, control goes to step G309.

In step G309 the terminal difference voltage detection unit 13 determines if the terminal difference voltage is less than or equal to the negative threshold value. If it is, the terminal difference voltage detection unit 13 produces the over-threshold value signal S22 and ends the search step in step G511. If greater than the negative threshold value, control goes to step G310.

In step G310 the motor current is set to zero and the search pulse is applied from the third phase to the second phase.

In step G311 the terminal difference voltage detection unit 13 determines if the terminal difference voltage is greater than or equal to the positive threshold value. If it is, the terminal difference voltage detection unit 13 produces the over-threshold value signal S21 and ends the search step in step G511. If less than the positive threshold value, control goes to step G312.

In step G312 the terminal difference voltage detection unit 13 determines if the terminal difference voltage is less than or equal to the negative threshold value. If it is, the terminal difference voltage detection unit 13 produces the over-threshold value signal S22 and ends the search step in step G511. If greater than the negative threshold value, control goes to step G503.

The operation of the search reset step is executed in step G503.

The search reset step thus executes if the search pulse is applied to the four energized search phases through step G312 and the position of the rotor still cannot be determined.

The search reset step G503 shown in FIG. 27 is described next with reference to the search step G502 and search reset step G503 shown in FIG. 29.

The search step is executed as step G502. If the polarity of the difference between the terminal difference voltage and a particular threshold value is the same as the polarity of the terminal difference voltage, the terminal difference voltage detection unit 13 outputs over-threshold value signal S21 or S22 and the search step ends in step G511. A continued search and start step G512 representing any search and start step after the first search step executes next. A flow chart of this continued search and start step G512 is shown in FIGS. 28A and 28B and described further below. If operation does not end even after the search step has been executed for all four energized search phase states in the search step G502, the search reset step G503 executes.

If the absolute value of the terminal difference voltage does not become greater than or equal to the specified threshold value even though the search pulse has been applied to all four energized search phase states, the search reset step G503 in FIG. 29 determines that the specified threshold value is too high. The absolute value of the threshold value is therefore reduced by a predetermined amount.

Step G504 determines if the absolute value of the positive threshold value S12A and negative threshold value S12B of the terminal difference voltage detection unit 13 have gone to a defined lower limit. If not, control goes to step G505; if yes, control goes to step G506.

In step G505 the commutation control unit 16 reduces the absolute value of the threshold value by a predetermined amount by the threshold setting unit 12, and then goes to step G507.

If the absolute value of the terminal difference voltage does not exceed the specified threshold value even though the threshold value has been sufficiently reduced, step G506 determines that the rotor is positioned near the edge of the search angle range. One or more kick pulses are therefore applied to shift the initial relative position of the rotor to the stator and move the rotor position slightly. Control goes to step G507.

Step G507 determines if the search reset counter, which counts the number of times step G503 executes, has reached a predetermined count. If it has, control goes to step G508; if not, the search reset counter is incremented, the procedure loops to step G502, and the search step executes again.

In step G508 starting in the search and start mode is interrupted and starting continues in the synchronous starting mode.

Step G507 effectively limits the number of times the search step executes and thus prevents an infinite loop through the search step. In the synchronous starting mode a rotating field with a predetermined rotational speed is produced in the stator to start the motor. The startup speed is slower in the synchronous starting mode but the synchronous starting mode enables reliably starting the motor when the rotor position is unknown. The predetermined count of the search reset counter can be set to a desired value greater than or equal to 0 (zero). If the predetermined count is 0, control goes to step G508 without executing the search step G502 again.

As will be known from the above description, the operation shown in the flow chart in FIG. 27 executes the search step for all four energized search phases, and aborts as soon as the rotor position is detected. The flow chart shown in FIG. 27 can be used for the second and later search steps after the starting step executes, but is preferably used only for the first search step due to the efficiency concerns noted above. The first phase, second phase, and third phase in FIG. 27 can be desirably assigned as the U-phase, V-phase, and W-phase so that there is no duplication.

FIG. 28A is a flow chart of operation in the search and start mode after the first starting step. The operation shown in the flow chart in FIG. 28A starts after the first search step ends in step G511 in FIG. 27.

Referring to FIG. 28A operation starts from step G400.

In step G401 the commutation control unit 16 sets the energized starting phase based on the energized search phase in the immediately preceding search step, and the drive unit 2 applies a starting pulse.

In step G402 the commutation control unit 16 sets the energized phase to the energized search phase in which the rotor position was previously detected, and the drive unit 2 applies a search pulse.

In step G403 the terminal difference voltage detection unit 13 determines if the absolute value of the terminal difference voltage is greater than or equal to the predetermined threshold value. If yes, control goes to step G404; if not, control goes to step G405.

Step G404 determines that the rotor is in the previously evaluated 60 degree period and operation therefore repeats from step G401.

Step G405 determines that the rotor commutated to the next 60 degree period and operation therefore goes to step G405.

Step G406 determines if the conditions for switching to the back-EMF voltage mode are met. More specifically, a mode switching signal is generated using at least one or more of the energized search phase, over-threshold value signals, energized starting phase, and rotor phase signal, and this mode switching signal is used to determine whether the switching conditions are met. If the conditions are met, control goes to step G407 and the search and start mode ends. If the conditions are not met, the procedure loops back to step G401.

Steps G401, G402, G403, G404, and G405 together constitute the continued search and start step G512 that represents the search and start step after the first search step executes.

FIG. 28B is a flow chart of operation after the first starting step in the search and start mode. This flow chart differs from the flow chart shown in FIG. 28A in that the starting pulse is also used as the search pulse. Operation shown in the flow chart in FIG. 28B starts after the first search step in FIG. 25 ends in step G511.

The operation described by the flow chart in FIG. 28B starts from step G410.

In step G411 the commutation control unit 16 sets the energized starting phase based on the energized search phase in the immediately preceding search step, and the drive unit 2 applies a starting pulse.

In step G412 the terminal difference voltage detection unit 13 determines if the absolute value of the terminal difference voltage is greater than or equal to the predetermined threshold value when the starting pulse is applied in step G411. If the absolute value is less than the threshold value, control goes to step G413; if greater, control goes to step G414.

Step G413 determines that the rotor is in the previously evaluated 60 degree period and operation therefore repeats from step G411.

Step G414 determines that the rotor commutated to the next 60 degree period and operation therefore goes to step G415.

Step G415 determines if the conditions for switching to the back-EMF voltage mode are met. More specifically, a mode switching signal is generated using at least one or more of the energized search phase, over-threshold value signals, energized starting phase, and rotor phase signal, and this mode switching signal is used to determine whether the switching conditions are met. If the conditions are met, control goes to step G416 and the search and start mode ends. If the conditions are not met, the procedure loops back to step G411.

Steps G411, G412, G413, and G414 together constitute the continued search and start step G512 that represents the search and start step after the first search step executes.

Because the operation described by the flow chart in FIG. 28B uses the starting pulse and the search pulse, step G402 for applying the search pulse in FIG. 28A can be omitted. Operation goes to the back-EMF voltage mode after the continued search and start step ends in step G407 or G416. The operation described by the flow chart in FIG. 28B enables faster starting as a result of using the starting pulse instead of the search pulse that does not contribute to torque.

The terminal difference voltage detection unit 13 shown in FIG. 1A that operates in the search step in the search and start mode is described next. Examples of the comparators 21 and 22 and the first phase-selection unit 24 are shown in FIG. 19A and FIG. 19B.

Figure 19A:
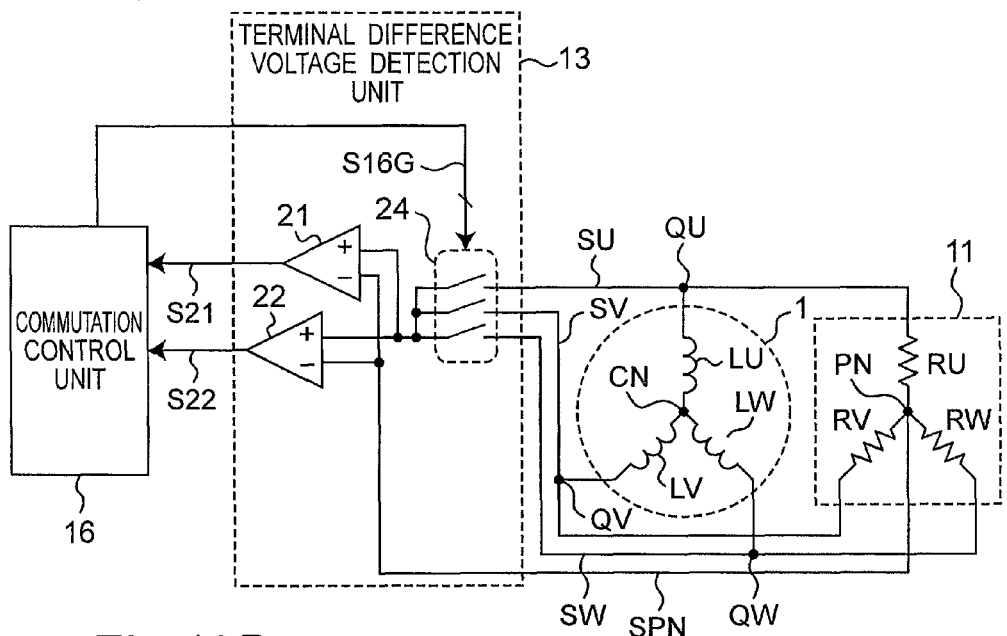
FIGS. 19A and 19B are circuit diagrams of the terminal difference voltage detection unit in the first embodiment of the invention.
Figure 19B:
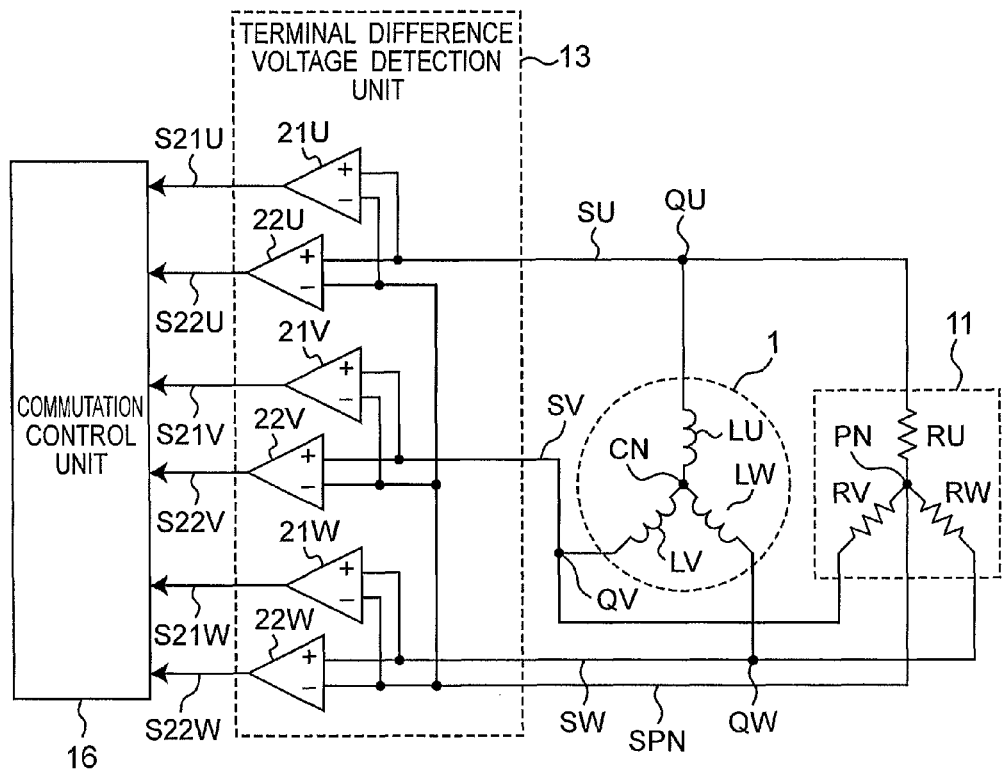

As shown in FIG. 1A and FIG. 19A, the drive unit 2 supplies the search pulse current for energizing two phases to the motor 1. The commutation control unit 16 generates and outputs the phase selection signal S16G indicating the non-energized phase to the first phase-selection unit 24. The U-phase motor terminal voltage SU, the V-phase motor terminal voltage SV, and the W-phase motor terminal voltage SW are also input to the first phase-selection unit 24. The first phase-selection unit 24 selects the motor terminal voltage SU, SV, SW for the non-energized phase based on the phase selection signal S16G, and outputs the selected motor terminal voltage with the pseudo-neutral-point voltage SPN to the comparators 21 and 22.

The motor terminal voltage selected by the first phase-selection unit 24 is input to the non-inverted input terminals of the comparators 21 and 22, and the pseudo-neutral-point voltage SPN is input to the inverted input terminals. If the difference between the selected motor terminal voltage and the pseudo-neutral-point voltage SPN is greater than or equal to the positive threshold value S12A, the comparator 21 generates and outputs the over-threshold value signal S21 to the commutation control unit 16. If the difference between the selected motor terminal voltage and the pseudo-neutral-point voltage SPN is less than or equal to the negative threshold value S12B, the comparator 22 generates and outputs the over-threshold value signal S22 to the commutation control unit 16. As a result, if the polarity of the difference between the terminal difference voltage and the specific threshold value S12A or S12B is the same as the polarity of the terminal difference voltage, over-threshold value signal S21 or S22 is generated and output to the commutation control unit 16.

When the terminal difference voltage detection unit 13 and the back-EMF voltage detection unit 14 share common comparators, the neutral point voltage SCN is input to the non-inverted input terminals of the comparators 21 and 22 in the back-EMF voltage mode, and the absolute value of the predetermined threshold value S12A or S12B is set low or to zero.

The arrangement shown in FIG. 19B differs from the arrangement shown in FIG. 1A in that the first phase-selection unit 24 is not used, U-phase comparators 21U and 22U, V-phase comparators 21V and 22V, and W-phase comparators 21W and 22W are provided, and the motor terminal difference voltage is read directly from the motor terminal QU, QV, QW of the non-energized phase. The over-threshold value signals S21U, S22U, S21V, S22V, S21W, S22W respectively output by the comparators 21U, 22U, 21V, 22V, 21W, 22W are input to the commutation control unit 16, and the commutation control unit 16 selects the over-threshold value signal for the non-energized phase. When the terminal difference voltage detection unit 13 and the back-EMF voltage detection unit 14 share common comparators, the neutral point voltage SCN is input to the non-inverted input terminals of the comparators 21U, 22U, 21V, 22V, 21W, 22W, and the absolute value of the predetermined threshold value S12A or S12B is set low or to zero.

The back-EMF voltage detection unit 14 that operates in the back-EMF voltage mode and is shown in FIG. 1A is described next. The comparator 23 and second phase-selection unit 20 are shown by way of example in FIGS. 20A and 20B.

Figure 20A:
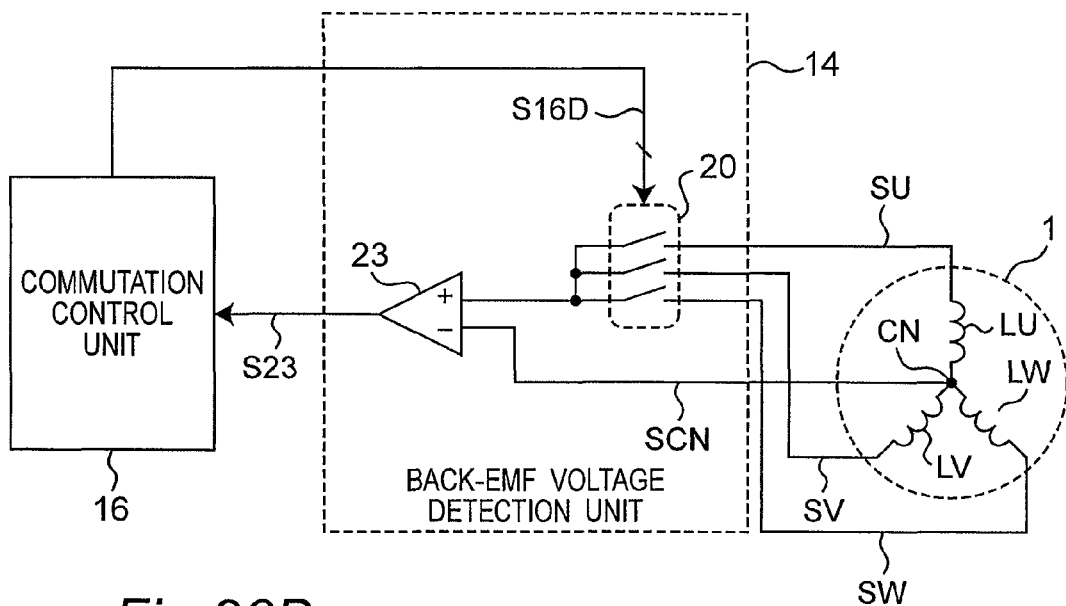
FIGS. 20A and 20B are circuit diagrams of the back-EMF voltage detection unit in the first embodiment of the invention.
Figure 20B:
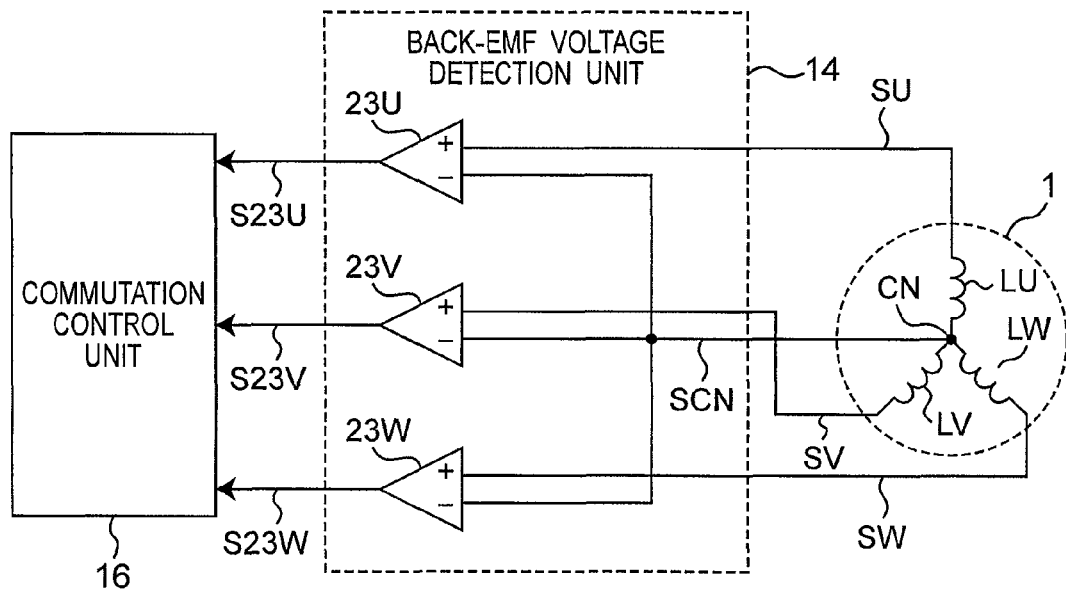

FIG. 20A shows an arrangement in which one comparator 23 reads the back-EMF voltage from the motor terminal for each non-energized phase through the second phase-selection unit 20. The arrangement shown in FIG. 20B differs from the arrangement in FIG. 1A in that a U-phase comparator 23U, a V-phase comparator 23V, and a W-phase comparator 23W are used instead of the second phase-selection unit 20. More specifically, comparators 23U, 23V, 23W read the back-EMF voltage directly from the motor terminal of the non-energized phase. The comparators 23U, 23V, 23W read the back-EMF voltage directly from the motor terminal for the non-energized phase. The over-threshold value signals S23U, S23V, S23W generated by the comparators 23U, 23V, 23W are input to the commutation control unit 16, and the commutation control unit 16 selects the over-threshold value signal for the non-energized phase.

FIGS. 21A, 21B, 21C, and 21D describe the timing of the energized current in the back-EMF voltage mode and the slope of the curve at the zero cross point of each phase. The commutation control unit 16 sets the energized phase, and the drive unit 2 supplies phase current to the selected phase. As a result, a back-EMF voltage is induced in each phase winding. The commutation control unit 16 also sets a non-energized phase so that the back-EMF voltage can be detected. The back-EMF voltage detection unit 14 detects the zero cross point of the back-EMF voltage and the direction of the back-EMF voltage in the non-energized phase.

In FIG. 21A the solid line denotes the U-phase current IU and the dotted line denotes the U-phase back-EMF voltage EU. Likewise in FIG. 21B the solid line denotes the V-phase current IV and the dotted line denotes the V-phase back-EMF voltage EV. In FIG. 21C the solid line denotes the W-phase current IW and the dotted line denotes the W-phase back-EMF voltage EW. The shaded portion of each phase current IU, IV, IW is PWM controlled. Periods H1, H2, H3, H4, H5, H6 are each equivalent to a 60 degree electrical angle. As shown in FIG. 21D each phase current IU, IV, IW is the source current when positive and the sink current when negative. When energized as the source current or sink current, each phase current IU, IV, IW transitions sequentially through a rising state, an on steady state, and a falling state as shown in FIGS. 21A, 21B, and 21C.

The zero cross point of the back-EMF voltage occurring in the non-energized phase is described next with reference to FIG. 21D.

In period H1 the commutation control unit 16 sets the W-phase as the non-energized phase. The second phase-selection unit 20 selects the neutral point voltage SCN and W-phase motor terminal voltage SW, and the comparator 23 detects the point where the W-phase back-EMF voltage appearing in the W-phase motor terminal voltage SW goes below the neutral point voltage SCN as the falling zero cross point of the W-phase back-EMF voltage. This is denoted the "W-phase drop" herein. In period H2 the commutation control unit 16 sets the V-phase as the non-energized phase. The second phase-selection unit 20 selects the neutral point voltage SCN and V-phase motor terminal voltage SV, and the comparator 23 detects the point where the V-phase back-EMF voltage appearing in the V-phase motor terminal voltage SV goes above the neutral point voltage SCN as the rising zero cross point of the V-phase back-EMF voltage. This is denoted the "V-phase rise" herein. In a similar manner the comparator 23 detects where the U-phase back-EMF voltage goes below the neutral point voltage SCN as the falling zero cross point of the U-phase back-EMF voltage in period H3, detects where the W-phase back-EMF voltage goes above the neutral point voltage SCN as the rising zero cross point of the W-phase back-EMF voltage in period H4, detects where the V-phase back-EMF voltage goes below the neutral point voltage SCN as the falling zero cross point of the V-phase back-EMF voltage in period H5, and detects where the U-phase back-EMF voltage goes above the neutral point voltage SCN as the rising zero cross point of the U-phase back-EMF voltage in period H6.

As described above, in the back-EMF voltage mode the back-EMF voltage of each phase can be detected in the non-energized period of each phase. Whether the back-EMF voltage is rising or falling at the zero cross point can be detected by the back-EMF voltage detection unit 14 composed of the second phase-selection unit 20 and the comparator 23.

Zero cross detection of the back-EMF voltage is described in further detail with reference to FIGS. 22A, 22B, and 22C. FIG. 22A is a timing chart of the zero-cross detection of the back-EMF voltage. FIGS. 22B and 22C are waveform diagrams of the current profile when the rotor position is at points 69 and 70 immediately after the back-EMF voltage mode. The x-axis denotes the rotor position or time base. Block 61 denotes any one of the six 60-degree periods H1 to H6 shown in FIGS. 21A, 21B, 21C, and 21D. Reference numerals 62, 63, and 64 denote the center, start, and end positions in 60-degree period 61. Reference numerals 67A, 67B and 68A, 68B denote the start and end times of the back-EMF voltage zero cross detection period. Of these back-EMF voltage zero cross detection periods, 65A and 65B denote the phase advance period, and 66A and 66B denote the period until the back-EMF voltage crosses zero.

In sensorless drive a specific zero current period must be created in each phase in order to detect the back-EMF voltage. A specific period in the zero current period is used as the back-EMF voltage zero cross detection period. As shown in FIGS. 21A, 21B, 21C, and 21D, the anticipated timing where the back-EMF voltage crosses zero is 60 degrees after the previous timing of the back-EMF voltage zero cross in a separate phase. The zero cross detection period starts at times 67A and 67B, which are phase advance periods 65A and 65B before the expected zero cross timing. Therefore, if the anticipated period is longer than the actual period, that is, if the expected rotor speed is slower than the actual speed, the phase is advanced a little bit at a time to gradually correct the anticipated time. If the anticipated period is shorter than the actual period, that is, if the expected rotor speed is faster than the actual speed, operation waits during periods 66A and 66B for the back-EMF voltage to cross zero. As a result, the phase is delayed, the back-EMF voltage can be correctly detected at time 68A or 68B, and the expected timing is corrected.

The number of starting pulses in the 60-degree forward commutation period is normally sufficient in the search and start mode just before switching to the back-EMF voltage mode. The timing for changing to the back-EMF voltage mode therefore occurs early in the 60-degree period, and the rotor position just after changing to the back-EMF voltage mode is near the same position at time 69, for example. The current profile in this case is as shown in FIG. 22B. Based on the preceding rotor position information, the U-phase current 84A rises relatively sharply, the V-phase current 83A drops relatively sharply, and the W-phase current 85A drops with a relatively gradual slope. The V-phase current 83A then starts to rise relatively gradually. The gradual rate of change in the V-phase current 83A and W-phase current 85A is to produce a current slope that is effective for suppressing motor vibration and noise. The V-phase current 83A eventually goes to zero and passes a short zero current period until the V-phase current 83A settles at zero. A zero cross detection period then starts to detect the rising zero cross where the V-phase back-EMF voltage goes from negative to positive. As a result of detecting the V-phase rising zero cross at time 62, the V-phase current begins a relatively gradual forward rise.

After changing to the back-EMF voltage mode in a certain 60-degree period, the back-EMF voltage crosses zero at time 62 in the same 60-degree period and the back-EMF voltage zero cross can be detected. More specifically, the zero cross detection period can be set near time 62 after an approximately 30-degree period after the back-EMF voltage mode is entered. The zero cross detection period then continues until the zero cross is detected, and the zero cross timing can be correctly detected.

If in the preceding search and start mode the number of starting pulses in the 60-degree forward commutation period is too few, the timing for changing to the back-EMF voltage mode occurs near the end of this 60-degree period. The rotor position just after entering the back-EMF voltage mode is therefore near this position, such as at time 70. In this case the current profile is as shown in FIG. 22C. Based on the preceding rotor position information, the U-phase current 84B rises relatively sharply, the V-phase current 83B drops relatively sharply, and the W-phase current 85B drops with a relatively gradual slope. The V-phase current 83B then starts to rise relatively gradually. The gradual rate of change in the V-phase current 83B and W-phase current 85B is to produce a current slope that is effective for suppressing motor vibration and noise. The V-phase current 83B eventually goes to zero and passes a short zero current period until the V-phase current 83B settles at zero. A zero cross detection period then starts to detect the rising zero cross where the V-phase back-EMF voltage goes from negative to positive.

In this case the back-EMF voltage has already crossed zero at time 62. An arrangement for detecting the zero cross at an intermediate time in the 60-degree period is also conceivable. However, if the number of starting pulses is sufficiently high, the zero cross detection period continues for a period equivalent to 90 degrees and torque drops. It is therefore better to wait for the back-EMF voltage zero cross in the current 60-degree period even when the rotor position immediately after switching to the back-EMF voltage mode is at time 70. Because the back-EMF voltage has already crossed zero at time 62, the polarity of the back-EMF voltage remains constant until after another period equal to 180 degrees. That the back-EMF voltage has already crossed zero can be determined from the polarity at time 67B when detecting the back-EMF voltage zero cross starts. This determination can be handled the same way as detecting the zero cross, and the next 60-degree profile is formed. Note that torque does not drop in this case. As described above, the predicted period is gradually shortened by the phase advance period 65B, and the zero cross timing can be accurately detected.

Figure 23A:
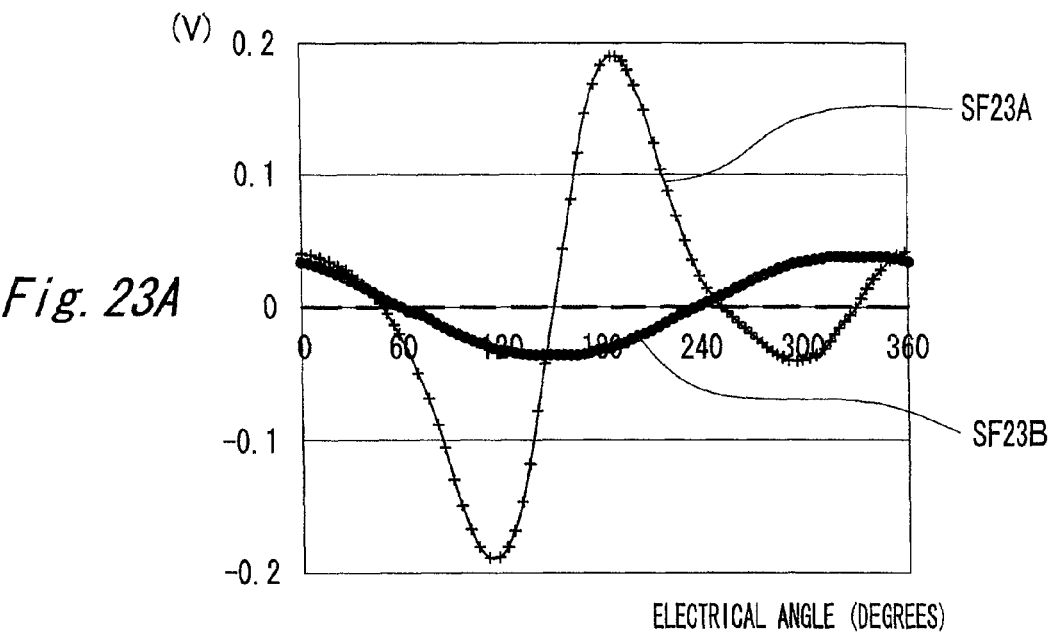
FIGS. 23A and 23B are waveform diagrams of the induction voltage and back-EMF voltage in the first embodiment of the invention.
Figure 23B:
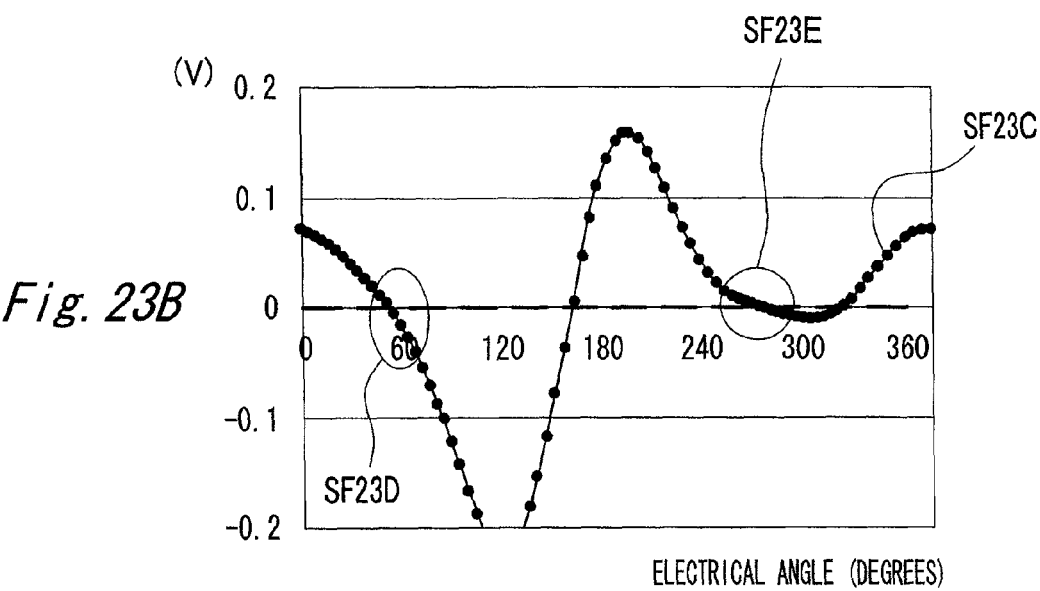

FIGS. 23A and 23B, and FIG. 24 are waveform diagrams of the change in the back-EMF voltage that occurs in the non-energized phase immediately after a recent 3-phase brushless motor 1B changes from the search and start mode to the back-EMF voltage mode. FIG. 23A shows the W-phase induction voltage SF23A and the back-EMF voltage SF23B that occurs in the non-energized W-phase when current flows from the U-phase winding to the V-phase winding and the rotor is turning at 50 rpm. The x-axis shows the electrical angle and the y-axis shows the neutral point voltage SCN referenced to 0 V. The EMF constant Ke of this three-phase brushless motor 1B is Ke=0.74 mV/rpm. FIG. 23B shows the total voltage SF23C of the W-phase induction voltage SF23A and the back-EMF voltage SF23B shown in FIG. 23A.

Figure 24A:
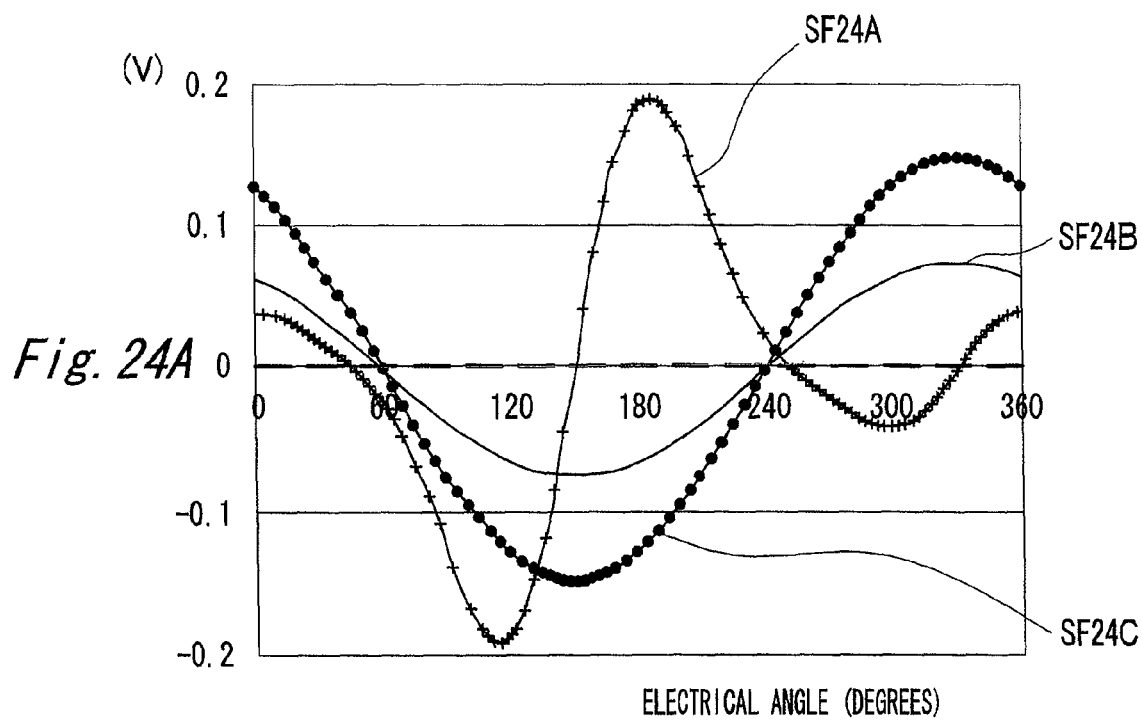
FIGS. 24A and 24B are waveform diagrams of the induction voltage and back-EMF voltage in the first embodiment of the invention.
Figure 24B:
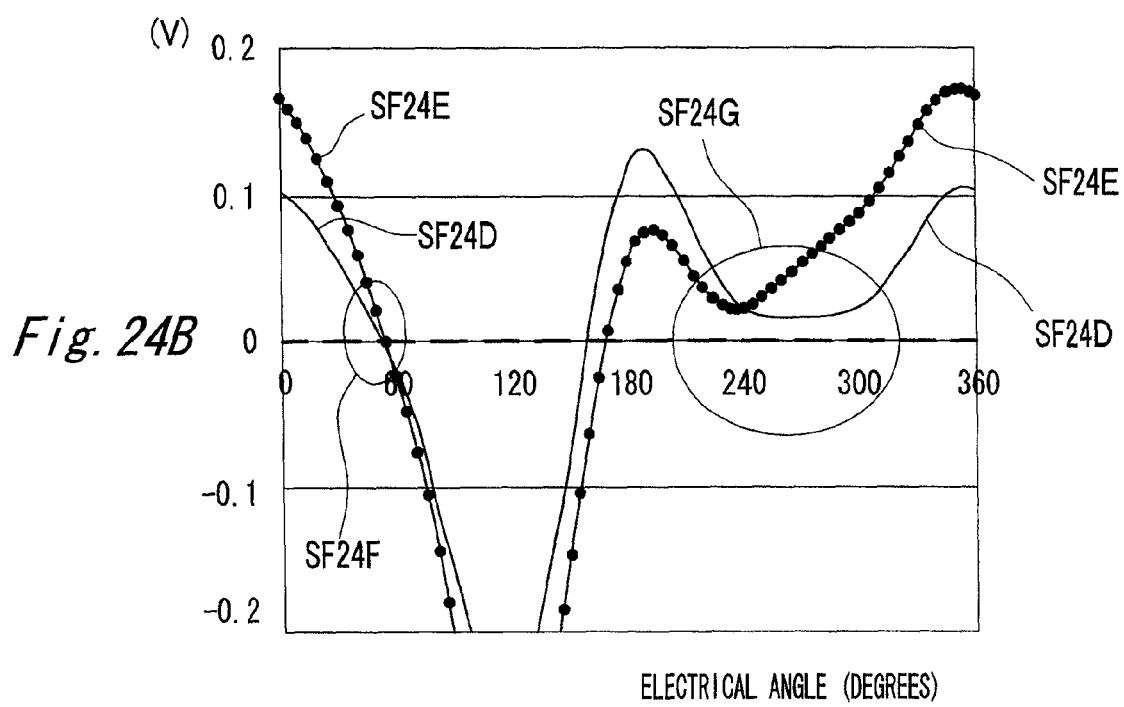

FIG. 24A shows the back-EMF voltage SF24B occurring in the non-energized W-phase when current flows from the U-phase winding to the V-phase winding and the rotor is turning at 100 rpm, the back-EMF voltage SF24C occurring in the non-energized W-phase when the rotor is turning at 200 rpm, and the W-phase induction voltage SF24A. The induction voltage SF24A shown in FIG. 24A is the same as W-phase induction voltage SF23A. FIG. 24B shows the total voltage SF24D combining the W-phase induction voltage SF24A in FIG. 24A and the W-phase back-EMF voltage SF24B when the rotor is turning at 100 rpm, and the total voltage SF24E of the W-phase induction voltage SF24A and the W-phase back-EMF voltage SF24C when the rotor is turning at 200 rpm.

When current flows from the U-phase to the voltage in the back-EMF voltage mode immediately after the back-EMF voltage mode is entered from the search and start mode, the combined total voltage of the back-EMF voltage and the induction voltage appears at both ends of the non-energized W-phase winding as shown in FIG. 23B and FIG. 24B. In this case, as shown in period H1 in FIGS. 21A, 21B, 21C, and 21D the falling zero cross of this total W-phase voltage should be detected.

As shown in FIG. 23B the back-EMF voltage occurring in the W-phase is low because the rotor speed is low immediately after switching from the search and start mode to the back-EMF voltage mode. The current supplied to two phases is relatively high in order to start the motor, and the effect of the W-phase induction voltage is great. The zero cross of the total W-phase voltage SF23C when the rotor speed is 50 rpm occurs at two places, near electrical angles of 50 degrees and 270 degrees. Although there is no particular problem at the normal detection position when the zero cross is near 50 degrees in the back-EMF voltage detection period, problems such as reversing the rotor at a false detection position can occur if the zero cross is near 270 degrees.

To avoid the problem shown in FIG. 23B, the rotor speed is increased slightly immediately after switching from the search and start mode to the back-EMF voltage mode as shown in FIG. 24B. As a result, the back-EMF voltage produced in the W-phase rises slightly, and the effect of the W-phase induction voltage on the total W-phase voltage combining the back-EMF voltage and induction voltage is reduced.

When the motor speed is 100 rpm and 200 rpm in FIG. 24B the zero cross of the combined total voltage occurs at only one point near a 50 degree electrical angle. Because the W-phase back-EMF voltage rises with the rise in motor speed, the total W-phase voltage rises and a zero cross with the neutral point voltage SCN near the 270 degree electrical angle is avoided. False detection of the zero cross near 270 degrees is thus avoided in the back-EMF voltage detection period, and the zero cross near 50 degrees can be detected at the normal detection position. It is therefore necessary when changing from the search and start mode to the back-EMF voltage mode to first increase the motor speed to a predetermined speed in the search and start mode before switching to the back-EMF voltage mode.

The back-EMF voltage in the U-phase winding, the back-EMF voltage in the V-phase winding, and the back-EMF voltage in the W-phase winding of a common 3-phase brushless motor are generally sine waves with a phase difference of 120 degrees. In this case the neutral point voltage SCN of a three-phase motor is the total of the back-EMF voltages produced in the U-phase winding, the V-phase winding, and the W-phase winding. The back-EMF voltage therefore has no effect on the neutral point difference voltage, which is the difference voltage of the neutral point voltage SCN and the pseudo-neutral-point voltage SPN.

In the search and start mode, this first embodiment of the invention thus alternately repeats a search step for detecting the rotor position from the terminal difference voltage using two energized phases, and a starting step that applies an appropriate starting acceleration to the motor before switching to the back-EMF voltage mode. In this case the terminal difference voltage of the non-energized phase has greater amplitude and noise resistance than the winding end voltage or neutral point difference voltage. Because the rotor position can be detected over a wider electrical angle range, angles at which the rotor position cannot be detected can be prevented. The rotor position can therefore be reliably detected using the terminal difference voltage. Accurate rotor position information can therefore be detected in the search and start mode, and the desired starting acceleration can be quickly and reliably achieved in the search and start mode.

The combined total of the induction voltage and the back-EMF voltage also occurs in the non-energized phase that is used for back-EMF voltage detection immediately after switching from the search and start mode to the back-EMF voltage mode. If the rotor speed is too slow in the initial acceleration period when the motor is starting, problems such as reversing caused by erroneously detecting the rotor position can occur in particular three-phase brushless motors 1B as shown in FIGS. 23A and 23B. By accurately detecting the rotor position and quickly and reliably producing the desired starting acceleration in the search and start mode, this first embodiment of the invention enables increasing the rotor speed and the back-EMF voltage to or above a predetermined level. Even the specific 3-phase brushless motor 1B can therefore start reliably and quickly from the search and start mode without falsely detecting the rotor position before the rotor reaches the normal speed after switching to the back-EMF voltage mode.

The search and start mode and back-EMF voltage mode are described more specifically next.

In the search step a search pulse is applied to six different energized search phases sequentially from state F1 to state F6 in FIG. 5. FIG. 6 shows the detectable rotor positions in each energized search phase. As previously described, the energized search phase where the rotor position was detectable in the first search step is used when the first search pulse is applied in the second and later search steps. If the rotor position cannot be detected, the energized search phase determined by advancing the rotor 60 degrees forward is used to apply the second search pulse.

FIGS. 7A, 7B, 7C, 7D, 7E, 7F, 7G, 7H, and 7I schematically describe applying the search pulse and the starting pulse. In FIGS. 7A, 7B, 7C, 7D, 7E, 7F, 7G, 7H, and 7I time is shown on the x-axis, and FIGS. 7A, 7B, and 7C respectively show the U-phase winding current, the V-phase winding current, and the W-phase winding current.

FIG. 7D shows the output of the comparator 21 and comparator 22 using the energized starting phase cycle FA, and FIG. 7E shows the result of rotor position detection. FIG. 7F shows the output of the comparator 21 and comparator 22 using the energized starting phase cycle FB, and FIG. 7G shows the result of rotor position detection. FIG. 7H combines the output results shown in (d) and (f), and FIG. 7I shows the combined results of rotor position detection shown in (e) and (g). In FIG. 7H positive, negative, and 0 respectively denote that the comparator 21 outputs high, the comparator 22 outputs low, and that comparator 21 output is not high and comparator 22 output is not low. In FIGS. 7I, 230, 290, 350, and 70 respectively denote that the rotor position was detected near 230 degrees, near 290 degrees, near 350 degrees, and near 70 degrees.

The search step shown in FIG. 25 and FIG. 26 for applying the search pulse six times is used for the first search step in FIGS. 7A, 7B, 7C, 7D, 7E, 7F, 7G, 7H, and 7I. The continued search and start step shown in FIG. 28A is used after the first search step.

In FIGS. 7A, 7B, 7C, 7D, 7E, 7F, 7G, 7H, and 7I DS1 denotes the first search step. In the six different energized search phases shown in FIG. 6, the search pulse is applied based on the flow charts in FIG. 25 and FIG. 26 in the state sequence F1, F2, F3 shown in FIG. 5. The first and second times the search pulse is applied the terminal difference voltage detection unit 13 cannot detect the rotor position. By turning on switches Q2 and Q6, the search pulse is applied from the V-phase to the W-phase the third time. The output of the comparator 22 goes low, and the over-threshold value signal S22 is sent to the commutation control unit 16. The rotor position is detected near 230 degrees, and the energized search phase selected at this time is stored. In the first starting step denoted SP1, switches Q2 and Q4 are turned on, the starting pulse is applied from the V-phase to the U-phase, and suitable starting torque is applied to the rotor.

In the second search step DS2 the search pulse is applied in the previously stored energized search phase. Because the rotor speed is generally low when starting, the commutation frequency is sufficiently low compared with the number of times the rotor position is detected. In DS2 the output of the comparator 22 goes low again and the energized search phase at this time is stored. As in starting step SP1, the starting pulse is applied from the V-phase to the U-phase in the second starting step SP2 and suitable starting torque is applied to the rotor. In the third search step DS3 and starting step SP3, and in the fourth search step DS4 and starting step SP4, the starting pulse is again applied from the V-phase to the U-phase.

The fifth search step DS5 applies two search pulses. Of these the first search pulse is applied in the previously stored energized search phase. The comparator 22 output does not go low this time. The second search pulse in the fifth search step DS5 is therefore applied from the V-phase to the U-phase as a result of turning switches Q2 and Q4 on based on the assumption that the rotor is advanced a 60 degree electrical angle from the previously assumed position to near 290 degrees. The output of the comparator 21 thus goes high, the rotor position is determined to be near 290 degrees, and the energized search phase at this time is stored. Next, in the fifth starting step SP5, switches Q3 and Q4 are turned on, the starting pulse is applied from the W-phase to the U-phase, and suitable starting torque is applied to the rotor. In the sixth search step DS6 and starting step SP6, and in the seventh search step DS7 and starting step SP7, the starting pulse is again applied from the W-phase to the U-phase.

The eighth search step DS8 applies two search pulses. Of these the first search pulse is applied in the previously stored energized search phase. The comparator 21 output does not go high this time. The second search pulse in the eighth search step DS8 is therefore applied from the W-phase to the U-phase as a result of turning switches Q3 and Q4 on based on the assumption that the rotor is advanced a 60 degree electrical angle from the previously assumed position to near 350 degrees. The output of the comparator 22 thus goes low, the rotor position is determined to be near 350 degrees, and the energized search phase at this time is stored. Next, in the eighth starting step SP8, switches Q3 and Q5 are turned on, the starting pulse is applied from the W-phase to the V-phase, and suitable starting torque is applied to the rotor. In the ninth search step DS9 and starting step SP9 the starting pulse is again applied from the W-phase to the V-phase.

The tenth search step DS10 applies one search pulse in the previously stored energized search phase, and the output of the comparator 21 goes high. Based on the first search pulse in the tenth search step DS10, the rotor is determined to be near 70 degrees advanced an 80 degree electrical angle from the previous position. Next, by turning the switches Q1 and Q5 on, drive current is supplied based on PWM control from the U-phase to the V-phase and the rotor accelerates in the semi-steady state step AP1.

After the fifth search step DS5 that confirms the first 60-degree forward commutation, and the eighth search step DS8 that confirms the second 60-degree forward commutation, the tenth search step DS10 confirms an 80-degree forward commutation. If it is determined that the rotor started turning as a result of these three 60 to 80 degree forward commutations, the back-EMF voltage mode is entered after the semi-steady state step AP1 and normal acceleration torque can be applied based on the rotor position detected from the back-EMF voltage.

Correlating the process shown in FIGS. 7A, 7B, 7C, 7D, 7E, 7F, 7G, 7H, and 7I to the flow chart in FIG. 29, the first search step DS1 corresponds to search step G502, and the first starting step SP1 to the semi-steady state step AP1 corresponds to step G511 to continued search and start step G512. The next step G501 determines if the rotor speed is greater than or equal to a predetermined level. More generally, step G501 can be arranged to determine if the conditions for switching to the back-EMF voltage mode have been met as shown in steps G406 and G415 in FIGS. 28A and 28B. If in step G501 the rotor speed is greater than or equal to the specified level, the back-EMF voltage mode in steps G509 and G510 is enabled. If the rotor speed is less than the specified level, step G513 resets the search reset counter to the initial value and the search step G502 executes again.

Step G501 determines whether to enter the back-EMF voltage mode, that is, whether the rotor was started or not. Whether starting the rotor succeeded is determined using three forward commutations of 60 degrees to 80 degrees in FIGS. 7A, 7B, 7C, 7D, 7E, 7F, 7G, 7H, and 7I, but whether the rotor started or not can be determined using a number of commutations other than three and forward commutation at an electrical angle other than 60 degrees to 80 degrees. Whether rotation started or not can also be determined based on whether the speed of rotation during the 60 degree to 80 degree forward commutation periods reaches a predetermined level. The signal for switching from the 60-degree forward rotation commutation period to the 80-degree forward rotation commutation period can also be used as the signal indicating that the rotor speed reached the predetermined level, and whether the rotor started turning can be determined from this signal.

Furthermore, a current profile must be created and a zero current period for detecting the zero cross of the back-EMF voltage must be provided in order to apply acceleration torque immediately after switching from the search and start mode to the back-EMF voltage mode. This zero current period is set according to the timing at which the back-EMF voltage is expected to cross zero based on the 60 degree to 80 degree commutation periods in the search and start mode.

The zero cross is detected after the semi-steady state step AP1 in FIGS. 7A, 7B, 7C, 7D, 7E, 7F, 7G, 7H, and 7I. Because the rotor position is detected in 60-degree ranges, the zero cross from positive to negative is detected, for example, from the back-EMF voltage of the W-phase winding that occurs in approximately the middle of the 60-degree range in the search and start mode. If the specified zero cross has not happened at the beginning of the zero cross detection period, operation waits until the zero cross is detected, and the 60-degree forward commutation is then detected based on the detected zero cross. In other words, when waiting for the W-phase winding back-EMF voltage to cross zero from positive to negative, the zero cross detection period continues until the specified zero cross is detected if the W-phase winding back-EMF voltage is still positive at the beginning of the back-EMF voltage detection period, and the zero cross occurs at the moment the W-phase winding back-EMF voltage goes negative. If the specified zero cross is determined to have already occurred from the polarity of the back-EMF voltage signal at the beginning of the back-EMF voltage zero cross detection period, the timing of the start of the back-EMF voltage zero cross detection period is used as the zero cross timing. More specifically, for example, crossing zero has already happened if the W-phase winding back-EMF voltage is already negative at the beginning of the detection period when waiting for the positive to negative zero cross of the W-phase winding back-EMF voltage.

First variation of the first embodiment

All six energized search phases shown in FIG. 6 and FIG. 8 are described using the example shown in FIGS. 7A, 7B, 7C, 7D, 7E, 7F, 7G, 7H, and 7I in the first embodiment above. The four different energized search phases are described below with reference to the example shown in FIGS. 9A, 9B, 9C, 9D, and 9E to illustrate the difference between the first embodiment and this first variation of the first embodiment. Other aspects of the arrangement, operation, and effect are the same as in the first embodiment above.

As will be known from FIG. 6 and FIG. 8, it is not necessary to apply a search pulse to all of the energized search phases.

Finding the rotor position is efficient because there is little overlap between the four search angle ranges based on any two energized search phases whether the energized search phases are U-->V (positive)/(negative), V-->U (positive)/(negative)
V-->W (positive)/(negative), W-->V (positive)/(negative)

or

W-->U (positive)/(negative), U-->W (positive)/(negative)

which correspond to (a) first phase-->second phase (positive)/(negative), second phase-->first phase (positive)/(negative)
(b) second phase-->third phase (positive)/(negative), third phase-->second phase (positive)/(negative)

or third phase-->first phase (positive)/(negative)
first phase-->third phase (positive)/(negative).

In the first search step one of these three search conditions is selected and a first search pulse is applied. If the rotor position cannot be detected, the polarity is reversed under the same condition and a second search pulse is applied. If the rotor position cannot be detected, another one of the three search conditions is selected and a third search pulse is applied. If the rotor position cannot be detected, the polarity is reversed under the same condition and a fourth search pulse is applied.

In the first variation of the first embodiment the energized search phases in FIG. 8 are selected in the order shown below in the first search step to find the rotor position.

(a) first phase-->second phase (positive)/(negative), second phase-->first phase (positive)/(negative)
(b) second phase-->third phase (positive)/(negative), third phase-->second phase (positive)/(negative)

that is,

U-->V (positive)/(negative), V-->U (positive)/(negative)
V-->W (positive)/(negative), W-->V (positive)/(negative).

As already described, the first search pulse in the second and later search steps uses the energized search phase where the rotor position was detectable in the first search step. If the rotor position cannot be detected, the energized search phase assuming the rotor has turned 60 degrees forward is used to apply the second search pulse.

FIGS. 9A, 9B, 9C, 9D, and 9E schematically show applying the search pulse and the starting pulse. In FIGS. 9A, 9B, 9C, 9D, and 9E time is shown on the x-axis, and FIGS. 9A, 9B, and 9C respectively show the U-phase winding current, the V-phase winding current, and the W-phase winding current.

Figure 9:
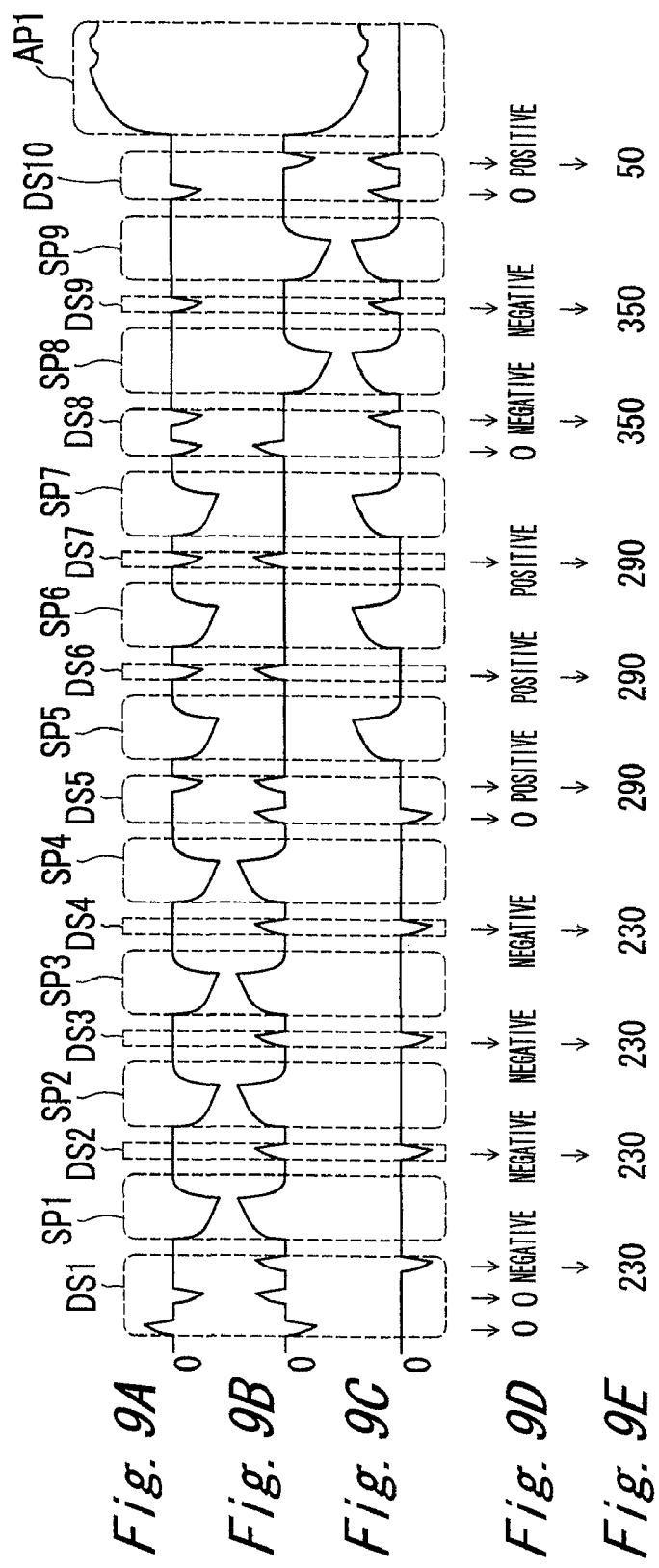
FIGS. 9A, 9B, 9C, 9D, and 9E are timing charts of detection pulse and starting pulse application in a first variation of the first embodiment of the invention.
Figure 10:
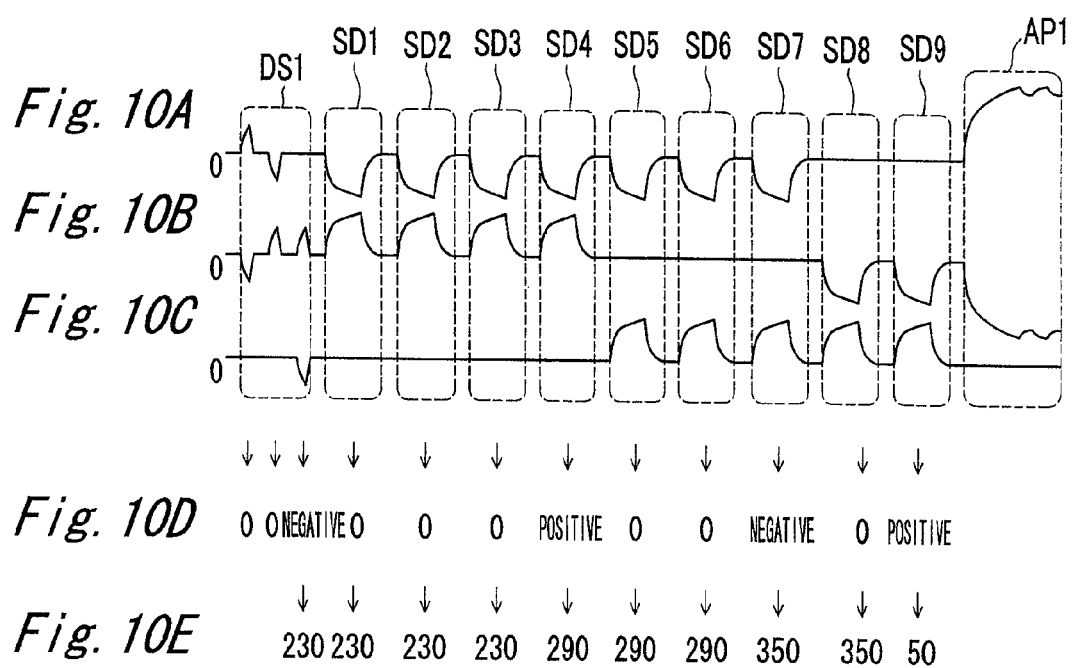
FIGS. 10A, 10B, 10C, 10D, and 10E are waveform diagrams of detection pulse and starting pulse application in a fourth variation of the first embodiment of the invention.

FIG. 9D shows the output of the comparator 21 and comparator 22 using the energized starting phase cycle FA, and FIG. 9E shows the result of rotor position detection. In FIG. 9D positive, negative, and 0 respectively denote that the comparator 21 outputs high, the comparator 22 outputs low, and that comparator 21 output is not high and comparator 22 output is not low. In FIG. 9E, 230, 290, 350, and 50 respectively denote that the rotor position was detected near 230 degrees, near 290 degrees, near 350 degrees, and near 50 degrees.

The search step shown in FIG. 27 for applying the search pulse four times is used for the first search step in FIGS. 9A, 9B, 9C, 9D, and 9E. The continued search and start step shown in FIG. 28A is used after the first search step.

In FIGS. 9A, 9B, 9C, 9D, and 9E DS1 denotes the first search step. In the four different energized search phases shown in FIG. 8, the search pulse is applied based on the flow chart in FIG. 27 in the state sequence F1, F4, F3 shown in FIG. 5. The first and second times the search pulse is applied the terminal difference voltage detection unit 13 cannot detect the rotor position. By turning on switches Q2 and Q6, the search pulse is applied from the second phase (V-phase) to the third (W-phase) the third time. The output of the comparator 22 goes low, and the over-threshold value signal S22 is sent to the commutation control unit 16. The rotor position is detected near 230 degrees, and the energized search phase selected at this time is stored. In the first starting step denoted SP1, switches Q2 and Q4 are turned on, the starting pulse is applied from the second phase (V-phase) to the first (U-phase), and suitable starting torque is applied to the rotor.

In the second search step DS2 the search pulse is applied in the previously stored energized search phase. Because the rotor speed is generally low when starting, the commutation frequency is sufficiently low compared with the number of times the rotor position is detected. In DS2 the output of the comparator 22 goes low again and the energized search phase at this time is stored. As in starting step SP1, the starting pulse is applied from the second phase (V-phase) to the first phase (U-phase) in the second starting step SP2 and suitable starting torque is applied to the rotor. In the third search step DS3 and starting step SP3, and in the fourth search step DS4 and starting step SP4, the starting pulse is again applied from the second phase (V-phase) to the first phase (U-phase).

The fifth search step DS5 applies two search pulses. Of these the first search pulse is applied in the previously stored energized search phase. The comparator 22 output does not go low this time. The second search pulse in the fifth search step DS5 is therefore applied from the second phase (V-phase) to the first phase (U-phase) as a result of turning switches Q2 and Q4 on based on the assumption that the rotor is advanced a 60 degree electrical angle from the previously assumed position to near 290 degrees. The output of the comparator 21 thus goes high, the rotor position is determined to be near 290 degrees, and the energized search phase at this time is stored. Next, in the fifth starting step SP5, switches Q3 and Q4 are turned on, the starting pulse is applied from the third phase (W-phase) to the first phase (U-phase), and suitable starting torque is applied to the rotor. In the sixth search step DS6 and starting step SP6, and in the seventh search step DS7 and starting step SP7, the starting pulse is again applied from the third phase (W-phase) to the first phase (U-phase).

The eighth search step DS8 applies two search pulses. Of these the first search pulse is applied in the previously stored energized search phase. The comparator 21 output does not go high this time. The second search pulse in the eighth search step DS8 is therefore applied from the third phase (W-phase) to the first phase (U-phase) as a result of turning switches Q3 and Q4 on based on the assumption that the rotor is advanced a 60 degree electrical angle from the previously assumed position to near 350 degrees. The output of the comparator 22 thus goes low, the rotor position is determined to be near 350 degrees, and the energized search phase at this time is stored. Next, in the eighth starting step SP8, switches Q3 and Q5 are turned on, the starting pulse is applied from the third phase (W-phase) to the second phase (V-phase), and suitable starting torque is applied to the rotor. In the ninth search step DS9 and starting step SP9 the starting pulse is again applied from the third phase (W-phase) to the second phase (V-phase).

The tenth search step DS10 applies two search pulses. Of these, the first pulse is applied in the previously stored energized search phase. The output of the comparator 21 does not go high this time. As the second search pulse in the tenth search step DS10, the search pulse is therefore applied from the third phase (W-phase) to the second phase (V-phase) by turning the switches Q3 and Q5 on assuming that the rotor has advanced a 60 degree electrical angle to near 50 degrees. The output of the comparator 21 goes high and the rotor position is determined to be near 50 degrees. Next, by turning the switches Q1 and Q5 on, drive current is supplied with PWM control from the U-phase to the V-phase and the rotor accelerates in the semi-steady state step AP1.

After the fifth search step DS5 that confirms the first 60-degree forward commutation, and the eighth search step DS8 that confirms the second 60-degree forward commutation, the tenth search step DS10 confirms a third 60-degree forward commutation. If it is determined that the rotor started turning as a result of these three 60 degree forward commutations, the back-EMF voltage mode is entered after the semi-steady state step AP1 and normal acceleration torque can be applied based on the rotor position detected from the back-EMF voltage.

Step G501 in FIG. 29 determines whether to enter the back-EMF voltage mode, that is, whether the rotor was started or not. Whether starting the rotor succeeded is determined using three forward commutations of 60 degrees in FIGS. 9A, 9B, 9C, 9D, and 9E, but whether the rotor started or not can be determined using a number of commutations other than three and forward commutation at an electrical angle other than 60 degrees, such as plural forward commutations including an electrical angle of 80 degrees. Whether rotation started or not can also be determined based on whether the speed of rotation during the 60 degree or 80 degree forward commutation periods reaches a predetermined level.

Second variation of the first embodiment

This second variation of the first embodiment is described with reference to the differences from the first embodiment. Other aspects of the arrangement, operation, and effect are the same as in the first embodiment above.

Figure 14:
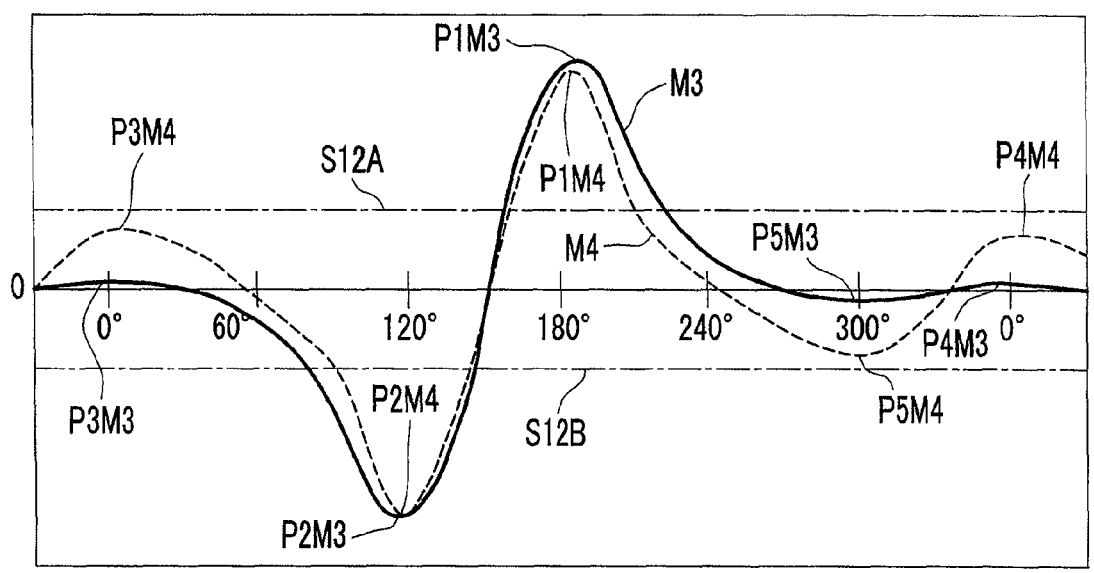
FIG. 14 is a waveform diagram of the terminal difference voltage in a second variation of the first embodiment of the invention.

FIG. 14 is a waveform diagram showing the terminal difference voltage relative to the rotor position as the current level of the search pulse changes when the search pulse is applied from the U-phase winding to the V-phase winding. In FIG. 14 the y-axis is the terminal difference voltage detected from the non-energized phase, and the x-axis is the rotor position. Reference numeral M3 is the terminal difference voltage when the search pulse current level is relatively high, and reference numeral M4 is the terminal difference voltage when the search pulse current level is relatively low. P1M3 and P1M4 denote the absolute maximum, P2M3 and P2M4 denote the absolute minimum, P3M3, P3M4 and P4M3, P4M4 denote local maximums, and P5M3 and P5M4 denote the local minimums, respectively, of terminal difference voltages M3 and M4. P3M4 and P4M4 are the same points on curve M4, and P4M3 and P4M3 are the same points on curve M3.

Because the local maximum and local minimum are lower when the search pulse is set high than when the search pulse is set low in FIG. 14, a large margin can be assured for the lower limit of the absolute value of the positive threshold value S12A and negative threshold value S12B. By appropriately controlling the level of the specific search pulse in the search step, the local maximum and local minimum of the terminal difference voltage can therefore be reduced at the ends of the zero-current winding and the rotor position can be correctly determined.

Applying the search pulse to the motor 1 is described with reference to FIG. 1A. The search pulse is basically applied by applying a specific voltage for a specific time between the winding terminals by turning the selected high potential side switches Q0, Q2, and Q3 and low potential side switches Q4, Q5, and Q6 on. The PWM control unit 17 produces the PWM control signal S17 that is set by an ON pulse S18 from the pulse generator 18, and outputs the PWM control signal S17 to the commutation control unit 16. The commutation control unit 16 switches particular switches to the PWM on state based on the PWM control signal S17 in the search angle range of the selected energized search phase. The search pulse current that starts to flow to the motor winding when the search pulse is applied is converted by the current detection resistance RD to a voltage. The end voltage of the current detection resistance RD is output by the amplifier 19 as the current detection signal S7. The detection control signal generating unit 9 generates a search control signal S9 indicating the search pulse level. The comparison unit 6 compares the current detection signal S7 and search control signal S9, and outputs OFF pulse S6 when the current detection signal S7 level reaches the search control signal S9 level. The PWM control unit 17 resets the PWM control signal S17 based on the OFF pulse S6.

The terminal difference voltage detection unit 13 detects the terminal difference voltage when the search pulse is applied. The absolute value of the terminal difference voltage may continue rising until a specific threshold value is exceeded depending on the rotor position. If the polarity of the difference between the terminal difference voltage and the specific threshold value is the same as the polarity of the terminal difference voltage, the terminal difference voltage detection unit 13 outputs over-threshold value signals S21 and S22 to the commutation control unit 16. The commutation control unit 16 latches the over-threshold value signals S21 and S22 when the PWM control signal S17 is reset, and sets the search pulse to the PWM off level.

Figure 15A:
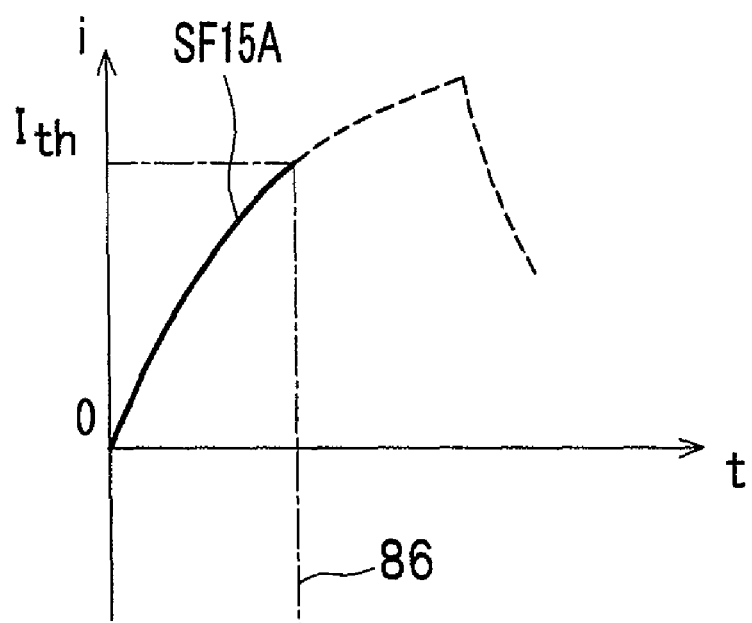
FIGS. 15A, 15B, and 15C are waveform diagrams of current peak control of the detection pulse in the second variation of the first embodiment of the invention.
Figure 15B:
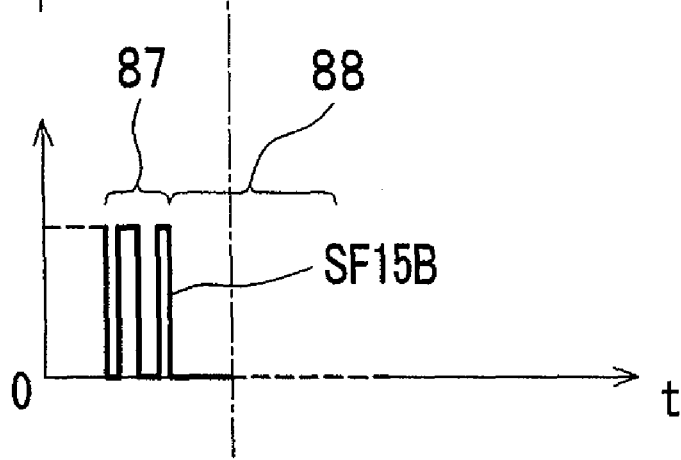
Figure 15C:
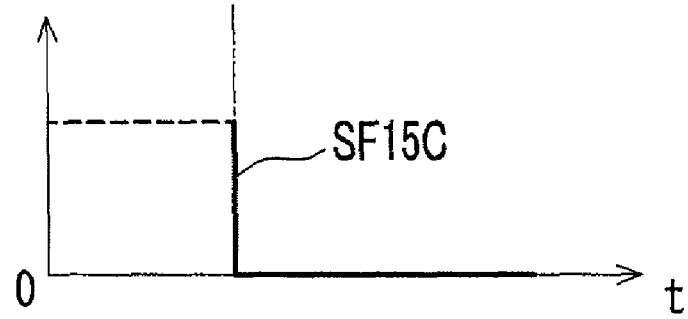

FIGS. 15A, 15B, and 15C show the search pulse current setting. FIGS. 15A, 15B, and 15C, respectively, show the search pulse current SF15A that is detected as the current detection signal S7, the over-threshold value signal S21 or S22 (labelled SF15B in the figure), and the over-threshold value signal SF15B latch signal SF15C when the search pulse current SF15A is rising. The OFF pulse S6 is generated at time 86 when the search pulse current SF15A goes to the level (Ith in the figure) of the search control signal S9. The OFF pulse S6 causes the over-threshold value signal SF15B to be latched and the search pulse to be set to the PWM off level.

In FIG. 14 the search pulse is applied in the search angle range of the energized search phase. The absolute value of the terminal difference voltage is consistently greater than the specific threshold value in the search angle range. The rotor position where the terminal difference voltage goes to the local maximum, local minimum, or other extreme is outside the search angle range. Erroneously detecting the rotor position at an extreme can therefore be prevented. Even if the rotor position is near the 0 degree position in FIG. 14 and the search pulse current is supplied by mistake, the local maximums P3M4, P3M3 near 0 degrees in FIG. 14 will be erroneously detected, and as the search pulse current SF15A rises, the over-threshold value signal SF15B will start chattering as shown in FIG. 15B. Depending on the level of the search pulse current SF15A, the over-threshold value signal SF15B thus has a chattering state 87 and a stable state 88 where the logic level is stable. The search step can be prevented from operating incorrectly by latching the over-threshold value signal SF15B by the OFF pulse S6 at a time 86 in the stable state 88 of the over-threshold value signal SF15B.

Figure 1B:
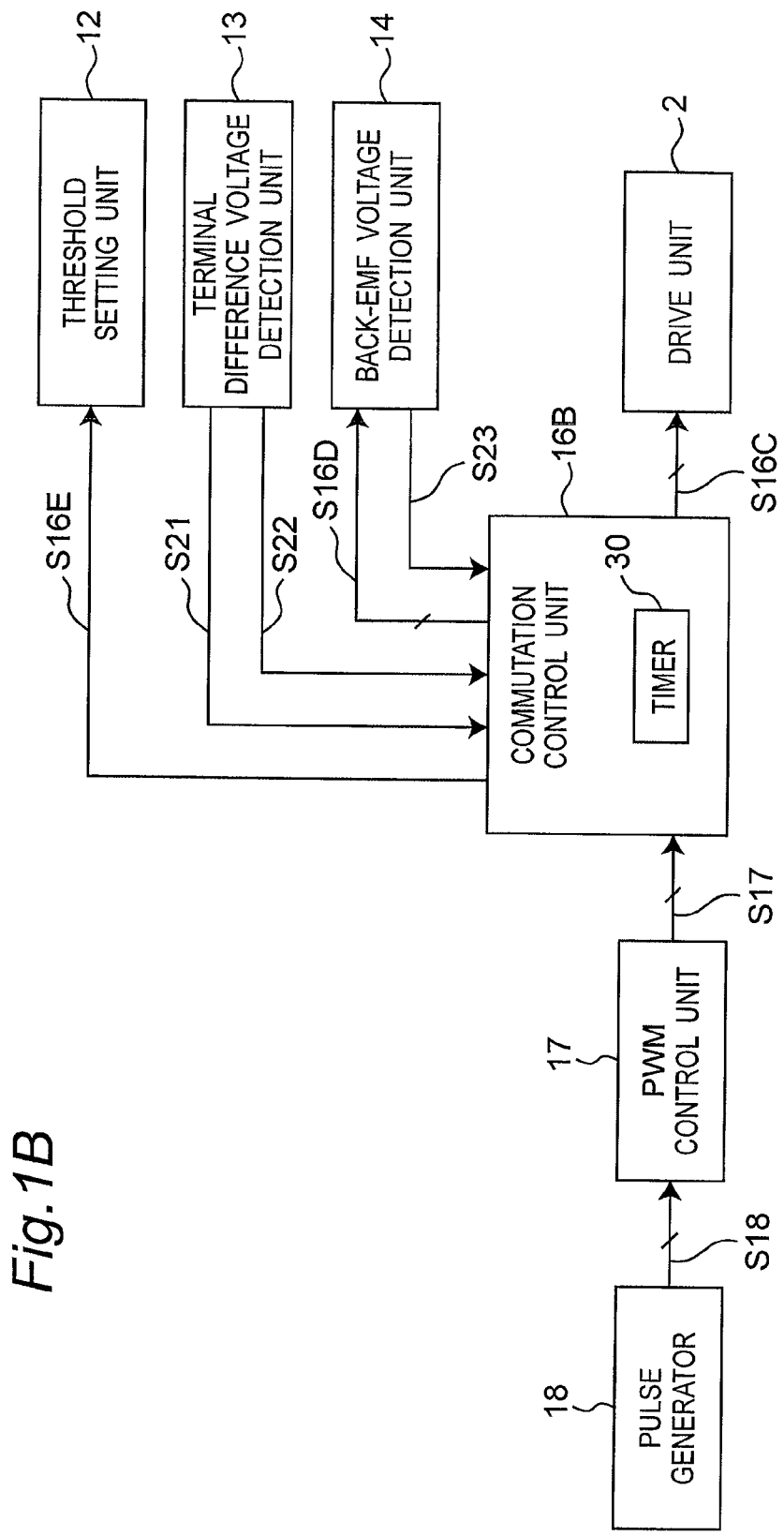
FIG. 1B is a block diagram showing the current control unit in the first embodiment of the invention.

FIGS. 16A, 16B, 16C, 16D, and 16E describe the operation of another arrangement using a sampling pulse. FIGS. 16A, 16B, and 16C, respectively, show the search pulse current SF16A that is detected as the current detection signal S7, the sampling pulse SF16B, and latch signal SF16C that latches the over-threshold value signal S21 or S22 at the sampling pulse SF16B when the search pulse current SF16A is rising. The sampling pulse SF16B is output by a timer 30 in the commutation control unit 16B shown in FIG. 1B. The timer 30 starts counting when the PWM control signal S17 is set by the ON pulse S18, and outputs the sampling pulse SF16B after a predetermined delay. Because the waveform of the search pulse current SF16A is substantially constant, the sampling pulse SF16B is output when the search pulse current SF16A reaches a specific level. When the search pulse current SF16A reaches the level of the search control signal S9 (Ith in the figure), the commutation control unit 16B latches the over-threshold value signals S21 and S22 at the sampling pulse SF16B, and sets the search pulse to the PWM off level.

Although not shown in the figures, an arrangement for getting the OFF pulse S6 (shown as SF16B) is described next. Using two comparators, the search control signal S9 (Ith in the figures) is input to the non-inverted input terminal of one comparator and a specific threshold voltage that is slightly lower than the search control signal S9 is input to the inverted input terminal of the other comparator. The search pulse current SF16A is applied to the other input terminals of the two comparators. If the output of the two comparators is input to an AND circuit, the output of the AND will be a pulse signal that is output when the search pulse current SF16A passes near the search control signal S9. This pulse signal is produced twice, when the search pulse current SF16A is rising and falling, and the OFF pulse S6 is acquired by using a mask circuit to block pulse signal output when the search pulse current SF16A is dropping.

FIGS. 16D and 16E, respectively, show the search pulse current SF16D that is detected as the current detection signal S7, and the sampling pulse SF16E when the search pulse current SF16D is falling. The sampling pulse SF16E is output by a timer 30 in the commutation control unit 16B shown in FIG. 1B. The timer 30 starts counting when the PWM control signal S17 is set by the ON pulse S18, and outputs the sampling pulse SF16E after a predetermined delay. Because the waveform of the search pulse current SF16D is substantially constant, the sampling pulse SF16E is output when the search pulse current SF16D reaches a specific level. When the search pulse current SF16D reaches the level of the search control signal S9 (Ith in the figure), the commutation control unit 16B latches the over-threshold value signals S21 and S22 at the sampling pulse SF16E.

The sampling pulse SF16B described above is used as the OFF pulse S6. Although not shown in the figures, an arrangement for getting the sampling pulse SF16E is described next. Using two comparators, the search control signal S9 (Ith in the figures) is input to the non-inverted input terminal of one comparator and a specific threshold voltage that is slightly lower than the search control signal S9 is input to the inverted input terminal of the other comparator. The search pulse current SF16D is applied to the other input terminals of the two comparators. If the output of the two comparators is input to an AND circuit, the output of the AND will be a pulse signal that is output when the search pulse current SF16A passes near the search control signal S9. This pulse signal is produced twice, when the search pulse current SF16D is rising and falling, and the sampling pulse SF16E is acquired by using a mask circuit to block pulse signal output when the search pulse current SF16D is rising.

Third variation of the first embodiment

This third variation of the first embodiment is described with reference to the differences from the first embodiment. Other aspects of the arrangement, operation, and effect are the same as in the first embodiment above.

Figure 17A:
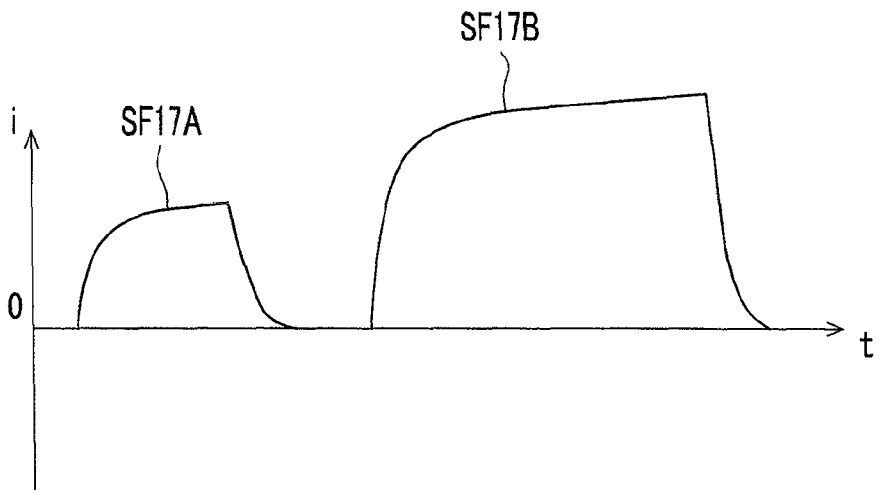
FIGS. 17A and 17B are waveform diagrams of the detection pulse and starting pulse.
Figure 17B:
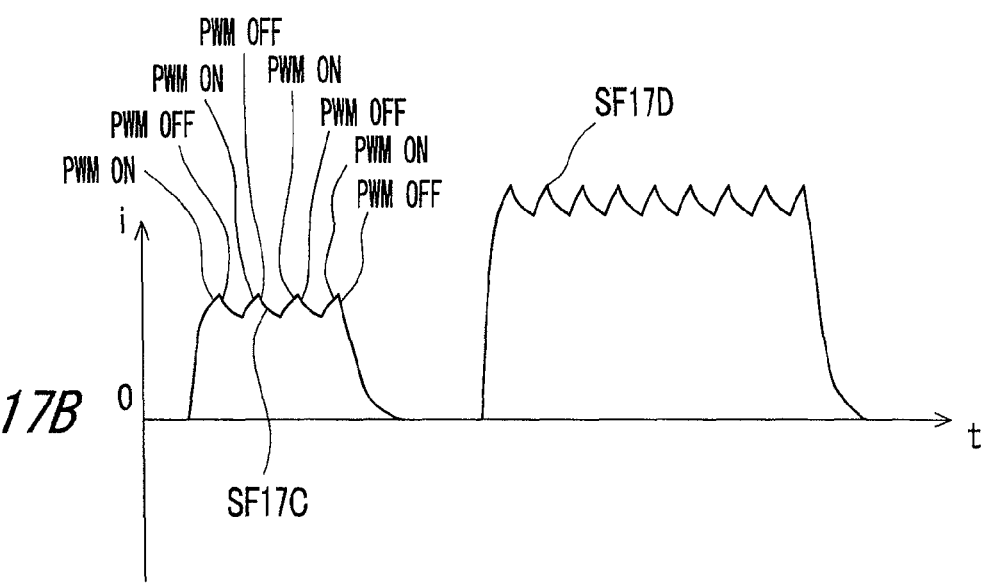

The starting pulse is applied to the energized starting phase based on the detected rotor position. Applying the energized starting phase is described next with reference to FIGS. 17A and 17B. The search pulse and starting pulse have both been described so far as being a single pulse as shown in FIG. 17A. There are cases, however, when the period for which the starting pulse is applied becomes long, resulting in an excessive current rise that can cause reliability problems. This can be avoided by using PWM drive control as shown in FIG. 17B. Based on the starting control signal S10 from the startup control signal generating unit 10, PWM turns off when a current peak is reached and turns on again after waiting a predetermined time. This maintains reliability by holding the current level substantially constant. The current level of the search pulse can also be PWM controlled as shown in FIG. 17A, and this has the effect of preventing false detection of the rotor position.

The above description is based on the search pulse current level trending up. The rotor position can also be detected when the search pulse current level is trending down as described below.

Figure 18:
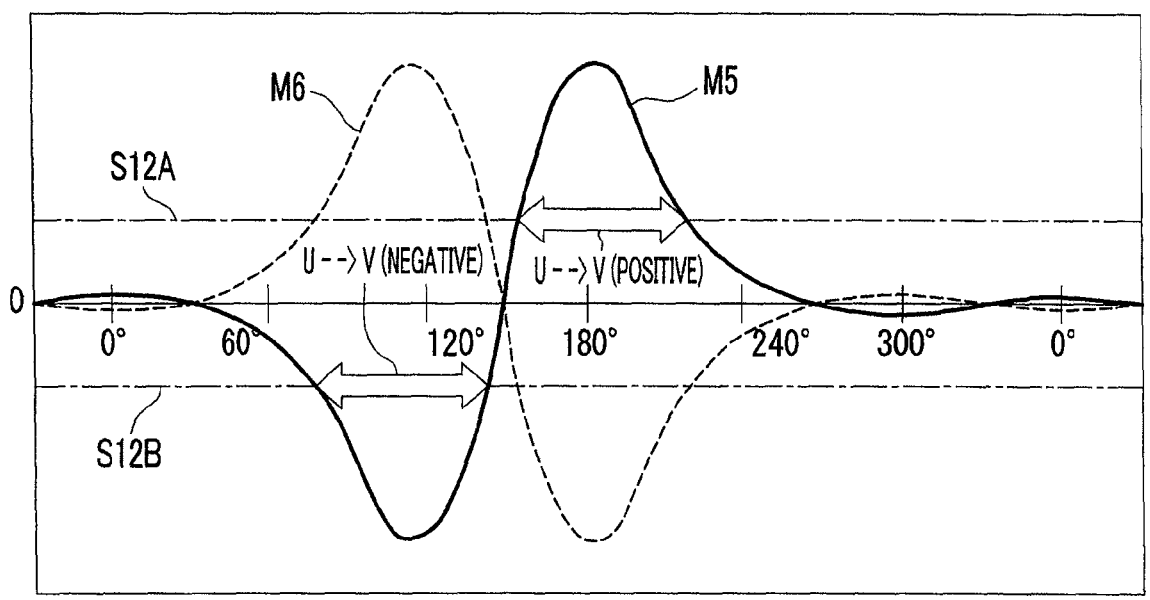
FIG. 18 is a waveform diagram of the terminal difference voltage in a seventh variation of the first embodiment of the invention.

FIG. 18 is a waveform diagram of the terminal difference voltage when the search pulse current is rising and falling. The rotor position is shown on the x-axis when the search pulse is applied from the U-phase to the V-phase. Reference numeral M5 is the terminal difference voltage when the search pulse current is rising, and corresponds to M1 in FIGS. 3A and 3B. Reference numeral M6 is the terminal difference voltage when the search pulse current is falling.

The terminal difference voltage is detected as the product of inductance and current change, and if the rotor is at the same position, the terminal difference voltage M5 when the current is rising and the terminal difference voltage M6 when the current is dropping are inverse polarity. More specifically, to set threshold values for the terminal difference voltage M5 when current is rising and the terminal difference voltage M6 when current is dropping, the specific threshold values are set so that polarity is opposite at the same rotor position.

Referring to FIG. 17B, for example, PWM switches on and off, and terminal difference voltages of opposite polarity can be detected in the PWM on mode and PWM off mode. In FIG. 5 when the rotor position is at 230 degrees and the starting pulse flows from the V-phase node to the W-phase node, the output of the comparator 22 goes low in the PWM on period when the current is rising. However, in the PWM off period when the current level is dropping, the output of comparator 21 goes high. More specifically, FIG. 5 shows the different states in the PWM on period of the search and start step, and in the PWM off period the polarity of the threshold value of the terminal difference voltage detection unit 13 is opposite that shown in FIGS. 22A, 22B, and 22C. A more flexible arrangement is thus afforded by using either or both the PWM on period and PWM off period.

Fourth variation of the first embodiment

This fourth variation of the first embodiment combines the starting step and the search step, and is described with reference to the differences from the first embodiment. Other aspects of the arrangement, operation, and effect are the same as in the first embodiment above.

FIGS. 10A, 10B, 10C, 10D, and 10E are schematic timing charts simplifying the search and start step shown in FIGS. 9A, 9B, 9C, 9D, and 9E. In this fourth variation of the first embodiment the starting pulse is applied from the V-phase to the U-phase in the first starting step SD1. The second search step DS2 is skipped, and the first starting step SD1 is also used as the second search step. More specifically, the second starting step SD2 uses the energized search phase acquired by the terminal difference voltage detection unit 13 in the first starting step SD1. The W-phase terminal difference voltage is low in the starting steps SD1, SD2, SD3 that are also used as search steps. The rotor is conceivably near 50 degrees, near 110 degrees, near 170 degrees, or near 230 degrees, but the rotor is not commutated and is determined to be near 230 degrees. The rotor is assumed to rotate forward slightly in each starting step SD1, SD2, SD3, and in this sense it is correct to assume that the rotor is still near the 230-degree position.

In the next search and start step SD4 the W-phase terminal difference voltage goes to or above the positive threshold value S12A and the rotor is determined to have commutated 60 degrees forward to near 290 degrees. The starting pulse is applied from the W-phase to the U-phase in the fifth search and start step SD5 and the sixth search and start step SD6, but the rotor is not commutated and is assumed to be near the same 290 degree position. In the seventh search and start step SD7 the V-phase terminal difference voltage goes to or below the negative threshold value S12B, and the rotor is determined to have commutated 60 degrees forward to near 350 degrees. In the next search and start step SD8 the starting pulse is applied from the W-phase to the V-phase but the rotor does not commutate. In the final search and start step SD9 the U-phase terminal difference voltage goes to or above the positive threshold value S12A and the rotor is determined to have commutated 60 degrees forward to near 50 degrees. This step SD9 confirms the third 60-degree forward commutation, and control then goes to the back-EMF voltage mode.

FIG. 28B is a flow chart of this operation. In FIG. 28B the starting pulse is also used as the search pulse. More specifically, applying the starting pulse causes an initial starting pulse to be applied to the rotor, causes the terminal difference voltage detection unit 13 to detect the terminal difference voltage, and confirms the rotor position. The step G402 for applying the search pulse in FIG. 28A is omitted from the flow chart shown in FIG. 28B. After completing the continued search and start step G512, step G415 determines whether to enter the back-EMF voltage mode. This second variation of the first embodiment can increase rotor acceleration during startup by using the starting pulse instead of the search pulse, which does not contribute to torque.

FIGS. 11A, 11B, 11C, 11D, and 11E are schematic timing charts simplifying the search and start step shown in FIGS. 10A, 10B, 10C, 10D, and 10E. In FIGS. 10A, 10B, 10C, 10D, and 10E the starting pulse periods SD1 to SD4 are periods of independent pulse wave trains. As indicated by the current waveforms in FIGS. 11A, 11B, 11C, 11D, and 11E, however, the starting pulse periods SD11 to SD13 are the PWM drive periods in which the peak current level is controlled. The solid line arrows in FIG. 11D denote the periods when the absolute value of the current is rising. If the terminal difference voltage in the rising current period in SD11 is greater than or equal to a positive threshold value, the rotor is positioned at 290 degrees. If the terminal difference voltage in the rising current periods in SD12 and SD13 is less than or equal to a negative threshold value and greater than or equal to a positive threshold value, the rotor is positioned at 350 degrees and 50 degrees, respectively.

Figure 11:
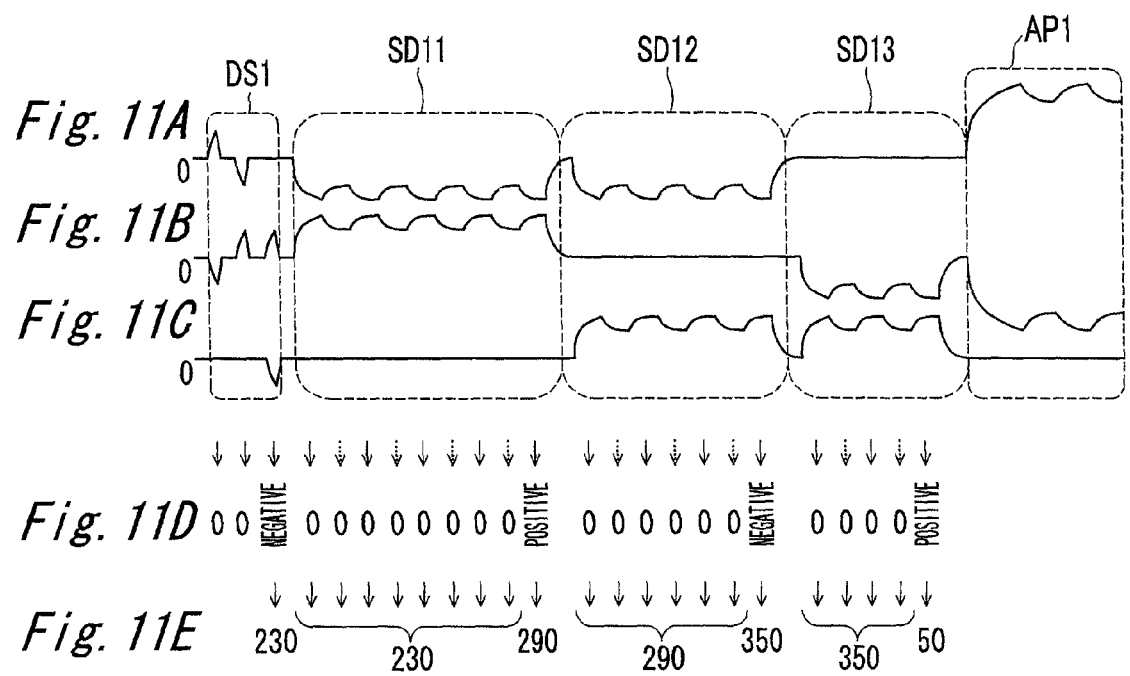
FIGS. 11A, 11B, 11C, 11D, and 11E are waveform diagrams of detection pulse and starting pulse application in a fourth variation of the first embodiment of the invention.

The dotted line arrows in FIG. 11D denote the periods when the absolute value of the current is falling. If the terminal difference voltage in the falling current period in SD11 is less than or equal to a negative threshold value, the rotor is positioned at 290 degrees. If the terminal difference voltage in the falling current periods in SD12 and SD13 is greater than or equal to a positive threshold value and less than or equal to a negative threshold value, the rotor is positioned at 350 degrees and 50 degrees, respectively. Either one or both of the terminal difference voltage that appears in the rising current period and the terminal difference voltage that appears in the falling current period can be used. If both are used the torque current used for starting is continuous and greater starting acceleration can be achieved than is possible with the arrangement shown in FIGS. 10A, 10B, 10C, 10D, and 10E.

FIG. 28B is a flow chart of this operation. In FIG. 28B the starting pulse is also used as the search pulse. More specifically, applying the starting pulse causes an initial starting pulse to be applied to the rotor, causes the terminal difference voltage detection unit 13 to detect the terminal difference voltage, and confirms the rotor position. The step G402 for applying the search pulse in FIG. 28A is omitted from the flow chart shown in FIG. 28B. After completing the continued search and start step G512, step G415 determines whether to enter the back-EMF voltage mode. This second variation of the first embodiment can increase rotor acceleration during startup by using the starting pulse instead of the search pulse, which does not contribute to torque.

Fifth variation of the first embodiment

This fifth variation of the first embodiment differs from the first embodiment in the method of setting the specific threshold values of the terminal difference voltage detection unit 13. Other aspects of the arrangement, operation, and effect are the same as in the first embodiment above.

The threshold level suitable to the terminal difference voltage detection unit 13 depends upon the motor, and the threshold value must therefore be adjusted appropriately for each motor. If the threshold value is too high, the search angle range indicated by the arrows in FIGS. 3A and 3B, for example, will narrow, resulting in undetectable rotor positions. If too low, the local maximum or local minimum may be incorrectly detected as the absolute maximum or absolute minimum. When the threshold values are self-adjusted automatically, the absolute value of the initial threshold value is set on the high side. There are also cases in which the output of the terminal difference voltage detection unit 13 does not go high or low, that is, cases in which the rotor position cannot be determined, even after six different types of search pulses are applied. In this case the threshold value is lowered a specific amount and the search step is repeated, or a specific kick pulse is applied and the search step is repeated. By thus updating the threshold value when there are rotor positions that cannot be detected, the undetectable rotor positions can be eliminated. This can be achieved by providing the threshold setting unit 12 with non-volatile memory and storing the adjusted threshold value to enable finding the rotor position quickly the next time.

This process for updating the threshold level is in the search reset step in FIG. 25, FIG. 26, and FIG. 27. FIG. 29 is a flow chart with the search step shown in FIG. 25 to FIGS. 28A and 28B, and adds a step for lowering the absolute value of the threshold value. If the rotor position cannot be detected even though the threshold value is changed, a step for switching to the synchronous starting mode for starting the rotor with synchronous drive or a step for switching to the back-EMF voltage mode is added.

The condition for switching to the back-EMF voltage mode in FIGS. 28A and 28B is that the rotor speed is greater than or equal to a predetermined level in FIG. 29. In the search step G502, the six energized search phases shown in FIG. 25 and FIG. 26 or the four energized search phases shown in FIG. 27 are used. If the rotor position cannot be determined even after applying the search pulse to the six or four energized search phases in the search step G502, the search reset step G503 is executed.

The search reset step G503 first determines in step G504 if the absolute value of the terminal difference voltage detection unit 13 threshold value has reached a lower limit. If it has not, the absolute value of the threshold value is lowered a specific amount in step G505 and the search step G502 then repeats. If the rotor position cannot be detected after applying all search pulse variations even lowering the terminal difference voltage detection unit 13 threshold value the predetermined amount, the absolute value of the terminal difference voltage detection unit 13 threshold value is again lowered a specific amount in the same way. This process of lowering the absolute value of the terminal difference voltage detection unit 13 threshold value continues repeating if the rotor position is not detected until the absolute value of the threshold value of the terminal difference voltage detection unit 13 reaches the lower limit.

When the absolute value of the terminal difference voltage detection unit 13 threshold value reaches the lower limit, a kick pulse is applied a specific number of times to move the rotor position. The search step G502 then repeats. The search reset counter counts the number of times the search reset step G503 executes and the search step G502 executes again. When this specific count is reached, rotor position detection by applying a search pulse is aborted, a rotating field with a specific speed is produced in the stator, and starting the motor shifts to the synchronous starting mode. The startup speed is slower in the synchronous starting mode but the synchronous starting mode enables reliably starting the motor when the rotor position is unknown.

In the search and start mode the terminal difference voltage detection unit 13 detects the rotor position, applies a starting pulse based on the result of rotor position detection, and repeats the search step and starting step until the rotor speed rises to a predetermined level. When this rotor speed is reached the absolute value of the threshold value in the comparator of the back-EMF voltage detection unit 14 that is shared with the terminal difference voltage detection unit 13 is changed to a specific value suited to the back-EMF voltage mode, and operation proceeds in the back-EMF voltage mode.

Sixth variation of the first embodiment

This sixth variation of the first embodiment differs from the first embodiment in the use of the kick pulse as described below. Other aspects of the arrangement, operation, and effect are the same as in the first embodiment above.

Figure 30:
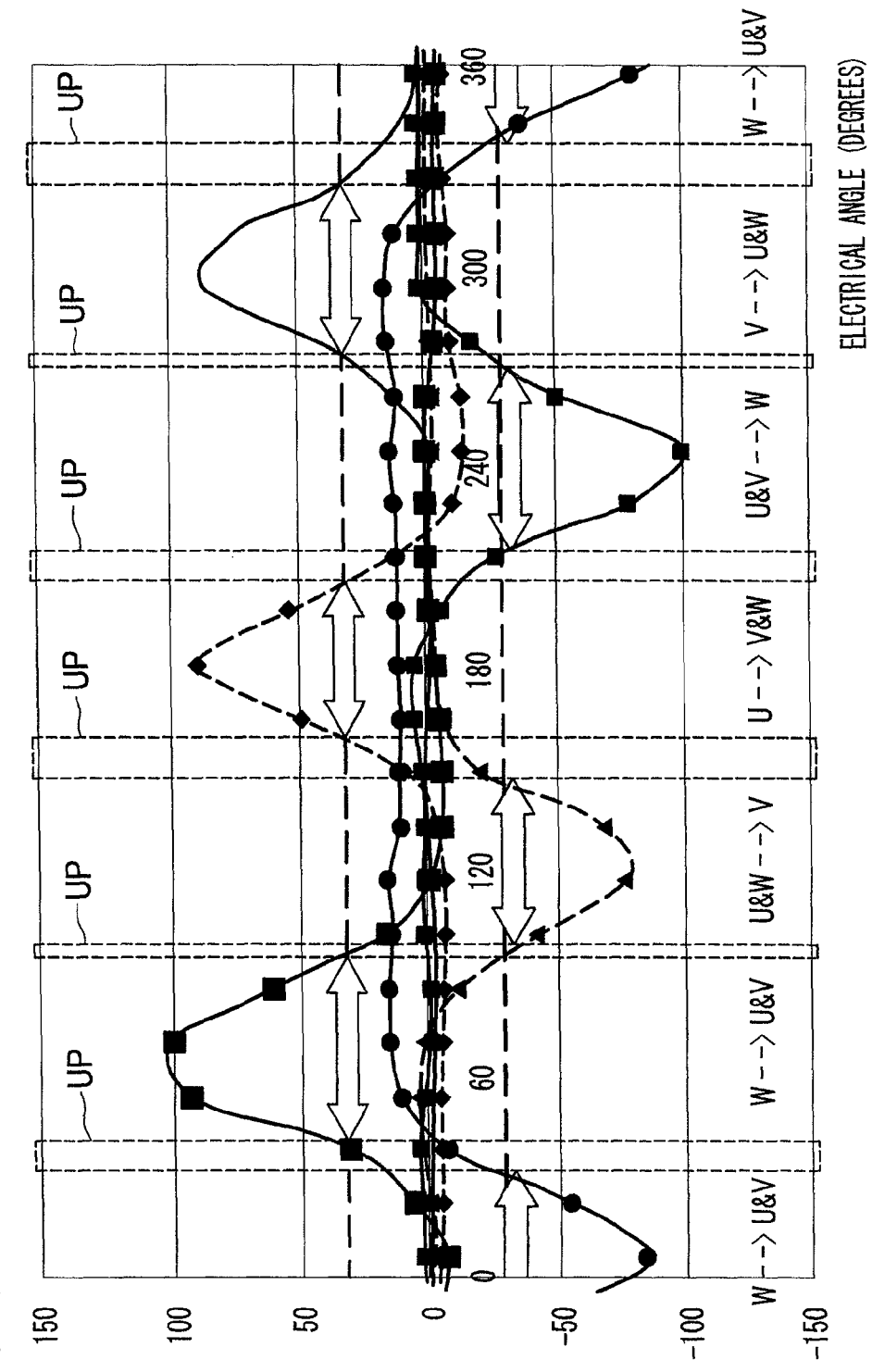
FIG. 30 is a waveform diagram of neutral point difference voltage measurements in a three-phase brushless motor.

FIG. 30 is a waveform diagram showing the results of measuring the terminal difference voltage when three phases are energized in a modern three-phase brushless motor 1B. The x-axis in FIG. 30 denotes the electrical angle (degrees) and the y-axis denotes the terminal difference voltage referenced to the pseudo-neutral-point voltage SPN. As will be known from FIG. 30, the three-phase brushless motor 1B has six undetectable angle ranges UP where the rotor position cannot be determined.

In such cases it is useful to add the operation for applying a kick pulse to move the rotor position to the search and start mode. The undetectable angle ranges UP are narrow relative to the total electrical angle range. The rotor position is therefore detected using a specific operation and a predetermined kick pulse is applied if the rotor position cannot be determined. Causing the rotor position to shift slightly from the current position makes it possible to then detect the rotor position. A kick pulse train of plural pulses is therefore applied so that at least one pulse produces torque exceeding a predetermined level. For example, if two different pulses with a 90-degree phase shift are applied where the maximum torque is 1, torque of at least 0.71 can be applied. If three different pulses with a phase shift of 60 degrees or 120 degrees are applied where the maximum torque is 1, torque of at least 0.87 can be applied. If two different pulses with a phase shift of 60 degrees or 120 degrees are applied where the maximum torque is 1, torque of at least 0.50 can be applied. The combination of different pulses with a phase shift of 60 degrees or 120 degrees can be prepared to apply a current pulse to any two of the three phase windings in FIGS. 20A and 20B. The pulses with a 90-degree phase shift are applied the first time to any two of the three phase windings, and the second time to a node common to these two terminals and to the remaining one terminal. The process for applying the kick pulses is inserted to the flow chart shown in FIG. 29. It will also be obvious that applying kick pulses to the three phase windings can be adapted to the two-phase or three-phase energizing modes described herein.

FIGS. 12A, 12B, 12C, 12D, and 12E schematically describe applying a starting pulse and a search pulse including a kick pulse. As shown in FIGS. 12A, 12B, 12C, 12D, and 12E, if the rotor position cannot be determined in the first search step, three kick pulses are applied three times to two phases at a 60-degree phase shift. In the second search step the search step is executed in the same order as the first search step to detect the rotor position. As described above, however, in the third and later search steps the first search pulse uses the energized search phase where the rotor position was detected in the previous search step, but if the rotor position is not detected the second search pulse uses the energized search phase in which the rotor is advanced 60 degrees forward. In FIGS. 12A, 12B, 12C, 12D, and 12E time is shown on the x-axis, and FIGS. 12A, 12B, and 12C respectively show the U-phase winding current, the V-phase winding current, and the W-phase winding current.

Figure 12:
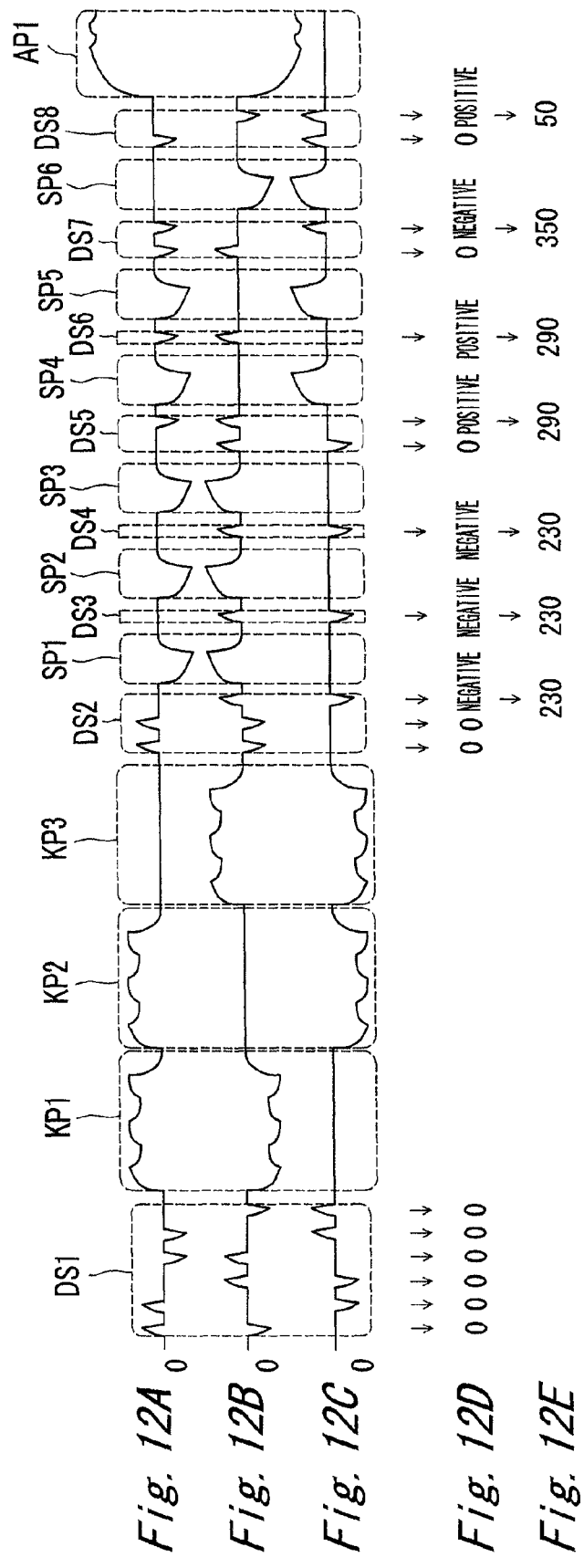
FIGS. 12A, 12B, 12C, 12D, and 12E are waveform diagrams of detection pulse and starting pulse application in a sixth variation of the first embodiment of the invention.

FIG. 12D shows the output of the comparator 21 and the comparator 22 using the energized starting phase cycle shown in FIG. 5, and FIG. 12E shows the result of rotor position detection. In FIG. 12D positive, negative, and 0 respectively denote that the comparator 21 outputs high, the comparator 22 outputs low, and that output of the comparator 21 is not high and the output of the comparator 22 is not low. In FIG. 12E, 230, 290, 350, and 50 respectively denote that the rotor position was detected near 230 degrees, near 290 degrees, near 350 degrees, and near 50 degrees.

The search step shown in FIG. 26 for applying the search pulse six times is used for the first search step in FIGS. 12A, 12B, 12C, 12D, and 12E. The continued search and start step shown in FIG. 28A is used after the first search step.

In FIGS. 12A, 12B, 12C, 12D, and 12E DS1 denotes the first search step. Of the six different energized search phases shown in FIG. 5, the search pulse is applied based on the flow chart in FIG. 25 in the state sequence F1, F2, F3, F4, F5, F6. In the example shown in FIGS. 12A, 12B, 12C, 12D, and 12E the terminal difference voltage detection unit 13 was unable to detect the rotor position even though the search pulse was applied to all six different energized search phases.

To move the rotor position slightly, kick pulses shifted 60 degrees from each other are applied with PWM drive control three times to two phases in the order KP1, KP2, KP3.

The first kick pulse KP1 flows from the U-phase to the V-phase by PWM drive control turning switches Q1 and Q5 on and off. The next kick pulse KP2 flows from the U-phase to the W-phase by PWM drive control turning switches Q1 and Q6 on and off. The next kick pulse KP3 flows from the V-phase to the W-phase by PWM drive control turning switches Q2 and Q6 on and off. These three kick pulses thus cause the rotor position to shift slightly.

The first search pulse applied in the second search step DS2 is applied in the same way as in the first search step DS1. The terminal difference voltage detection unit 13 cannot detect the rotor position the first and second times, however. The third time, the search pulse is applied from the V-phase to the W-phase by turning switches Q2, and Q6 on. The comparator 22 outputs low and the over-threshold value signal S22 is output to the commutation control unit 16. The rotor position is determined to be near 230 degrees, and the energized search phase at this time is saved. In the first starting step denoted SP1, switches Q2 and Q4 are turned on, the starting pulse is applied from the V-phase to the U-phase, and suitable starting torque is applied to the rotor.

In the third search step DS3 the search pulse is applied in the previously stored energized search phase. Because the rotor speed is generally low when starting, the commutation frequency is sufficiently low compared with the number of times the rotor position is detected. In DS3 the output of the comparator 22 goes low again and the energized search phase at this time is stored. As in starting step SP1, the starting pulse is applied from the V-phase to the U-phase in the second starting step SP2 and suitable starting torque is applied to the rotor. In the fourth search step DS4 and the third starting step SP3 the starting pulse is again applied from the V-phase to the U-phase.

The fifth search step DS5 applies two search pulses. Of these the first search pulse is applied in the previously stored energized search phase. The output of the comparator 22 does not go low this time. The second search pulse in the fifth search step DS5 is therefore applied from the V-phase to the U-phase as a result of turning switches Q2 and Q4 on based on the assumption that the rotor is advanced a 60 degree electrical angle from the previously assumed position to near 290 degrees. The output of the comparator 22 thus goes high, the rotor position is determined to be near 290 degrees, and the energized search phase at this time is stored. Next, in the fourth starting step SP4, switches Q3 and Q4 are turned on, the starting pulse is applied from the W-phase to the U-phase, and suitable starting torque is applied to the rotor. In the sixth search step DS6 and fifth starting step SP5 the starting pulse is again applied from the W-phase to the U-phase.

The seventh search step DS7 applies two search pulses. Of these the first search pulse is applied in the previously stored energized search phase. The output of the comparator 21 does not go high this time. The second search pulse in the seventh search step DS7 is therefore applied from the W-phase to the U-phase as a result of turning switches Q3 and Q4 on based on the assumption that the rotor is advanced a 60 degree electrical angle from the previously assumed position to near 350 degrees. The output of the comparator 22 thus goes low, the rotor position is determined to be near 350 degrees, and the energized search phase at this time is stored. Next, in the sixth starting step SP6, switches Q3 and Q5 are turned on, the starting pulse is applied from the W-phase to the V-phase, and suitable starting torque is applied to the rotor.

The eighth search step DS8 applies two search pulses. Of these the first search pulse is applied in the previously stored energized search phase. The output of the comparator 22 does not go low this time. The second search pulse in the eighth search step DS8 is therefore applied from the W-phase to the V-phase as a result of turning switches Q3 and Q5 on based on the assumption that the rotor is advanced a 60 degree electrical angle from the previously assumed position to near 50 degrees. The output of the comparator 21 thus goes high. Based on the second search pulse in the eighth search step DS8 the rotor is therefore determined to be near 50 degrees rotated a 60 degree electrical angle. Next, by turning the switches Q1 and Q5 on, drive current is supplied based on PWM control from the U-phase to the V-phase and the rotor accelerates in the semi-steady state step AP1.

After the fifth search step DS5 that confirms the first 60-degree forward commutation, and the seventh search step DS7 that confirms the second 60-degree forward commutation, the eighth search step DS8 confirms a third 60-degree forward commutation. If it is determined that the rotor started turning as a result of these three 60 degree forward commutations, the back-EMF voltage mode is entered after the semi-steady state step AP1 and normal acceleration torque can be applied based on the rotor position detected from the back-EMF voltage.

In this aspect of the invention the rotor is determined to have started turning successfully when three 60-degree forward commutations are confirmed, but whether the rotor started turning can alternatively be determined using a count other than three and an electrical angle other than 60 degrees. Whether the rotor started turning can also be determined based on whether the rotor speed achieved during the period in which the three 60-degree forward commutations were detected reaches a specific speed.

Furthermore, a current profile must be created and a zero current period for detecting the zero cross of the back-EMF voltage must be provided in order to apply acceleration torque immediately after switching from the search and start mode to the back-EMF voltage mode. This zero current period is set according to the timing at which the back-EMF voltage is expected to cross zero based on the 60 degree commutation periods in the search and start mode.

Seventh variation of the first embodiment

This seventh variation of the first embodiment is described with reference to the differences from the first embodiment. Other aspects of the arrangement, operation, and effect are the same as in the first embodiment above.

The starting pulse is applied to the energized starting phase based on the detected rotor position. Applying the energized starting phase is described next with reference to FIGS. 17A and 17B. The search pulse and starting pulse have both been described so far as being a single pulse as shown in FIG. 17A. There are cases, however, when the period for which the starting pulse is applied becomes long, resulting in an excessive current rise that can cause reliability problems. This can be avoided by using PWM drive control as shown in FIG. 17B. Based on the starting control signal S10 from the startup control signal generating unit 10, PWM turns off when a current peak is reached and turns on again after waiting a predetermined time. This maintains reliability by holding the current level substantially constant. The current level of the search pulse can also be PWM controlled as shown in FIG. 17A, and this has the effect of preventing false detection of the rotor position.

The above description is based on the search pulse current level trending up. The rotor position can also be detected when the search pulse current level is trending down as described below.

FIG. 18 is a waveform diagram of the terminal difference voltage when the search pulse current is rising and falling using three energized phases. The rotor position is shown on the x-axis when the search pulse is applied from the U-phase to the V-phase. Reference numeral M5 is the terminal difference voltage when the search pulse current is rising, and corresponds to M3 in FIG. 21A, 21B, 21C, and 21D. Reference numeral M6 is the terminal difference voltage when the search pulse current is falling.

The terminal difference voltage is detected as the product of inductance and current change, and if the rotor is at the same position, the terminal difference voltage M5 when the current is rising and the terminal difference voltage M6 when the current is dropping are inverse polarity. More specifically, to set threshold values for the terminal difference voltage M5 when current is rising and the terminal difference voltage M6 when current is dropping, the specific threshold values are set so that polarity is opposite at the same rotor position.

Referring to FIG. 17B, for example, PWM switches on and off, and terminal difference voltages of opposite polarity can be detected in the PWM on mode and PWM off mode. In FIG. 5 when the rotor position is at 230 degrees and the starting pulse flows from the V-phase to the W-phase terminal, the output of the comparator 22 goes high in the PWM on period when the current is rising. However, in the PWM off period when the current level is dropping, the output of comparator 21 goes low. More specifically, FIG. 5 shows the different states in the PWM on period of the search and start step, and in the PWM off period the polarity of the threshold value of the terminal difference voltage detection unit 13 is opposite that shown in FIG. 5. A more flexible arrangement is thus afforded by using either or both the PWM on period and PWM off period.

FIGS. 13A, 13B, 13C, 13D, and 13E show an example in which the PWM off state is used as described above, and schematically describes applying a starting pulse and a search pulse including a kick pulse. As shown in FIGS. 13A, 13B, 13C, 13D, and 13E, if the rotor position cannot be determined in the first search step, three kick pulses are applied three times to the two phases at a 60-degree phase shift. The second search step applies a kick pulse that also functions as a search pulse to move the rotor slightly so that the terminal difference voltage detection unit 13 can detect the rotor position. As a result, the rotor position can be detected by the third kick pulse. As described above, however, in the third and later search steps the first search pulse uses the energized search phase where the rotor position was detected in the previous search step, but if the rotor position is not detected the second search pulse uses the energized search phase in which the rotor is advanced 60 degrees forward. In FIGS. 13A, 13B, 13C, 13D, and 13E time is shown on the x-axis, and FIGS. 13A, 13B, and 13C respectively show the U-phase winding current, the V-phase winding current, and the W-phase winding current.

Figure 13:
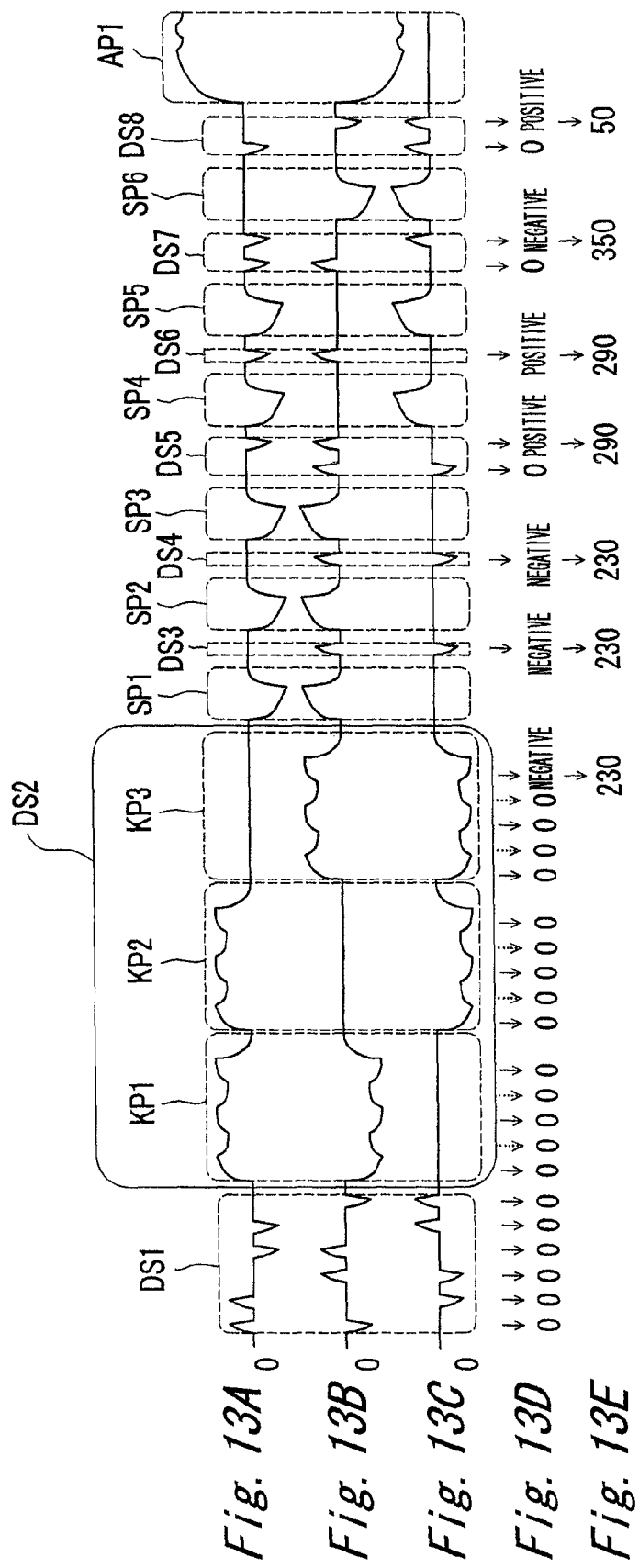
FIGS. 13A, 13B, 13C, 13D, and 13E are waveform diagrams of detection pulse and starting pulse application in a seventh variation of the first embodiment of the invention.

FIG. 13D shows the output of the comparator 21 and the comparator 22 using the energized starting phase cycle shown in FIG. 5, and FIG. 13E shows the result of rotor position detection. In FIG. 13D positive, negative, and 0 respectively denote that the comparator 21 outputs high, the comparator 22 outputs low, and that output of the comparator 21 is not high and the output of the comparator 22 is not low. In FIG. 13E, 230, 290, 350, and 50 respectively denote that the rotor position was detected near 230 degrees, near 290 degrees, near 350 degrees, and near 50 degrees.

The search step shown in FIG. 25 for applying the search pulse six times is used for the first search step in FIGS. 13A, 13B, 13C, 13D, and 13E. The continued search and start step shown in FIG. 28A is used after the first search step.

In FIGS. 13A, 13B, 13C, 13D, and 13E DS1 denotes the first search step. Of the six different energized search phases shown in FIG. 5, the search pulse is applied based on the flow chart in FIG. 26 in the state sequence F1, F2, F3, F4, F5, F6. In the example shown in FIGS. 13A, 13B, 13C, 13D, and 13E the terminal difference voltage detection unit 13 was unable to detect the rotor position even though the search pulse was applied to all six different energized search phases.

To move the rotor position slightly in the second search step DS2, kick pulses shifted 60 degrees from each other are applied with PWM drive control three times to two phases in the order KP1, KP2, KP3 while simultaneously detecting the rotor position.

The first kick pulse KP1 flows from the U-phase to the V-phase by PWM drive control turning switches Q1 and Q5 on and off. The next kick pulse KP2 flows from the U-phase to the W-phase by PWM drive control turning switches Q1 and Q6 on and off. The next kick pulse KP3 flows from the U-phase to the W-phase by PWM drive control turning switches Q1 and Q6 on and off. These three kick pulses thus cause the rotor position to shift slightly.

The terminal difference voltage detection unit 13 cannot detect the rotor position from the first kick pulse KP1 and the second kick pulse KP2. The third kick pulse KP3 causes the comparator 22 to output low and output the over-threshold value signal S22 to the commutation control unit 16. The rotor position is determined to be near 230 degrees, and the energized search phase at this time is saved. In the first starting step denoted SP1, switches Q2 and Q4 are turned on, the starting pulse is applied from the V-phase to the U-phase, and suitable starting torque is applied to the rotor.

In the third search step DS3 the search pulse is applied in the previously stored energized search phase. Because the rotor speed is generally low when starting, the commutation frequency is sufficiently low compared with the number of times the rotor position is detected. In DS3 the output of the comparator 22 goes low again and the energized search phase at this time is stored. As in starting step SP1, the starting pulse is applied from the V-phase to the U-phase in the second starting step SP2 and suitable starting torque is applied to the rotor. In the fourth search step DS4 and the third starting step SP3 the starting pulse is again applied from the V-phase to the U-phase.

The fifth search step DS5 applies two search pulses. Of these the first search pulse is applied in the previously stored energized search phase. The output of the comparator 22 does not go low this time. The second search pulse in the fifth search step DS5 is therefore applied from the V-phase to the U-phase as a result of turning switches Q2 and Q4 on based on the assumption that the rotor is advanced a 60 degree electrical angle from the previously assumed position to near 290 degrees. The output of the comparator 22 thus goes high, the rotor position is determined to be near 290 degrees, and the energized search phase at this time is stored. Next, in the fourth starting step SP4, switches Q3 and Q4 are turned on, the starting pulse is applied from the W-phase to the U-phase, and suitable starting torque is applied to the rotor. In the sixth search step DS6 and fifth starting step SP5 the starting pulse is again applied from the W-phase to the U-phase.

The seventh search step DS7 applies two search pulses. Of these the first search pulse is applied in the previously stored energized search phase. The output of the comparator 21 does not go high this time. The second search pulse in the seventh search step DS7 is therefore applied from the W-phase to the U-phase as a result of turning switches Q3 and Q4 on based on the assumption that the rotor is advanced a 60 degree electrical angle from the previously assumed position to near 350 degrees. The output of the comparator 22 thus goes low, the rotor position is determined to be near 350 degrees, and the energized search phase at this time is stored. Next, in the sixth starting step SP6, switches Q3 and Q5 are turned on, the starting pulse is applied from the W-phase to the V-phase, and suitable starting torque is applied to the rotor.

The eighth search step DS8 applies two search pulses. Of these the first search pulse is applied in the previously stored energized search phase. The output of the comparator 22 does not go low this time. The second search pulse in the eighth search step DS8 is therefore applied from the W-phase to the V-phase as a result of turning switches Q3 and Q5 on based on the assumption that the rotor is advanced a 60 degree electrical angle from the previously assumed position to near 50 degrees. The output of the comparator 21 thus goes high. Based on the second search pulse in the eighth search step DS8 the rotor is therefore determined to be near 50 degrees rotated a 60 degree electrical angle. Next, by turning the switches Q1 and Q5 on, drive current is supplied based on PWM control from the U-phase to the V-phase and the rotor accelerates in the semi-steady state step AP1.

After the fifth search step DS5 that confirms the first 60-degree forward commutation, and the seventh search step DS7 that confirms the second 60-degree forward commutation, the eighth search step DS8 confirms a third 60-degree forward commutation. If it is determined that the rotor started turning as a result of these three 60 degree forward commutations, the back-EMF voltage mode is entered after the semi-steady state step AP1 and normal acceleration torque can be applied based on the rotor position detected from the back-EMF voltage.

In this aspect of the invention the rotor is determined to have started turning successfully when three 60-degree forward commutations are confirmed, but whether the rotor started turning can alternatively be determined using a count other than three and an electrical angle other than 60 degrees. Whether the rotor started turning can also be determined based on whether the rotor speed achieved during the period in which the three 60-degree forward commutations were detected reaches a specific speed.

Furthermore, a current profile must be created and a zero current period for detecting the zero cross of the back-EMF voltage must be provided in order to apply acceleration torque immediately after switching from the search and start mode to the back-EMF voltage mode. This zero current period is set according to the timing at which the back-EMF voltage is expected to cross zero based on the 60 degree commutation periods in the search and start mode.

This seventh variation of the first embodiment uses PWM control to drive the kick pulse while also executing the search step to simultaneously detect the rotor position while causing the rotor position to shift. This enables quickly finding the rotor position and returning to the normal search step sooner. The reversing action of the kick pulse can also be minimized and the motor can be started quickly and reliably.

Second Embodiment of the Invention

This second embodiment is described with reference to the differences from the first embodiment. Other aspects of the arrangement, operation, and effect are the same as in the first embodiment above.

Figure 31:
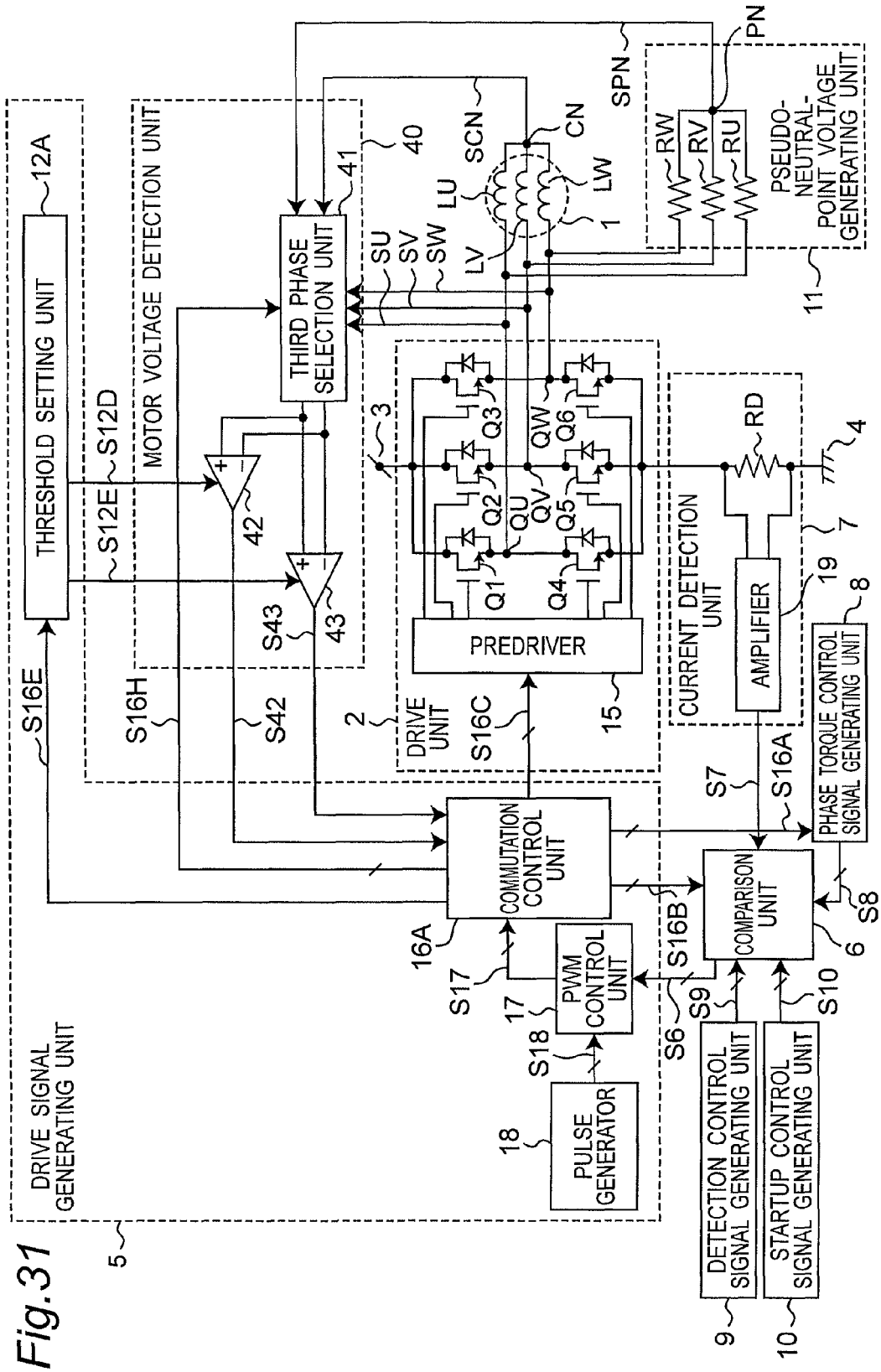
FIG. 31 is a circuit block diagram of a second embodiment of the invention.

FIG. 31 is a block diagram showing the circuit arrangement of this second embodiment of the invention. In FIG. 31 the terminal difference voltage detection unit 13 and the back-EMF voltage detection unit 14 shown in FIG. 1A are combined into a single motor voltage detection unit 40. This motor voltage detection unit 40 performs the operations and achieves the effect of the terminal difference voltage detection unit 13 and the back-EMF voltage detection unit 14 in the first embodiment of the invention.

The commutation control unit 16A generates a phase selection signal S16H denoting the non-energized phase when two phases are energized, and outputs the phase selection signal S16H to a third phase selection unit 41. The U-phase motor terminal voltage SU, V-phase motor terminal voltage SV, W-phase motor terminal voltage SW, neutral point voltage SCN, and pseudo-neutral-point voltage SPN are also input to the third phase selection unit 41. Based on the phase selection signal S16H, the third phase selection unit 41 selects one of the motor terminal voltages SU, SV, SW, selects the neutral point voltage SCN or pseudo-neutral-point voltage SPN, and outputs the selected signals to the comparators 42 and 43.

The commutation control unit 16A outputs to the threshold setting unit 12A a threshold value control signal S16E controlling the predetermined threshold values S12D and S12E used by the motor voltage detection unit 40. The positive threshold value S12A applies a predetermined positive threshold value S12D to the comparator 42 and a predetermined negative threshold value S12E to the comparator 43 based on the threshold value control signal S16E. The absolute values of the positive threshold value S12D and the negative threshold value S12E are equal in this embodiment of the invention for brevity but can be different. The motor voltage detection unit 40 can also be rendered using a single comparator. In this case the threshold setting unit 12A applies the positive threshold value S12D and the negative threshold value S12E to the motor voltage detection unit 40 and the motor voltage detection unit 40 switches appropriately between the positive threshold value S12D and the negative threshold value S12E. The threshold setting unit 12A could further alternatively supply both the positive threshold value S12D and the negative threshold value S12E over a single time-division channel to the motor voltage detection unit 40.

The third phase selection unit 41 thus switches between the neutral point voltage SCN and pseudo-neutral-point voltage SPN based on the phase selection signal S16H, and selects the pseudo-neutral-point voltage SPN in the search and start mode, and selects the neutral point voltage SCN in the back-EMF voltage mode. The motor terminal voltage SU, SV, SW of the non-energized phase is also input to one device, specifically the third phase selection unit 41, in this embodiment instead of to two devices as in the first embodiment, specifically the first phase-selection unit 24 and second phase-selection unit 20 as shown in FIG. 1A. In addition, the number of comparators is reduced from the three shown in FIG. 1A to two in this embodiment. The number of comparators can be further reduced to one comparator by selecting cycle FA, for example, as the energized starting and search phase cycle and appropriately switching between supplying a positive threshold value and negative threshold value to the comparator.

In this second embodiment of the invention the motor voltage detection unit 40 operates in the search and start mode until the rotor is turning at a very low speed immediately after starting from a stop. Starting and acceleration alternate in the search and start mode by alternately repeating a search step and a starting step. In the search step the search pulse is applied for a very short time or at a very low level not causing the rotor to move in order to detect the rotor position. After determining the rotor position, a starting pulse is applied in the starting step to the appropriate stator phase to apply a starting torque. When the back-EMF voltage can be consistently detected and the rotor reaches a normal speed at which commutation control is possible in the search and start mode, control goes from the search and start mode to the back-EMF voltage mode, and the motor voltage detection unit 40 operates in the back-EMF voltage mode.

Figure 32A:
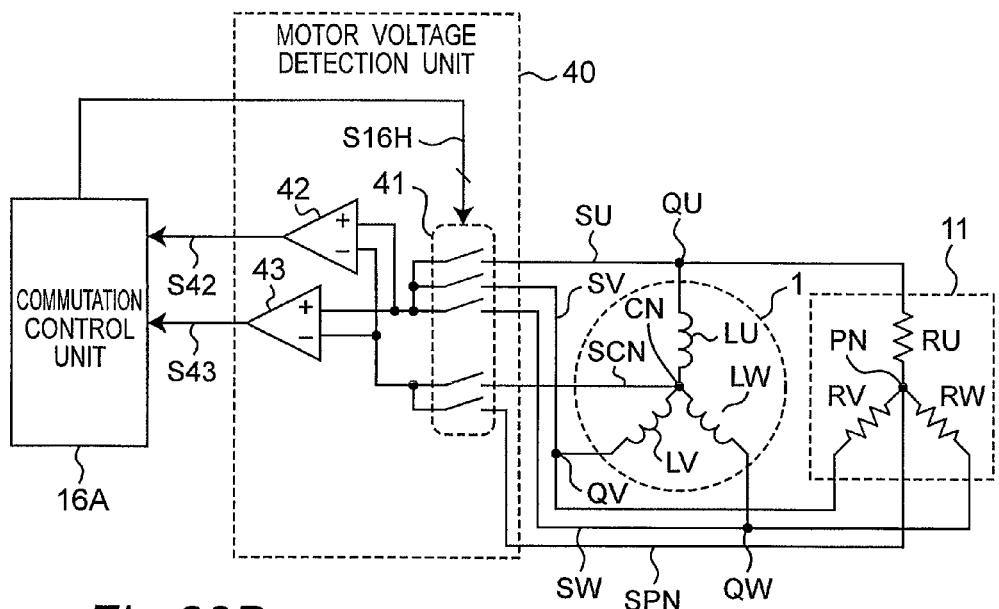
FIGS. 32A and 32B are circuit diagrams combining the terminal difference voltage detection unit and back-EMF voltage detection unit in the second embodiment of the invention.
Figure 32B:
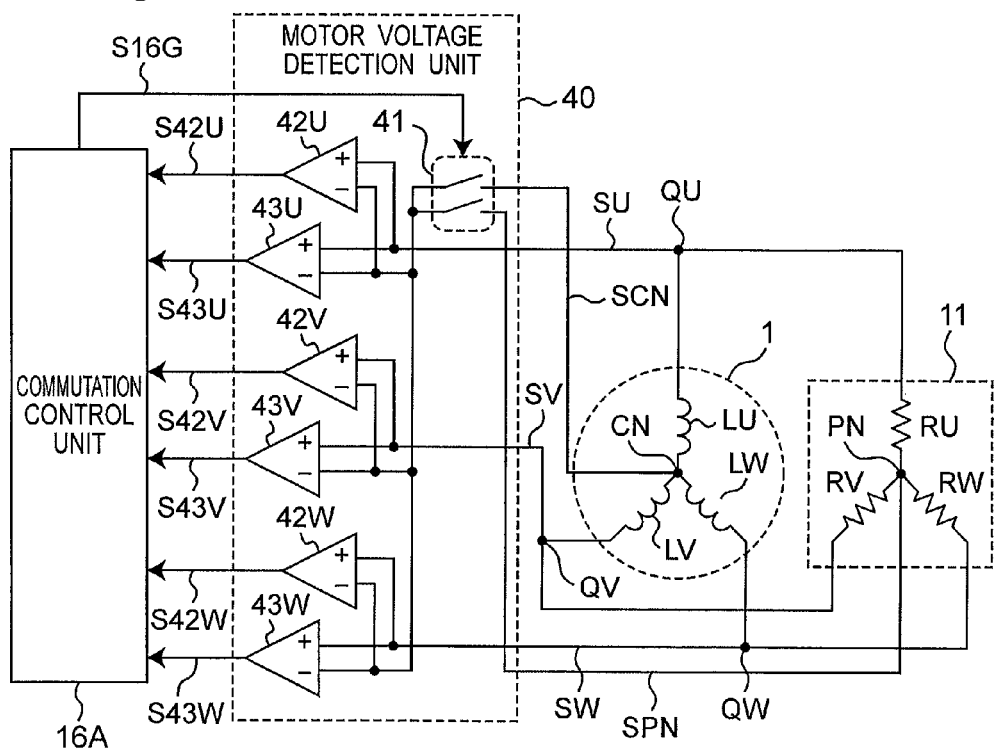

An example of the motor voltage detection unit 40 shown in FIG. 31 is shown in FIGS. 32A and 32B. The arrangement and operation of this motor voltage detection unit 40 are described below with reference to FIG. 31 and FIG. 32A. In the search and start mode the drive unit 2 supplies a search pulse current for energizing two phases to the motor 1. The commutation control unit 16A generates a phase selection signal S16H denoting the non-energized phase, and outputs the phase selection signal S16H to the third phase selection unit 41. The U-phase motor terminal voltage SU, V-phase motor terminal voltage SV, and W-phase motor terminal voltage SW are also input to the third phase selection unit 41. Based on the phase selection signal S16H, the third phase selection unit 41 selects the motor terminal voltage SU, SV, or SW for the non-energized phase, and outputs the selected motor terminal voltage and the pseudo-neutral-point voltage SPN to the comparators 42 and 43.

The motor terminal voltage selected by the third phase selection unit 41 is input to the non-inverted input terminals of the comparators 42 and 43, and the pseudo-neutral-point voltage SPN is input to the inverted input terminals. If the difference between the selected motor terminal voltage and the pseudo-neutral-point voltage SPN is greater than or equal to the positive threshold value S12D, the comparator 42 generates and outputs the over-threshold value signal S42 to the commutation control unit 16A. If the difference between the selected motor terminal voltage and the pseudo-neutral-point voltage SPN is greater than or equal to the negative threshold value S12E, the comparator 42 generates and outputs the over-threshold value signal S43 to the commutation control unit 16A. As a result, if the polarity of the difference between the terminal difference voltage and the predetermined threshold value S12D or S12E is the same as the polarity of the terminal difference voltage, the motor voltage detection unit 40 generates and outputs over-threshold value signal S42 or S43 to the commutation control unit 16A.

The motor voltage detection unit 40 can also be rendered using a single comparator. In this case the threshold setting unit 12A applies the positive threshold value S12D and the negative threshold value S12E to the motor voltage detection unit 40 and the motor voltage detection unit 40 switches appropriately between the positive threshold value S12D and the negative threshold value S12E. The threshold setting unit 12A could further alternatively supply both the positive threshold value S12D and the negative threshold value S12E over a single time-division channel to the motor voltage detection unit 40.

In the back-EMF voltage mode, the commutation control unit 16A generates a phase selection signal S16H indicating the expected timing of the zero cross of the back-EMF voltage, and outputs the phase selection signal S16H to the third phase selection unit 41. Based on the phase selection signal S16H, the third phase selection unit 41 selects the motor terminal voltage SU, SV, SW for the non-energized phase and outputs the selected motor terminal voltage with the neutral point voltage SCN to the comparator 42.

The motor terminal voltage selected by the third phase selection unit 41 is input to the non-inverted input terminal and the neutral point voltage SCN is input to the inverted input terminal of the comparator 42. If the absolute value of the difference between the selected motor terminal voltage and the neutral point voltage SCN is greater than or equal to the threshold value S12D, the comparator 42 generates and outputs the rotor phase signal S42 to the commutation control unit 16A. The commutation control unit 16A continuously maintains accurate control of the commutation timing based on the rotor phase signal S42. The absolute value of the predetermined threshold value S12D is set lower than in the search and start mode or to zero. Note that the comparators 42 and 43 are also referred to as third comparators 42 and 43.

The arrangement and operation of the motor voltage detection unit 40 according to another aspect of the invention are described next with reference to FIG. 31 and FIG. 32B focusing on the differences to the motor voltage detection unit 40 shown in FIG. 32A. The U-phase motor terminal voltage SU is input to the non-inverted input terminals of the comparators 42U, 43U, the V-phase motor terminal voltage SV is input to the non-inverted input terminals of the comparators 42V, 43V, and the W-phase motor terminal voltage SW is input to the non-inverted input terminals of the comparators 42W, 43W. In the search and start mode, the third phase selection unit 41 selects and inputs the pseudo-neutral-point voltage SPN to the inverted input terminals of the comparators 42U, 43U, 42V, 43V, 42W, 43W based on the phase selection signal S16H.

If the difference between the motor terminal voltage SU, SV, SW and the pseudo-neutral-point voltage SPN is greater than or equal to positive threshold value S12D, the comparators 42U, 42V, and 42W respectively generate and output over-threshold value signals S42U, S42V, and S42W to the commutation control unit 16A. If the difference between the motor terminal voltage SU, SV, SW and the pseudo-neutral-point voltage SPN is less than or equal to negative threshold value S12E, the comparators 42U, 42V, and 42W respectively generate and output over-threshold value signals S43U, S43V, and S43W to the commutation control unit 16A. If the polarity of the difference between the terminal difference voltage and the predetermined threshold values S12D and S12E is the same as the polarity of the terminal difference voltage, the motor voltage detection unit 40 thus generates and outputs to the commutation control unit 16A either over-threshold value signal S42U, S42V, S42W or S43U, S43V, S43W.

In the back-EMF voltage mode, the third phase selection unit 41 selects and inputs the neutral point voltage SCN based on the phase selection signal S16H to the inverted input terminals of the comparators 42U, 42V, and 42W. If the absolute value of the difference between the motor terminal voltage SU, SV, SW and the neutral point voltage SCN is greater than or equal to threshold value S12D, the comparators 42U, 42V, and 42W respectively generate and output rotor phase signals S42U, S42V, and S42W to the commutation control unit 16A. The commutation control unit 16A selects the rotor phase signal for the phase in which the zero cross of the back-EMF voltage is expected, and the commutation timing can therefore be accurately controlled. Note that comparators 42U, 42V, 42W, 43U, 43V, 43W are also referred to as third comparators 42U, 42V, 42W, 43U, 43V, 43W.

By thus combining the terminal difference voltage detection unit 13 and the back-EMF voltage detection unit 14 into a single motor voltage detection unit 40, this embodiment of the invention enables sharing the comparators and phase selection unit to achieve the same effect using a simpler arrangement.

Third Embodiment

This third embodiment is described with reference to the differences from the first embodiment. Other aspects of the arrangement, operation, and effect are the same as in the first embodiment above.

Figure 33:
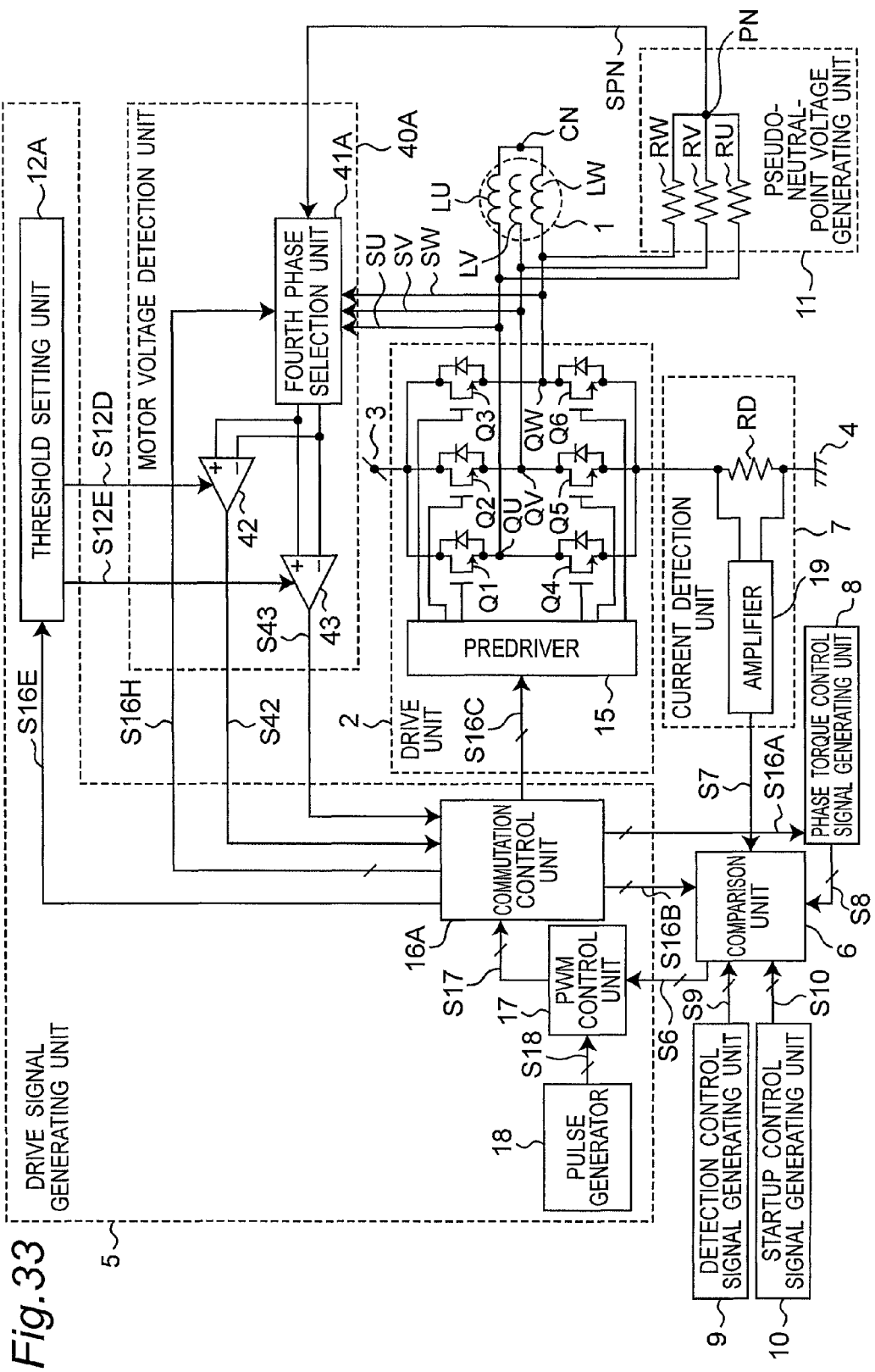
FIG. 33 is a circuit block diagram of a third embodiment of the invention.

FIG. 33 is a block diagram showing the circuit arrangement of this third embodiment of the invention. This embodiment differs from the second embodiment in that input of the neutral point voltage SCN to the third phase selection unit 41 in the motor voltage detection unit 40 shown in FIG. 31 is eliminated to the fourth phase selection unit 41A shown in FIG. 33.

The commutation control unit 16A generates a phase selection signal S16H denoting the non-energized phase when two phases are energized, and outputs the phase selection signal S16H to the fourth phase selection unit 41A. The U-phase motor terminal voltage SU, V-phase motor terminal voltage SV, W-phase motor terminal voltage SW, and pseudo-neutral-point voltage SPN are also input to the fourth phase selection unit 41A. Based on the phase selection signal S16H, the fourth phase selection unit 41A selects one of the motor terminal voltages SU, SV, SW, and outputs the selected voltage with the pseudo-neutral-point voltage SPN to the comparators 42 and 43.

The commutation control unit 16A outputs to the threshold setting unit 12A a threshold value control signal S16E controlling the predetermined threshold values S12D and S12E used by the motor voltage detection unit 40A. The positive threshold value S12A applies a predetermined positive threshold value S12D to the comparator 42 and a predetermined negative threshold value S12E to the comparator 43 based on the threshold value control signal S16E. The absolute values of the positive threshold value S12D and the negative threshold value S12E are equal in this embodiment of the invention for brevity but can be different. The motor voltage detection unit 40A can also be rendered using a single comparator. In this case the threshold setting unit 12A applies the positive threshold value S12D and the negative threshold value S12E to the motor voltage detection unit 40A and the motor voltage detection unit 40A switches appropriately between the positive threshold value S12D and the negative threshold value S12E. The threshold setting unit 12A could further alternatively supply both the positive threshold value S12D and the negative threshold value S12E over a single time-division channel to the motor voltage detection unit 40A.

The motor terminal voltage SU, SV, SW of the non-energized phase is thus input to only the one fourth phase selection unit 41A in this aspect of the invention instead of to the first phase-selection unit 24 and second phase-selection unit 20 as shown in FIG. 1A. In addition, the number of comparators is reduced from the three shown in FIG. 1A to two in this embodiment. The number of comparators can be further reduced to one comparator by selecting cycle FA, for example, as the energized starting and search phase cycle and appropriately switching between supplying a positive threshold value and negative threshold value to the comparator.

In this third embodiment of the invention the 40a operates in the search and start mode until the rotor is turning at a very low speed immediately after starting from a stop. Starting and acceleration alternate in the search and start mode by alternately repeating a search step and a starting step. In the search step the search pulse is applied for a very short time or at a very low level not causing the rotor to move in order to detect the rotor position. After determining the rotor position, a starting pulse is applied in the starting step to the desired stator phase to apply a starting torque. When the terminal difference voltage can be consistently detected and the rotor reaches a normal speed at which commutation control is possible in the search and start mode, control goes from the search and start mode to the back-EMF voltage mode, and the motor voltage detection unit 40A operates in the back-EMF voltage mode.

Figure 34A:
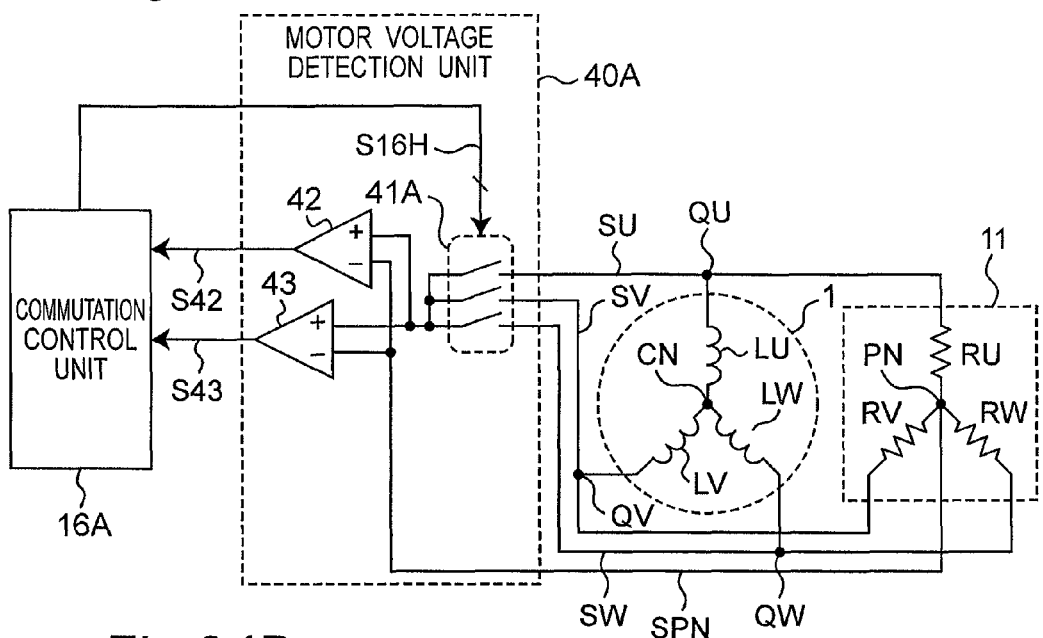
FIGS. 34A and 34B are circuit diagrams combining the terminal difference voltage detection unit and back-EMF voltage detection unit in the third embodiment of the invention.
Figure 34B:
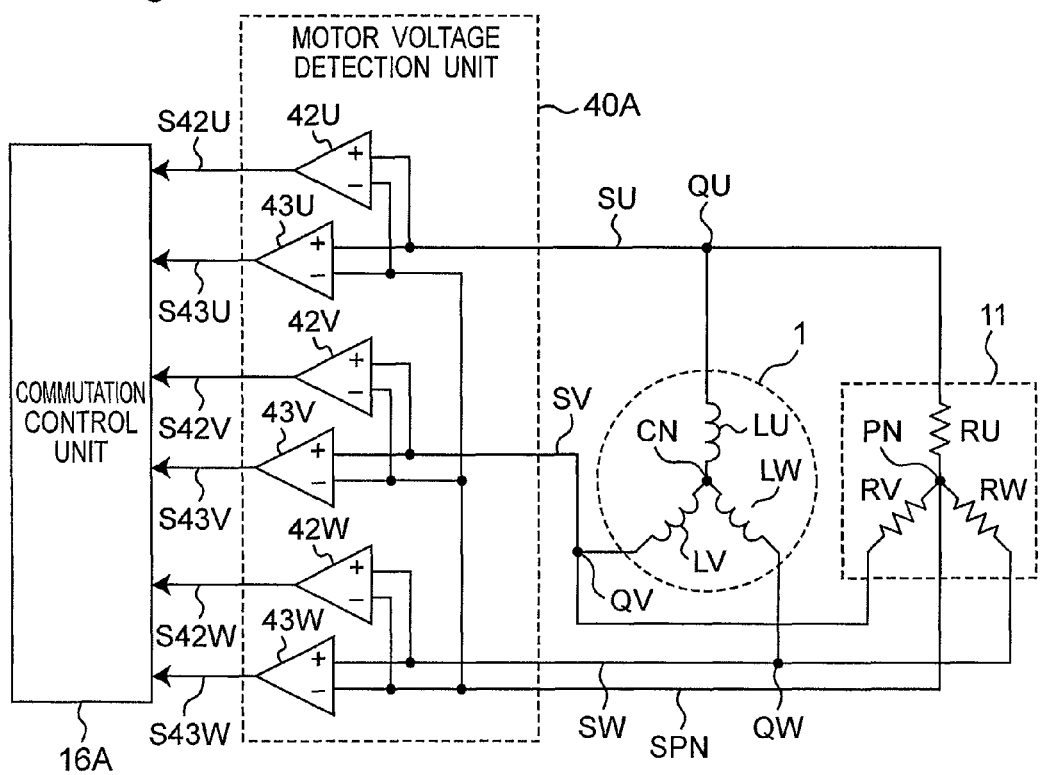

An example of the motor voltage detection unit 40A shown in FIG. 33 is shown in FIGS. 34A and 34B. The arrangement and operation of this motor voltage detection unit 40A are described below with reference to FIG. 33 and FIG. 34A. In the search and start mode the drive unit 2 supplies a search pulse current for energizing two phases to the motor 1. The commutation control unit 16A generates a phase selection signal S16H denoting the non-energized phase, and outputs the phase selection signal S16H to the fourth phase selection unit 41A. The U-phase motor terminal voltage SU, V-phase motor terminal voltage SV, and W-phase motor terminal voltage SW are also input to the fourth phase selection unit 41A. Based on the phase selection signal S16H, the fourth phase selection unit 41A selects the motor terminal voltage SU, SV, or SW for the non--energized phase, and outputs the selected motor terminal voltage and the pseudo-neutral-point voltage SPN to the comparators 42 and 43.

The motor terminal voltage selected by the fourth phase selection unit 41A is input to the non-inverted input terminals of the comparators 42 and 43, and the pseudo-neutral-point voltage SPN is input to the inverted input terminals. If the difference between the selected motor terminal voltage and the pseudo-neutral-point voltage SPN is greater than or equal to the positive threshold value S12D, the comparator 42 generates and outputs the over-threshold value signal S42 to the commutation control unit 16A. If the difference between the selected motor terminal voltage and the pseudo-neutral-point voltage SPN is greater than or equal to the negative threshold value S12E, the comparator 42 generates and outputs the over-threshold value signal S43 to the commutation control unit 16A. As a result, if the polarity of the difference between the terminal difference voltage and the predetermined threshold value S12D or S12E is the same as the polarity of the terminal difference voltage, the motor voltage detection unit 40A generates and outputs over-threshold value signal S42 or S43 to the commutation control unit 16A.

The motor voltage detection unit 40A can also be rendered using a single comparator. In this case the threshold setting unit 12A applies the positive threshold value S12D and the negative threshold value S12E to the motor voltage detection unit 40A and the motor voltage detection unit 40A switches appropriately between the positive threshold value S12D and the negative threshold value S12E. The threshold setting unit 12A could further alternatively supply both the positive threshold value S12D and the negative threshold value S12E over a single time-division channel to the motor voltage detection unit 40A.

In the back-EMF voltage mode, the commutation control unit 16A generates a phase selection signal S16H indicating the expected timing of the zero cross of the back-EMF voltage, and outputs the phase selection signal S16H to the fourth phase selection unit 41A. Based on the phase selection signal S16H, the fourth phase selection unit 41A selects the motor terminal voltage SU, SV, SW for the non-energized phase and outputs the selected motor terminal voltage with the pseudo-neutral-point voltage SPN to the comparator 42.

The motor terminal voltage selected by the fourth phase selection unit 41A is input to the non-inverted input terminal and the pseudo-neutral-point voltage SPN is input to the inverted input terminal of the comparator 42. If the absolute value of the difference between the selected motor terminal voltage and the pseudo-neutral-point voltage SPN is greater than or equal to the threshold value S12D, the comparator 42 generates and outputs the rotor phase signal S42 to the commutation control unit 16A. The commutation control unit 16A continuously maintains accurate control of the commutation timing based on the rotor phase signal S42. The absolute value of the predetermined threshold value S12D is set lower than in the search and start mode or to zero.

The arrangement and operation of the motor voltage detection unit 40A according to another aspect of the invention are described next with reference to FIG. 33 and FIG. 34B focusing on the differences to the motor voltage detection unit 40A shown in FIG. 34A. The U-phase motor terminal voltage SU is input to the non-inverted input terminals of the comparators 42U, 43U, the V-phase motor terminal voltage SV is input to the non-inverted input terminals of the comparators 42V, 43V, and the W-phase motor terminal voltage SW is input to the non-inverted input terminals of the comparators 42W, 43W. The pseudo-neutral-point voltage SPN to the inverted input terminals of the comparators 42U, 43U, 42V, 43V, 42W, 43W.

In the search and start mode if the difference between the motor terminal voltage SU, SV, SW and the pseudo-neutral-point voltage SPN is greater than or equal to positive threshold value S12D, the comparators 42U, 42V, and 42W respectively generate and output over-threshold value signals S42U, S42V, and S42W to the commutation control unit 16A. If the difference between the motor terminal voltage SU, SV, SW and the pseudo-neutral-point voltage SPN is less than or equal to negative threshold value S12E, the comparators 42U, 42V, and 42W respectively generate and output over-threshold value signals S43U, S43V, and S43W to the commutation control unit 16A. If the polarity of the difference between the terminal difference voltage and the predetermined threshold values S12D and S12E is the same as the polarity of the terminal difference voltage, the motor voltage detection unit 40A thus generates and outputs to the commutation control unit 16A either over-threshold value signal S42U, S42V, S42W or S43U, S43V, S43W.

In the back-EMF voltage mode, if the absolute value of the difference between the motor terminal voltage SU, SV, SW and the pseudo-neutral-point voltage SPN is greater than or equal to threshold value S12D, the comparators 42U, 42V, and 42W respectively generate and output rotor phase signals S42U, S42V, and S42W to the commutation control unit 16A. The commutation control unit 16A selects the rotor phase signal for the phase in which the zero cross of the back-EMF voltage is expected, and the commutation timing can therefore be accurately controlled.

The back-EMF voltage produced in the non-energized phase of the motor is relatively high in this third embodiment of the invention in order to impart initial acceleration to the motor in the search and start mode and achieve a suitable rotor speed. Switching from the search and start mode to the back-EMF voltage mode is therefore smooth and the motor can be reliably and quickly started. By this eliminating inputting the neutral point voltage SCN to the motor voltage detection unit 40A, the invention can also be used on motors that do not have a terminal for outputting the neutral point voltage SCN.

Fourth Embodiment

This fourth embodiment is described with reference to the differences from the first embodiment. Other aspects of the arrangement, operation, and effect are the same as in the first embodiment above.

Sensorless drive technology that does not require a rotor position sensor is used in many different fields due to concerns about reliability, increased cost, and environmental friendliness. The present invention can be used in fields where sensorless drive technology is used, including disk drive devices, for example. Disk drives include hard disk drive devices and optical disk drive devices. This fourth embodiment of the invention describes an arrangement using the present invention in an optical disk drive device as shown in FIG. 35.

Figure 35:
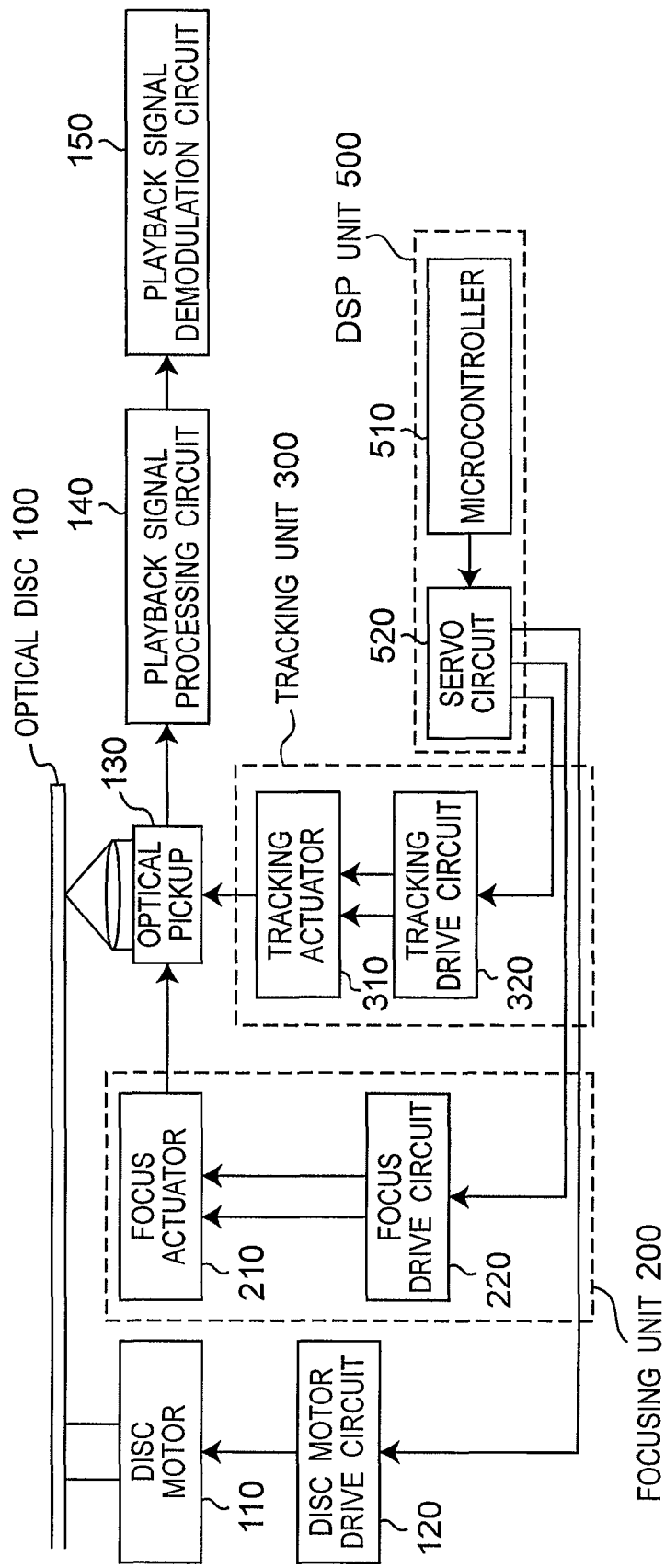
FIG. 35 is a circuit block diagram of a fourth embodiment of the invention.
Figure 36:
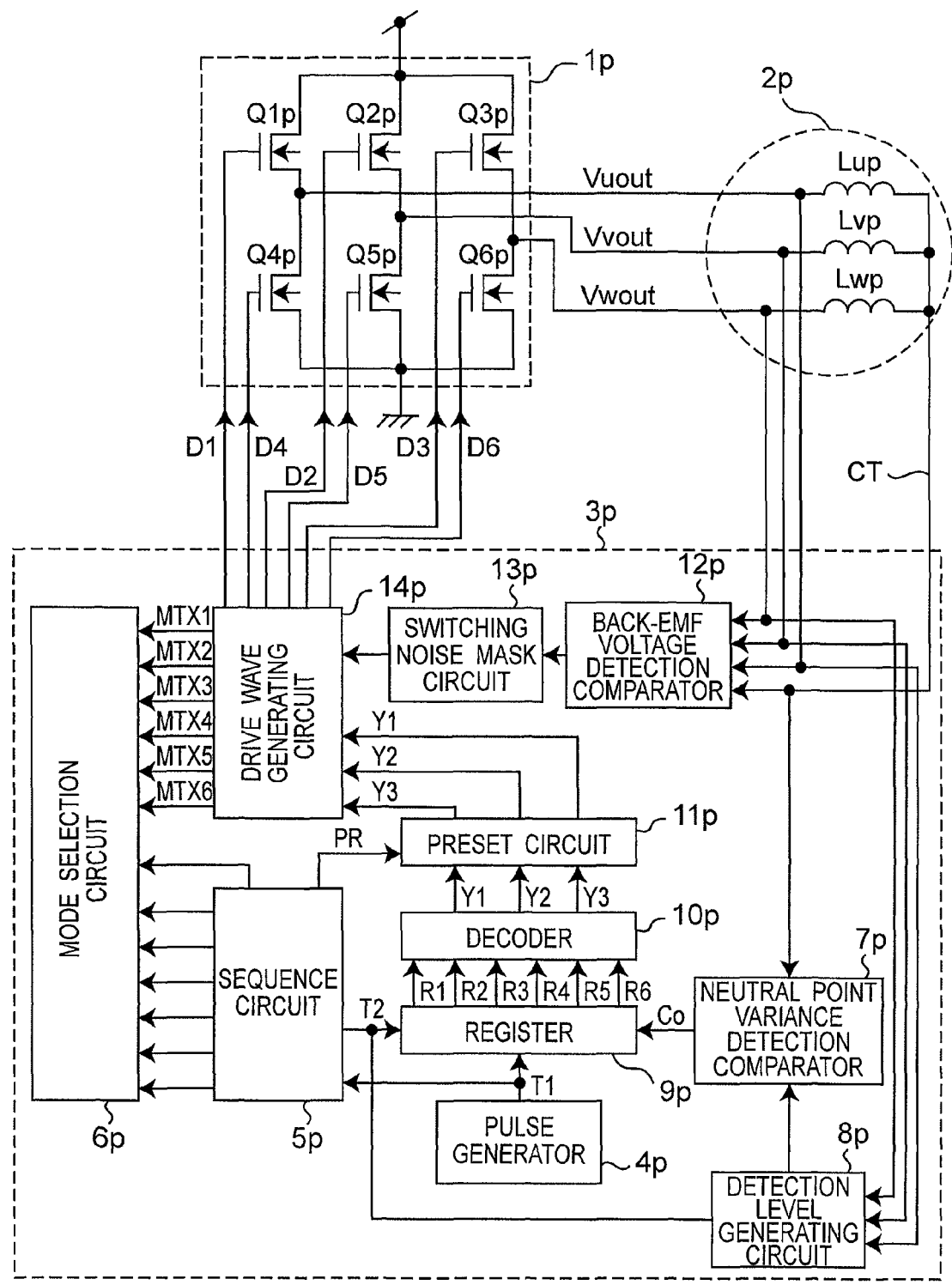
FIG. 36 is a block diagram of a motor drive device according to the related art.
Figure 37:
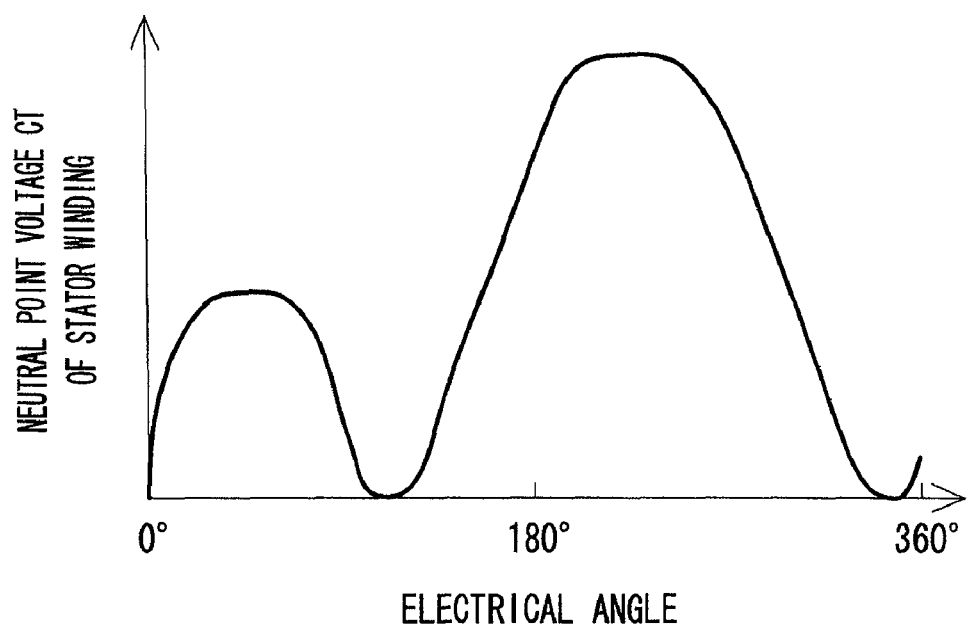
FIG. 37 is a waveform diagram describing the relationship between the neutral point voltage and rotor position in the motor drive device according to the related art.

Referring to FIG. 35, an optical pickup 130 emits a laser beam to an optical disc 100, and outputs an electrical signal representing information on the disc based on light reflected from the disc to the playback signal processing circuit 140. The playback signal processing circuit 140 adjusts the amplitude of the input signal and outputs a playback signal to the playback signal demodulation circuit 150. The playback signal demodulation circuit 150 demodulates the playback signal to reproduce the information on the optical disc 100. The servo circuit 520 controls rotation of the disc motor 110 by a disc motor drive circuit 120 so that the optical disc 100 turns at the speed controlled by a microcontroller 510. The playback signal processing circuit 140 also produces a focus error signal, which is a signal denoting focal spot error in the focusing direction of the laser beam, and a tracking error signal, which is a signal denoting focal spot error in the tracking direction. Based on the focus error signal supplied from the playback signal processing circuit 140, the servo circuit 520 functions as a focusing servo to control the laser spot in the focusing direction by the focus drive circuit 220 and focus actuator 210 so that the laser spot is focused on the desired data surface of the optical disc 100. Based on the tracking error signal, the servo circuit 520 also functions as a tracking servo to control the laser spot in the tracking direction by the tracking drive circuit 320 and tracking actuator 310 so that the laser spot tracks the recording tracks on the optical disc 100.

Sensorless drive technology that does not require a rotor position sensor in the disc motor drive circuit 120 of this optical disc drive device is suitable in terms of reliability, cost increase, and environmental impact. Using the invention in the disc motor drive circuit 120 enables imparting suitable rotational speed and reliably executing the search and start mode when initially starting the disc motor 110. Furthermore, by switching to the back-EMF voltage mode after the search and start mode, sensorless motors can be quickly and reliably started.

The present invention can thus be used for a motor drive device and motor drive method.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A motor drive device operable to start an N-phase motor having N phase (where N is an integer of two or more) motor windings by supplying a search current and a starting current in a search and start mode, and to drive the N-phase motor by supplying drive current in a back electromotive force (back-EMF) voltage mode, the motor drive device comprising:
a drive signal generator operable to produce a search drive signal, a starting drive signal, and a normal drive signal;
a driver operable to produce the search current, starting current, and drive current, respectively, based on the search drive signal, the starting drive signal, and the normal drive signal;
a pseudo-neutral-point voltage generator operable to generate a pseudo-neutral-point voltage representing the average voltage of the N-phase motor terminals; and
a terminal difference voltage detector operable to detect a terminal difference voltage denoting the difference between the N-phase motor terminal voltage and the pseudo-neutral-point voltage, and to output a detection result signal;
wherein said drive signal generator controls the starting drive signal based on the search drive signal and the detection result signal in the search and start mode.

2. The motor drive device described in claim 1, further comprising:
a back-EMF voltage detector operable to detect a back-EMF voltage denoting the difference between the N-phase motor terminal voltage and the neutral point voltage at a node common to the N-phase motor windings, and to generate a rotor phase signal;
wherein said drive signal generator
controls the normal drive signal based on the rotor phase signal in the back-EMF voltage mode,
outputs a mode switching signal using at least one signal from a signal group including the search drive signal, the detection result signal, the starting drive signal, and the rotor phase signal; and
said drive signal generator being switched from the search and start mode to the back-EMF voltage mode based on the mode switching signal.

3. The motor drive device described in claim 2, wherein the back-EMF voltage detector includes a comparator operable to compare the N-phase motor terminal voltage and neutral point voltage, and to output the rotor phase signal.

4. The motor drive device described in claim 1, wherein said terminal difference voltage detector outputs the detection result signal when the polarity of the difference of the terminal difference voltage and a predetermined threshold value matches the polarity of the terminal difference voltage.

5. The motor drive device described in claim 4, wherein the threshold values include at least a positive threshold value and a negative threshold value.

6. The motor drive device described in claim 4, wherein said drive signal generator controls the detection result signal by changing the threshold value.

7. The motor drive device described in claim 1, wherein the terminal difference voltage detector includes a first comparator operable to compare the N-phase motor terminal voltage and the pseudo-neutral-point voltage and to output the detection result signal.

8. The motor drive device described in claim 7, further comprising:
a back-EMF voltage detector operable to detect a back-EMF voltage denoting the difference between the N-phase motor terminal voltage and neutral point voltage, and to output the rotor phase signal;
wherein said back-EMF voltage detector includes a second comparator operable to compare the N-phase motor terminal voltage and the neutral point voltage to generate the rotor phase signal; and
the first comparator and the second comparator have a common part.

9. The motor drive device described in claim 1, further comprising a comparator operable to compare the N-phase motor terminal voltage and the pseudo-neutral-point voltage to generate a detection result signal in the search and start mode, and to compare the N-phase motor terminal voltage and neutral point voltage to generate a rotor phase signal in the back-EMF voltage mode.

10. The motor drive device described in claim 1, further comprising a comparator operable to compare the N-phase motor terminal voltage and the pseudo-neutral-point voltage to generate a detection result signal in the search and start mode, and to compare the N-phase motor terminal voltage and pseudo-neutral-point voltage to generate a rotor phase signal in the back-EMF voltage mode.

11. The motor drive device described in claim 1, further comprising:
a search control signal generator operable to generate a search control signal setting the search current level;
a current detector operable to detect the level of the motor current of the N-phase motor and to output a current detection signal; and
a comparator operable to compare the search control signal and the current detection signal, and to output a comparison result signal;
wherein said drive signal generator is controlled according to the comparison result signal.

12. The motor drive device described in claim 11, further comprising:
a starting control signal generator operable to generate a starting control signal setting the level of the starting current;
wherein the comparator compares the starting control signal and the current detection signal to output the comparison result signal; and
said drive signal generator is controlled according to the comparison result signal.

13. The motor drive device described in claim 11, further comprising:
a phase torque control signal generator operable to generate a phase torque control signal that sets the N-phase motor torque;
wherein the comparator compares the phase torque control signal and the current detection signal to generate the comparison result signal; and
said drive signal generator is controlled according to the comparison result signal.

14. The motor drive device described in claim 11, wherein said drive signal generator comprises:
a pulse generator operable to generate an on pulse with a PWM frequency period; and
a PWM control unit operable to generate a PWM control signal that is pulse-width controlled, is set by an on pulse, and is reset by the comparison result signal;
said drive signal generator being controlled by this PWM control signal.

15. The motor drive device described in claim 1, wherein the drive signal generator is controlled in the search and start mode at least once to a search state for outputting the search drive signal and at least once to a start state for outputting the starting drive signal, and is controlled to at least one logic state in both the search state and the starting state.

16. The motor drive device described in claim 15, wherein said drive signal generator controls the search drive signal and the starting drive signal in the search and start mode to repeatedly alternate between the search state and the starting state.

17. The motor drive device described in claim 15, wherein said drive signal generator controls the search drive signal and the starting drive signal in the search and start mode to enable a first search state first, enable a first starting state next, and thereafter enable only the starting state.

18. The motor drive device described in claim 15, wherein said drive signal generator controls the search drive signal so that the first logic state in the search state equals the last logic state in the previous search state.

19. The motor drive device described in claim 15, wherein said drive signal generator controls the starting control signal so that the first logic state in the starting state equals the last logic state in the previous starting state.

20. The motor drive device described in claim 1, wherein said driver has N high potential switching devices and N low potential switching devices; and
said drive signal generator outputs N-phase high potential search drive signals for controlling the N high potential switching devices, and outputs N-phase low potential search drive signals for controlling the N low potential switching devices.

21. The motor drive device described in claim 20, wherein said drive signal generator controls the logic level of the search drive signal to include four consecutive logic states in the search state.

22. The motor drive device described in claim 21, wherein when N is three and the search drive signal has four consecutive logic states, said drive signal generator:
sets the high potential side search drive signal for the first phase in a first combination of two of the three phases and the low potential side search drive signal for the second phase in the first combination to an operating state level in the first logic state,
sets the high potential side search drive signal for the second phase in the first combination and the low potential side search drive signal for the first phase in the first combination to an operating state level in the second logic state,
sets the high potential side search drive signal for the first phase in a second combination of two of the three phases that is different from the first combination and the low potential side search drive signal for the second phase in the second combination to an operating state level in the third logic state, and
sets the high potential side search drive signal for the second phase in the second combination and the low potential side search drive signal for the first phase in the second combination to an operating state level in the fourth logic state.

23. The motor drive device described in claim 21, wherein when N is three and the search drive signal has four consecutive logic states, said drive signal generator:
sets the high potential side search drive signal for the first phase in a first combination of two of the three phases and the low potential side search drive signal for the second phase in the first combination to an operating state level in the first logic state,
sets the high potential side search drive signal for the first phase in a second combination of two of the three phases that is different from the first combination and the low potential side search drive signal for the second phase in the second combination to an operating state level in the second logic state,
sets the high potential side search drive signal for the second phase in the first combination and the low potential side search drive signal for the first phase in the first combination to an operating state level in the third logic state, and
sets the high potential side search drive signal for the second phase in the second combination and the low potential side search drive signal for the first phase in the second combination to an operating state level in the fourth logic state.

24. The motor drive device described in claim 21, wherein when N is three and the search drive signal has four consecutive logic states, said drive signal generator:
sets the high potential side search drive signal for the first phase in a first combination of two of the three phases and the low potential side search drive signal for the second phase in the first combination to an operating state level in the first logic state, sets the high potential side search drive signal for the first phase in a second combination of two of the three phases that is different from the first combination and the low potential side search drive signal for the second phase in the second combination to an operating state level in the second logic state, sets the high potential side search drive signal for the second phase in the second combination and the low potential side search drive signal for the first phase in the second combination to an operating state level in the third logic state, and sets the high potential side search drive signal for the second phase in the first combination and the low potential side search drive signal for the first phase in the first combination to an operating state level in the fourth logic state.

25. The motor drive device described in claim 20, wherein said drive signal generator controls the logic level of the search drive signal to include six consecutive logic states in the search state.

26. The motor drive device described in claim 25, wherein when the search drive signal has six consecutive logic states, said drive signal generator:

sets the high potential side search drive signal for the first phase and the low potential side search drive signal for the second phase to the operating state level in the first logic state, sets the high potential side search drive signal for the first phase and the low potential side search drive signal for the third phase to the operating state level in the second logic state, sets the high potential side search drive signal for the second phase and the low potential side search drive signal for the third phase to the operating state level in the third logic state, sets the high potential side search drive signal for the second phase and the low potential side search drive signal for the first phase to the operating state level in the fourth logic state, sets the high potential side search drive signal for the third phase and the low potential side search drive signal for the first phase to the operating state level in the fifth logic state, and sets the high potential side search drive signal for the third phase and the low potential side search drive signal for the second phase to the operating state level in the sixth logic state.

27. A motor drive method for starting an N-phase motor having N phase (where N is an integer of two or more) motor windings by supplying a search current and a starting current in a search and start mode, and driving the N-phase motor by supplying drive current in a back-EMF voltage mode, the motor drive method comprising:

generating a search drive signal, a starting drive signal, and a normal drive signal;

producing the search current, starting current, and drive current, respectively, based on the search drive signal, the starting drive signal, and the normal drive signal;

generating a pseudo-neutral-point voltage representing the average voltage of the N-phase motor terminals; and detecting a terminal difference voltage denoting the difference between the N-phase motor terminal voltage and the pseudo-neutral-point voltage, and outputting a detection result signal;

wherein said drive signal generating controls the starting drive signal based on the search drive signal and the detection result signal in the search and start mode.

28. The motor drive method described in claim 27, further comprising:

detecting a back-EMF voltage denoting the difference between the N-phase motor terminal voltage and the neutral point voltage at a node common to the N-phase motor windings, and generating a rotor phase signal;

wherein said drive signal generating controls the normal drive signal based on the rotor phase signal in the back-EMF voltage mode, outputs a mode switching signal using at least one signal from a signal group including the search drive signal, the detection result signal, the starting drive signal, and the rotor phase signal; and said drive signal generating being switched from the search and start mode to the back-EMF voltage mode based on the mode switching signal.

* * * * *